US007555000B2

(12) United States Patent
Shimoji et al.

(10) Patent No.: US 7,555,000 B2
(45) Date of Patent: Jun. 30, 2009

(54) DIGITAL BROADCAST SYSTEM

(75) Inventors: Tatsuya Shimoji, Neyagawa (JP); Masahiro Oashi, Kyotanabe (JP); Hiroyuki Waki, Hirakata (JP); Junichi Hirai, Suita (JP)

(73) Assignee: Panasonic Corporation, Osaka (JP)

( * ) Notice: Subject to any disclaimer, the term of this patent is extended or adjusted under 35 U.S.C. 154(b) by 703 days.

(21) Appl. No.: 11/189,918

(22) Filed: Jul. 27, 2005

(65) Prior Publication Data

US 2005/0283819 A1 Dec. 22, 2005

Related U.S. Application Data

(62) Division of application No. 09/417,845, filed on Oct. 14, 1999, now Pat. No. 6,986,159.

(30) Foreign Application Priority Data

Oct. 15, 1998 (JP) ................................ 10-293539

(51) Int. Cl.
*H04L 12/56* (2006.01)
*H04J 1/16* (2006.01)

(52) U.S. Cl. ........................ 370/419; 370/463; 725/143

(58) Field of Classification Search ................. 725/142, 725/135, 90, 89, 134, 143; 370/381, 348, 370/419, 463, 386
See application file for complete search history.

(56) References Cited

U.S. PATENT DOCUMENTS 5,724,091 A 3/1998 Freeman et al.
5,903,816 A 5/1999 Broadwin et al.
5,973,681 A 10/1999 Tanigawa et al.
6,177,930 B1 1/2001 Chernock et al.
6,353,930 B1 3/2002 Shimoji et al.
6,427,238 B1 7/2002 Goodman et al.
6,459,427 B1 10/2002 Mao et al.

(Continued)

FOREIGN PATENT DOCUMENTS

CN 1264347 C 7/2006

(Continued)

OTHER PUBLICATIONS

European Search Report Dated Oct. 27, 2003.

(Continued)

*Primary Examiner*—John Pezzlo
(74) *Attorney, Agent, or Firm*—Studebaker & Brackett PC; Donald R. Studebaker

(57) ABSTRACT

The present invention relate to a digital broadcast system, and it is an object of the invention to record contents quickly in a broadcast system which implements interactivity by transmitting a set of data repeatedly, wherein a digital broadcast receiver separates a table corresponding to video images from streams in an arbitrary order and repeats the processing of memorizing the video image data to be identified in the order of obtaining the same by means of the table corresponding to the video images until all of the set of video images have been memorized. This allows for performing, in a short time, storage process of video image data broadcast for the purpose of efficient reproduction by a receiver having no storage function. Additionally, the data is available to viewers at any time after the completion of storage thereof.

12 Claims, 47 Drawing Sheets

HARDWARE CONFIGURATION OF A DIGITAL BROADCAST RECEIVER

U.S. PATENT DOCUMENTS

| | | | | |
|---|---|---|---|---|
| 6,473,794 | B1 * | 10/2002 | Guheen et al. | 709/223 |
| 6,651,225 | B1 * | 11/2003 | Lin et al. | 716/4 |
| 6,675,385 | B1 | 1/2004 | Wang | |
| 6,757,911 | B1 | 6/2004 | Shimoji et al. | |
| 6,986,159 | B1 | 1/2006 | Shimoji et al. | |
| 7,065,782 | B2 | 6/2006 | Shimoji et al. | |
| 2004/0088739 | A1 | 5/2004 | Shimoji et al. | |

FOREIGN PATENT DOCUMENTS

| | | | |
|---|---|---|---|
| EP | 0 731 575 | A2 | 9/1996 |
| EP | 823823 | A2 | 2/1998 |
| EP | 0 827 336 | A2 | 3/1998 |
| EP | 0 830 019 | A2 | 3/1998 |
| EP | 827240 | A2 | 3/1998 |
| EP | 0827336 | A2 | 3/1998 |
| EP | 827340 | A2 | 3/1998 |
| EP | 0 834 798 | A2 | 4/1998 |
| EP | 0 899 950 | | 4/2000 |
| EP | 0 823 815 | | 12/2000 |
| JP | 07-264561 | A | 10/1995 |
| JP | 10-032796 | | 2/1998 |
| JP | 10-155140 | | 6/1998 |
| JP | 10-178449 | A | 6/1998 |
| JP | 2000-188739 | A | 7/2000 |
| KR | 1998-018482 | | 6/1998 |
| KR | 1998-019190 | | 6/1998 |
| WO | WO 96/37058 | | 11/1996 |
| WO | WO 97/43838 | | 11/1997 |

OTHER PUBLICATIONS

Kakiuchi et al., DVX Technology—Carousel Delivery Mechanism for Interactive Services in Digital Broadcasting, pp. 36-44, Feb. 1998, Matsushita Technical Journal, vol. 44, No. 1, with English Abstract.

Munezane et al., Architecture for Digital STB and Television, pp. 73-80, Feb. 1998, Matsushita Technical Journal, vol. 44. No. 1.

"Information Technology—Generic Coding of Moving Pictures and Associated Audio Information—Part 6: Extensions for DSM-CC" International Standard, ISO/IEC 13818-6, Sep. 1, 1998.

L. Atzori et al., "Multimedia Information Broadcasting Using Digital TV Channels", IEEE Transactions on Broadcasting, Sep. 1997, vol. 43, No. 3, pp. 242-251.

Seno et al., Basic Functions of Multimedia Information Broadcasting Service, 1995, pp. 336-343, The Journal of the Institute of Television Engineers of Japan, vol. 49, No. 3.

Isobe, "Multimedia Services Through Broadcasting", Sep. 26-29, 1994, pp. 633-634, The Institute of Electronics, Information and Communication Engineers, Proceedings of the 1994 IEICE Fall Conference.

Office Action dated Aug. 19, 2006 issued in corresponding Korean patent application.

Japanese Office Action "Notification of Reasons for Refusal" mailed on Mar. 2, 2009; Reference No. MTS056 with English translation.

"Decomposing Index Information for Digital Broadcasting" written by Toshikazu Ohwada et al. Reference No. MTS056 with English Abstract.

Chinese Office Action dispatched on Feb. 20, 2009; Application No. 200610084749.4 with English translation.

* cited by examiner

RADIO WAVE TRANSMISSION STATUS IN SATELLITE BROADCAST
(CONCEPTUAL ILLUSTRATION)

PRIOR ART

FIG.4

PRIOR ART

CONFIGURATION OF PACKETIZED DATA

| | |
|---|---|
| P I D | CONTENT DATA |

FIG.6

PRIOR ART

NIT

| TS | TRANSMISSION PARAMETER | SERVICE LIST |
|---|---|---|
| TS1 | f1 | SV11, SV12, SV13, SV14 |
| TS2 | f2 | SV21, SV22, SV23, SV24 |
| ⋮ | ⋮ | ⋮ |

CONFIGURATION OF RECEIVER

FIG.9

VET (PID=0x85)

| | |
|---|---|
| table_id | 0x91 |
| ⋮ | ⋮ |
| table_id_extension | 0x0000 |
| ⋮ | ⋮ |
| first_pts | 45000 |
| last_pts | 45000 |
| steam_id | 0xe1 |
| component_tag | 0x0000 |

(VE1)

(VE2)

(VE7)

APPEARANCE OF A REMOTE CONTROLLER

FIG.12

NVT1

510 HEADER PORTION table_id=0x80 — 511 table_id_extension=1(=NE_id) — 512

520 DATA PORTION

Object Definition Table: — 521

| Index | type | X | Y | Handler | Normal Bitmap | Focused Bitmap |
|---|---|---|---|---|---|---|
| 0 | Button | 400 | 300 | 0 | 0 | 1 |
| 1 | Button | 400 | 400 | 1 | 2 | 3 |

Object Definition Table: — 522

| Index | Script |
|---|---|
| 0 | goto_contents(index 0) |
| 1 | goto_contents(index 1) |

Hyperlink Table: — 523

| Index | VE_id | NE_id |
|---|---|---|
| 0 | 7 | 2 |
| 1 | 8 | 2 |

Bitmap Table: — 524

| Index | Bitmap Data | index | Bitmap Data |
|---|---|---|---|
| 0 | TOKYO | 2 | OSAKA |
| 1 | TOKYO | 3 | OSAKA |

NVT2 table_id=0x80
table_id_extension=2(=NE_id)

Object Definition Table:

| Index | type | X | Y | Handler | Normal Bitmap | Focused Bitmap |
|---|---|---|---|---|---|---|
| 0 | Button | 400 | 300 | 3 | — | 7 |

Handler Definition Table:

| Index | Script |
|---|---|
| 3 | goto_entry |

Bitmap Table:

| Index | Bitmap Data |
|---|---|
| 7 |  |

FIG.15

NVT_DII

```
table_id                    0x81
    :
table_id_extension          0x0000
    :
numberOfModules             20

for(I=0;I<numberOfModules;I++){
    moduleID(=NE_ID)
    moduleSize(=NE_size)
    moduleVersion
    moduleInfoLength
    for(j=0;j<moduleInfoLength;j++){
        moduleInfoByte

    }
}
privateDataLength
```

FIG.16

VET_DII

```
table_id                  0x91
   :
table_id_extension        0x0000
   :
numberOfModules           20
for(I=0;I<numberOfModules;I++){
    moduleID
    moduleSize
    moduleVersion
    moduleInfoLength
    for(j=0;j<moduleInfoLength;j++){
        moduleInfoByte
    }
}
privateDataLength
```

FIG.17A

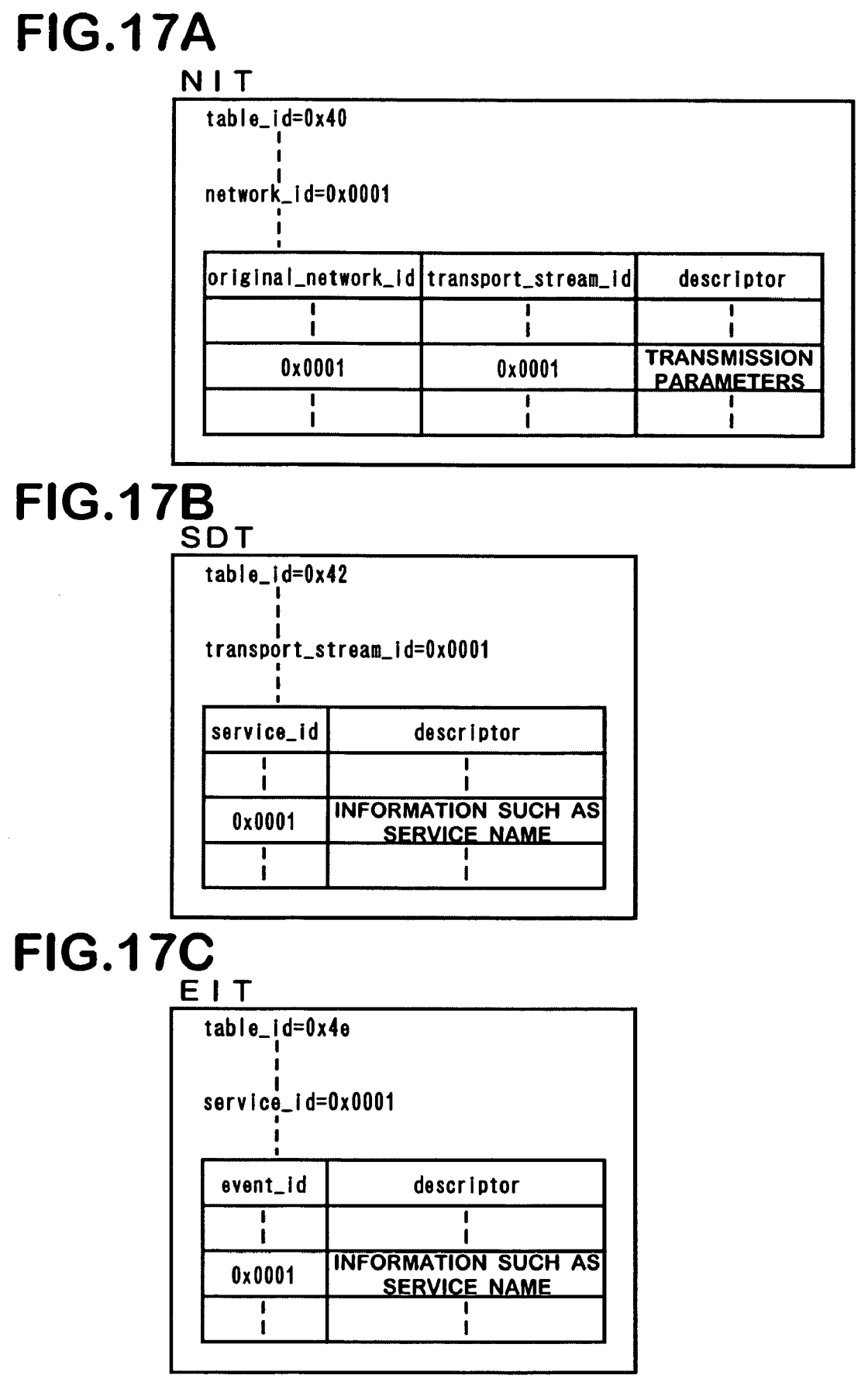

NIT table_id=0x40 network_id=0x0001

| original_network_id | transport_stream_id | descriptor |
|---|---|---|
| ⋮ | ⋮ | ⋮ |
| 0x0001 | 0x0001 | TRANSMISSION PARAMETERS |
| ⋮ | ⋮ | ⋮ |

FIG.17B

SDT table_id=0x42 transport_stream_id=0x0001

| service_id | descriptor |
|---|---|
| ⋮ | ⋮ |
| 0x0001 | INFORMATION SUCH AS SERVICE NAME |
| ⋮ | ⋮ |

FIG.17C

EIT table_id=0x4e service_id=0x0001

| event_id | descriptor |
|---|---|
| ⋮ | ⋮ |
| 0x0001 | INFORMATION SUCH AS SERVICE NAME |
| ⋮ | ⋮ |

FIG.18A

PAT table_id=0x0000 transport_stream_id=0x0001

| program_no | PMT_pid |
|---|---|
| ⋮ | ⋮ |
| 0x0001 | 0x0080 |
| ⋮ | ⋮ |

FIG.18B

PMT table_id=0x01 program_number=0x0001

PCR_PID=0x0081

DVX_Program_Descriptor

Expiration_Descriptor

| PID | stream_type | descriptor |
|---|---|---|
| 0x0082 | 0x04 | NE_Component_Descriptor<br>Stream_Identifier_descriptor |
| 0x0083 | 0x02 | VE_Information_Component_Descriptor<br>Stream_Identifier_descriptor |
| 0x0084 | 0x05 | Stream_Identifier_descriptor |
| ⋮ | ⋮ | ⋮ |
| 0x008d | 0x05 | Stream_Identifier_descriptor |

VIEW OF GENERAL CONFIGURATION OF A DIGITAL BROADCAST RECEIVER
(FIRST EMBODIMENT)

FIG.21 HARDWARE CONFIGURATION OF A DIGITAL BROADCAST RECEIVER

CONTENT SWITCHING PROCESS

FIG.25

FILTER CONDITION TABLE 1100

| IDENTIFICATION No. (1101) | START/STOP (1102) | PID (1103) | steam_id (1104) | table_id (1105) | table_id_extension (1106) | DESTINATION (1107) |
|---|---|---|---|---|---|---|
| 0 | START | 0x0084 | 0xe5 | | | AV DECODER PORTION |
| 1 | START | 0x0083 | | 0x90 | 0x0001 | VET MEMORY PORTION |
| 2 | START | 0x0082 | | 0x80 | 0x0001 | NAVIGATION INFORMATION MEMORY PORTION |
| 3 | STOP | 0x0083 | | 0x91 | — | DII MEMORY PORTION |
| 4 | START | 0x0082 | | 0x81 | — | DII MEMORY PORTION |
| ----- | ----- | ----- | ----- | ----- | ----- | ----- |

FIG.26

FILTER CONDITION TABLE 1400

| IDENTIFICATION No. (1401) | START/STOP (1402) | PID (1403) | steam_id (1104) | table_id (1405) | table_id_extension (1406) | DESTINATION (1407) |
|---|---|---|---|---|---|---|
| 0 | START | 0x0084 | 0xe5 | | | AV DECODER PORTION |
| 1 | START | 0x0083 | | 0x90 | 0x0001 | VET MEMORY PORTION |
| 2 | START | 0x0082 | | 0x80 | 0x0001 | NAVIGATION INFORMATION MEMORY PORTION |
| 3 | STOP | 0x0083 | | 0x91 | — | DII MEMORY PORTION |
| 4 | STOP | 0x0082 | | 0x81 | — | DII MEMORY PORTION |
| ⋮ | ⋮ | ⋮ | ⋮ | ⋮ | ⋮ | ⋮ |

USER INPUT SIGNAL PROCESSING

FIG.29

1900

STORED DATA MANAGEMENT TABLE

STORAGE COMPLETION FLAG=False 1901

Expiration=1999/9/10 23:59:59 1902

Entry_VE_id=0x0001 1903

Entry_NE_id=0x0001 1904

1905 VIDEO IMAGE DATA MANAGEMENT TABLE

| VE_id | MEMORY LOCATION (FILE NAME) | SIZE | STORAGE FLAG |
|---|---|---|---|
| 1 | /service5/event4/ve_1 | 100KB | True |
| 2 | /service5/event4/ve_2 | 123KB | True |
| ⋮ | ⋮ | ⋮ | ⋮ |
| 19 | —— | — | False |
| 20 | /service5/event4/ve_20 | 102KB | True |

1906 NAVIGATION INFORMATION MANAGEMENT TABLE

| NE_id | MEMORY LOCATION (FILE NAME) | SIZE | STORAGE FLAG |
|---|---|---|---|
| 1 | /service5/event4/ve_1 | 32KB | True |
| 2 | —— | — | False |
| ⋮ | ⋮ | ⋮ | ⋮ |
| 19 | /service5/event4/ve_19 | 51KB | True |
| 20 | /service5/event4/ve_20 | 21KB | True |

PRESENTATION INFORMATION STORAGE PROCESS

FIG.32

FILTER CONDITION TABLE 1400

| IDENTIFICATION No. (1401) | START/STOP (1402) | PID (1403) | steam_id (1104) | table_id (1405) | table_id_extension (1406) | DESTINATION (1407) |
|---|---|---|---|---|---|---|
| 0 | START | 0x0084 | 0xe5 | | | AV DECODER PORTION |
| 1 | STOP | 0x0083 | | 0x90 | — | VET MEMORY PORTION |
| 2 | STOP | 0x0082 | | 0x80 | — | NAVIGATION INFORMATION MEMORY PORTION |
| 3 | START | 0x0083 | | 0x91 | — | DII MEMORY PORTION |
| 4 | START | 0x0082 | | 0x81 | — | DII MEMORY PORTION |
| ⋮ | ⋮ | ⋮ | ⋮ | ⋮ | ⋮ | ⋮ |

REPRODUCTION PROCESSING OF STORED PROGRAM DATA

PRESENTATION INFORMATION SWITCHING PROCESS

FIG.37

2710 HEADER PORTION table_id=0x80 — 2711 table_id_extension=0(=NE_id) — 2712

2720 DATA PORTION

Object Definition Table: — 2721

| Index | type | X | Y | Handler | Normal Bitmap | Focused Bitmap |
|---|---|---|---|---|---|---|
| 0 | Button | 400 | 300 | 0 | 0 | 1 |
| 1 | Button | 400 | 400 | 1 | 2 | 3 |
| 2 | BACK GROUND IMAGE | 0 | 0 | NONE | 4 | 4 |

Object Definition Table: — 2722

| Index | Script |
|---|---|
| 0 | goto_contents(index 0) |
| 1 | goto_contents(index 1) |

Hyperlink Table: — 2723

| Index | VE_id | NE_id |
|---|---|---|
| 0 | 1 | 1 |
| 1 | 2 | 2 |

Bitmap Table: — 524

| Index | Type | Bitmap Data |
|---|---|---|
| 0 | bmp | TOKYO |
| 1 | bmp | TOKYO |
| 2 | bmp | OSAKA |
| 3 | bmp | OSAKA |

| index | Type | Bitmap Data |
|---|---|---|
| 4 | MPEG ] | VE_id=0x0001 WEATHER FORECAST |

FIG.38

NVT_DII

```
table_id                        0x81
   :
table_id_extension              0x0000
   :
numberOfModules                 20
for(I=0;I<numberOfModules;I++){
    moduleID(=NE_ID)
    moduleSize(=NE_size)
    moduleVersion
    moduleInfoLength
    for(j=0;j<moduleInfoLength;j++){
                ExpirationTime
                      :
    }
}
privateDataLength
```

FIG.39

VET_DII

```
table_id                      0x91
    ⋮
table_id_extension            0x0000
    ⋮
numberOfModules               20

for(I=0;I<numberOfModules;I++){
    moduleID
    moduleSize
    moduleVersion
    moduleInfoLength
    for(j=0;j<moduleInfoLength;j++){
                ExpirationTime
                      ⋮
    }
}
privateDataLength
```

FIG.40

3000 STORED DATA MANAGEMENT TABLE

STORAGE COMPLETION FLAG=False 3001

Expiration=1999/9/10 23:59:59 1902

Entry_VE_id=0x0001 1903

Entry_NE_id=0x0001 1904R

3005 VIDEO IMAGE DATA MANAGEMENT TABLE

| VE_id | MEMORY LOCATION (FILE NAME) | SIZE | STORAGE FLAG | Expiration |
|---|---|---|---|---|
| 1 | /service5/event4/ve_1 | 100KB | True | 1999/9/20 23:59:00 |
| 2 | /service5/event4/ve_2 | 123KB | True | 1999/9/19 23:59:00 |
| ⋮ | ⋮ | ⋮ | ⋮ | ⋮ |
| 19 | — | — | False | 1999/9/21 23:59:00 |
| 20 | /service5/event4/ve_20 | 102KB | True | 1999/9/20 2:00:00 |

3006 NAVIGATION INFORMATION MANAGEMENT TABLE

| NE_id | MEMORY LOCATION (FILE NAME) | SIZE | STORAGE FLAG | Expiration |
|---|---|---|---|---|
| 1 | /service5/event4/ve_1 | 32KB | True | 1999/9/20 23:59:00 |
| 2 | — | — | False | 1999/9/19 23:59:00 |
| ⋮ | ⋮ | ⋮ | ⋮ | ⋮ |
| 19 | /service5/event4/ve_19 | 51KB | True | 1999/9/21 23:59:00 |
| 20 | /service5/event4/ve_20 | 21KB | True | 1999/9/20 2:00:00 |

VIEW OF GENERAL CONFIGURATION OF A DIGITAL BROADCAST RECEIVER (SECOND EMBODIMENT)

FIG.45

NVT_DII

```
table_id                        0x81
    ⋮
table_id_extension              0x0000
    ⋮
numberOfModules                 20
for(I=0;I<numberOfModules;I++){
    moduleID(=NE_ID)
    moduleSize(=NE_size)
    moduleVersion
    moduleInfoLength
    for(j=0;j<moduleInfoLength;j++){
            ExpirationTime
            Verup
                ⋮
    }
}
privateDataLength
```

FIG.46

VET_DII

```
table_id                    0x81
    :
table_id_extension          0x0000
    :
numberOfModules             20
for(i=0;i<numberOfModules;i++){
    moduleID
    moduleSize
    moduleVersion
    moduleInfoLength
    for(j=0;j<moduleInfoLength;j++){
            ExpirationTime
            Verup
                :
    }
}
privateDataLength
```

DIGITAL BROADCAST SYSTEM

CROSS-REFERENCE TO RELATED APPLICATION

The entire disclosure of Japanese Patent Application No. Hei 10-293539 filed on Oct. 15, 1998 including specification, claims, drawings and summary are incorporated herein by reference in its entirety.

BACKGROUND OF THE INVENTION

1. Field of the Invention

The present invention relates to a digital broadcast system and more particularly, to a system which allows for changing the content elements interactively in response to the viewer operation.

2. Description of the Related Art

0. Outline of the Satellite Broadcast System

First, the outline of the satellite broadcast system is to be described.

0.1. Radio Wave Transmission Status in the Satellite Broadcast

FIG. 1 is a schematic illustration of the radio wave transmission status in a satellite broadcast. The radio wave from an earth station 2 is transmitted to earth via a broadcast satellite 4. A plurality of transport streams TS1, TS2, and TS3 are transmitted from the broadcast satellite 4. The transport streams (MPEG-2) are distinguished according to the frequency, plane of polarization, and the like. The transport stream TS1 has a plurality of services (corresponding to channels of the ground wave broadcast) SV11, SV12, SV13, and SV14 provided in packets and multiplexed by time division. Likewise, the transport stream TS2 has services SV21, SV22, SV23, and SV24 multiplexed, with the transport stream TS3 having services SV31, SV32, SV33, and SV34 multiplexed. Incidentally, each of the transport streams carries video and audio data for each service as well as control data for indicating program information, control data for indicating current time, and control data necessary for packets, etc. In FIG. 1, only three transport streams are shown, however, more transport streams are transmitted in practice. Additionally, in FIG. 1, each transport stream has four services multiplexed, however, more services are multiplexed in practice.

0.2. Configuration of Transmitter

As shown in FIG. 2, each transport stream is generated and transmitted by means of a transmitter 1. Referring to the figure, only the transport stream TS1 is shown and the other transport streams TS2 and TS3 are generated in the same way.

Video/audio data ES11, ES12, ES13, and ES14 of the services SV11, SV12, SV13, and SV14 are provided to the transmitter 1. The transmitter 1 converts these video/audio data ES11, ES12, ES13, and ES14 into packets for multiplexing. The transmitter 1 also generates control data for multiplexing packets. The control data for multiplexing packets are employed for discriminating correctly video/audio data of a plurality of services in packets processed by time division. Packetized and multiplexed video/audio data (Contents) are transmitted as transport streams together with control data.

0.3. Configuration of Transport Stream

As shown in FIG. 3, the transport stream TS1 generated by the transmitter of FIG. 2 comprises multiplexed video data ES (V) 1 and audio data ES (A) 1 of the service SV11, video data ES (V) 2 and audio data ES (A) 2 of the service SV12, video data ES (V) 3 and audio data ES (A) 3 of the service SV13, and video data ES (V) 4 and audio data ES (A) 4 of the service SV14.

Furthermore, control data NIT, PAT, PMT1, PMT2, PMT3, and PMT4 for packet multiplexing are multiplexed. Video/audio data of each of the multiplexed services SV11, SV12, SV13, and SV14 can be separated by the control data. Packetization is carried out as shown with a vertical line 18*a* of FIG. 3. That is, packetization is performed in the order of control data NIT, PAT, EIT, TDT, ECM, video data ES (V), and audio data ES (A). After packetization is completed up to the audio data ES (A), packetization is then repeated again for the control data NIT and so forth (see a vertical line 18*b*).

Figure 4:
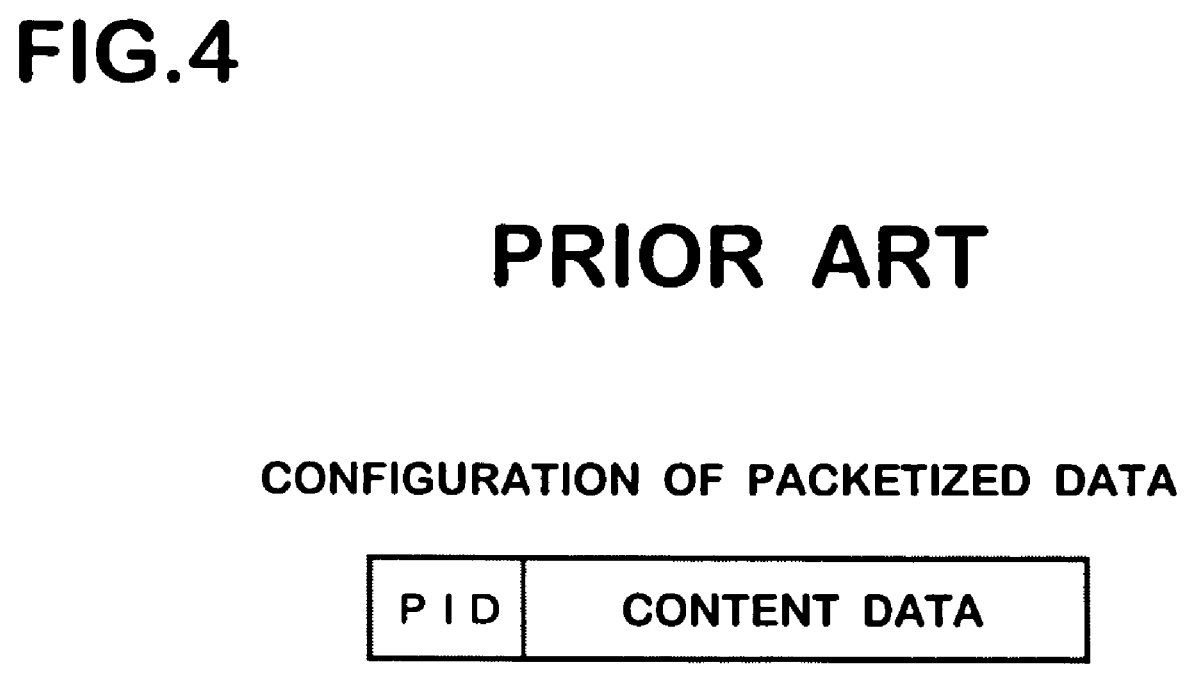

FIG. 4 shows a basic configuration of packetized data. Control data and video/audio data are made into a packet with the configuration shown in FIG. 4. A packet ID (PID) is provided on the head of the packetized data. The packet ID is a unique symbol provided for each packet to identify individual packets. The data contents are the data (control data, video/audio data, etc.) targeted for packetization.

FIG. 5 shows the relationship between the control data PAT, PMT1, PMT2, PMT3, and PMT4, and video/audio data ES of each service, in the transport stream TS1. For example, video/audio data 500 into which the service SV12 is encrypted is packetized and provided with PID 502. Referring to the figure, though one packet is schematically shown, the video/audio data 500 is time-divided and transmitted in a number of packets.

The packet ID of the video/audio data 500 of the service SV12 is described in the control data PMT2. Accordingly, the packet ID of the video/audio data 500 of the service SV12 can be known by obtaining the contents of the control data PMT2. This control data PMT2 is also packetized and provided with PID512. In the figure, though one packet is schematically shown, the control data PMT2 is also time-divided and transmitted in a number of packets.

The packet ID of the control data PMT2 is described in the control data PAT. Accordingly, the packet ID of the control data PMT2 of the service SV12 can be known by obtaining the contents of the control data PAT. This control data PAT is also packetized and provided with PID522. Incidentally, the control data PAT has the description of packet IDs of PMT1, PMT2, PMT3, and PMT4 of services SV11, SV12, SV13, and SV14, which are multiplexed in the transport stream TS1.

A transport stream has control data and video/audio data which are packetized and associated as in the foregoing. Thus, in order to identify the services multiplexed in a transport stream, the control data PAT must be obtained first. For this reason, the packet ID of the control data PAT is fixed to a predetermined value (000 in hexadecimal notation, designated hereinafter ×0000.

Incidentally, transmission parameters (such as frequency) of each of the transport streams TS1, TS2, and TS3, and kinds of services multiplexed in each of the streams are described in the control data NIT (see FIG. 6). Accordingly, it can be known in which transport stream a particular service is multiplexed, by obtaining the contents of the control data NIT. The packet ID of the control data NIT is described in the control data PAT.

0.4. Configuration of Receiver

FIG. 7 shows the outline of a receiver. A tuner 22 selects a transport stream, and a transport decoder 26 separates the video/audio data ES relating to the desired service. Incidentally, MPU 28 sets the packet ID of the video/audio data ES of the desired service to the transport decoder 26. This allows the transport decoder 26 to output the video/audio data ES of said service. In addition, in the case where the packet ID of control data is set to the transport decoder 26, the separated control data is given to the MPU 28.

Assuming that the service SV33 of the transport stream TS3 is being received, the operation to be performed in the case where the command of switching to the service SV12 of the transport stream TS1 is given to the MPU 28 is to be explained below. First, the MPU 28 controls the transport decoder (that is, by setting the packet ID of the control data NIT) to take NIT in. The description of the NIT teaches that the service SV12 desired for reception has been multiplexed in the transport stream TS1 (see FIG. 6).

Then, the MPU 28 controls the tuner 22 to receive the transport stream TS1. Moreover, the MPU 28 controls the transport decoder 26 to obtain the PAT and PMT2, obtaining the packet IDs of the video data ES (V) 2 and the audio data ES (A) 2 of the desired service SV12 (see arrows α and β of FIG. 5).

Subsequently, the MPU 28 sets these packet IDs to the transport decoder 26 to allow the transport decoder 26 to output the video data ES (V) 2 and the audio data ES (A) 2 of the desired service SV12. As mentioned above, services are switched for reception.

SUMMARY OF THE INVENTION

However, in the aforementioned prior art broadcast system, viewers at the receiver side were not allowed to change the contents of a program interactively by their own operation. For example, in the program broadcasting weather forecast viewers were not allowed to cause a forecast of a particular region to appear on the screen or switch to a screen of a weekly forecast by the viewers own operation.

In view of the foregoing, the object of the present invention is to provide a digital broadcast system which allows viewers to change the contents of programs interactively by their own operation as if two-way communications are interactively performed using video information and the like transmitted one way from a broadcast station. Another object is to provide quick processing at the receiver side in such a digital broadcast system, and to record such a program as is interactively broadcast.

(1) The broadcast system of the present invention is a digital broadcast system which allows a transmitter to broadcast a set of linked content elements, a receiver to select a content element from a set of transmitted content elements for output, and a viewer to switch to a content element selected in response to an operation input by the viewer, the digital broadcast system comprising the following transmitter and receiver.

The broadcast system transmits said sets of content elements repeatedly with a plurality of content elements as one set, and transmits repeatedly one or more navigation control data for controlling to determine which of a plurality of content elements to output.

The receiver comprises a receiving portion for receiving transmitted data, an operation receiving portion for receiving an operator operation, and a restoring portion for determining which content element to restore next based on the operation received by the operation receiving portion and in accordance with the navigation control data, for selecting a content element to be restored next out of content elements transmitted repeatedly, and for restoring the element for output, in a receiving mode; for restoring and recording a set of navigation control data and a set of content elements, in a recording mode; and for selecting a content element from a set of recorded content elements for output, based on the operation received by the operation receiving portion and in accordance with the recorded navigation control data, in a reproducing mode.

Said sets of content elements with a plurality of content elements as one set and one or more navigation control data for controlling to determine which of a plurality of content elements to output are repeatedly transmitted, thereby allowing the receiving side to select content elements in accordance with the navigation control data and output the same. Additionally, a set of navigation control data and a set of content elements are recorded, whereby interactive service contents can be recorded and reproduced with less capacity needed for recording.

(2) The digital broadcast system of the present invention is characterized in that the transmitter transmits sets of content elements as elementary streams to which a series of sequential information is attached, and transmits repeatedly fetched control data which fetches each of the content elements from said elementary streams in accordance with said series of information with the fetch control data associated with the content elements; and the restoring portion of the receiver fetches a target content element from the elementary streams in accordance with the series of information of said fetch control data in the receiving mode and recording mode.

Therefore, content elements can be transmitted using elementary streams. Additionally at the receiving side, content elements can be fetched from elementary streams in accordance with fetch control data.

(3) The digital broadcast system of the present invention is characterized in that time information is utilized as the series of information, and the content elements are dynamic video image data or audio data which are sliced in said elementary streams in accordance with a start time and termination time of said time information.

Therefore, dynamic image data or audio data can be fetched using the time information multiplexed in elementary streams as the series of information for fetching content elements.

(4) The digital broadcast system of the present invention is characterized in that time information is utilized as the series of information, and the content elements are still video image data which are sliced in said elementary streams in accordance with said time information.

Therefore, still video image data can be fetched using the time information multiplexed in elementary streams as the series of information for fetching content elements.

(5) The digital broadcast system of the present invention is characterized in that the transmitter associates a content element list which shows a list of content elements included in the sets of content elements with the sets of content elements and transmits the content element list, and the restoring portion of the receiver determines whether or not all content elements included in the sets of content elements have been recorded, in accordance with said content element list in the recording mode.

Therefore, at the receiver side, it is easily determined whether or not all content elements are recorded.

(6) The digital broadcast system of the present invention is characterized in that the transmitter associates a navigation list which shows a list of navigation control data included in the sets of navigation control data with the sets of navigation control data and transmits the navigation list, and the restoring portion of the receiver determines whether or not all navigation control data included in the sets of the navigation data have been recorded, in accordance with said navigation list in the recording mode.

Therefore, at the receiver side, it is easily determined whether or not all navigation data are recorded.

(7) The digital broadcast system of the present invention is characterized in that the transmitter attaches an expiration date to a set of content elements or a set of fetch control data for transmission thereof, and the restoring portion of the receiver associates said expiration date with a set of content elements for recording thereof in the recording mode, and does not output said set of content elements if said expiration date has expired or outputs the same together with information that said expiration date has expired, in the reproducing mode.

Therefore, the reproduced contents of a whole set of content elements can be controlled in accordance with the expiration date intended by the broadcasting side, when the recorded content elements are restored.

(8) The digital broadcast system of the present invention is characterized in that the transmitter attaches an expiration date to content elements or fetch control data for transmission thereof, and the restoring portion of the receiver associates said expiration date with content elements for recording thereof in the recording mode, and does not output said content elements if said expiration date has expired or outputs the same together with information that said expiration date has expired, in the reproducing mode.

Therefore, the reproduced contents of individual content elements can be controlled in accordance with the expiration date intended by the broadcasting side, when the recorded content elements are restored.

(9) The digital broadcast system of the present invention is characterized in that the expiration date is included in a content element list or a navigation list for transmission thereof.

(16) The digital broadcast receiver of the present invention is characterized in that the restoring portion fetches all target fetch control data without specifying which fetch control data to fetch, and records content elements in sequence in the order of obtaining fetch control data, in the recording mode.

Therefore, all content elements can be fetched more quickly compared with the case where fetch control data are sequentially specified and fetched. That is, time for recording processing can be shortened.

(17) The digital broadcast receiver of the present invention is characterized in that the restoring portion fetches all target navigation control data without specifying which navigation control data to fetch, and records navigation control data in sequence in the order of obtaining navigation control data, in the recording mode.

Therefore, all navigation control data can be fetched more quickly compared with the case where navigation control data are sequentially specified and fetched. That is, time for recording processing can be shortened.

(18) The digital broadcast receiver of the present invention is characterized in that the restoring portion in the recording mode fetches all target fetch control data without specifying which fetch control data to fetch, and records content elements in sequence in the order of obtaining fetch control data while a number of unrecorded fetch control data remains, and when a small number of unrecorded fetch control data remains, specifies said unrecorded fetch control data in order to be fetched and recorded.

In the case where a small number of unrecorded fetch control data remains, said unrecorded fetch control data are specified and fetched, thereby allowing for avoiding fetching recorded fetch control data in vain. That is, the time for recording processing can be shortened.

(19) The digital broadcast receiver of the present invention is characterized in that the restoring portion in the recording mode fetches all target navigation control data without specifying which navigation control data to fetch, and records content elements in sequence in the order of obtaining navigation control data while a number of unrecorded navigation control data remains, and when a small number of unrecorded navigation control data remains, specifies said unrecorded navigation control data in order to be fetched and recorded.

In the case where a small number of unrecorded navigation control data remains, said unrecorded fetch control data are specified and fetched, thereby allowing for avoiding fetching recorded navigation control data in vain. That is, the time for recording processing can be shortened.

(22) The digital broadcast recorder of the present invention is a digital broadcast recorder for recording digital broadcast which allows a viewer to switch to content elements selected in response to an operation input by the viewer, the digital broadcast recorder comprising a receiving portion for receiving transmitted data, and a recording portion which fetches a target content element from elementary streams in accordance with fetch control data for identifying content elements with a series of sequential information attached thereto in accordance with said series of information, and which restores a set of content elements for recording thereof and as well records a set of navigation control data.

Recording is performed for a set of content elements and a set of navigation control data, whereby interactive service contents can be recorded and reproduced with less capacity needed for recording. Moreover, recorded contents can be readily re-used by computers or the like.

(27) The digital broadcast system of the present invention is a digital broadcast system which allows a transmitter to broadcast a set of content elements linked to one another by descriptions of the content elements themselves, a receiver to select a content element from a set of transmitted content elements for output, and a viewer to switch to a content element selected in response to an operation input by the viewer; the digital broadcast system comprising the following transmitter and receiver.

Said transmitter transmits said sets of content elements repeatedly with a plurality of content elements as one set; and said receiver comprises a receiving portion for receiving transmitted data, an operation receiving portion for receiving an operator operation, and a restoring portion for determining which content element to restore next based on the operation received by the operation receiving portion and in accordance with link information in the content elements, for selecting a content element to be restored next out of content elements transmitted repeatedly, and for restoring the element for output, in a receiving mode; for restoring and recording a set of content elements, in a recording mode; and for selecting a content element from a set of recorded content elements for output, based on the operation received by the operation receiving portion and in accordance with link information in the content elements, in a reproducing mode.

A set of content elements linked to one another by descriptions of the content elements themselves is transmitted, thereby allowing for selecting and outputting content elements at the receiving side in accordance with descriptions of the content elements themselves. In addition, a set of content elements are recorded, whereby interactive service contents can be recorded and reproduced with less capacity needed for recording.

(29) The digital broadcast system of the present invention is a digital broadcast system which allows a transmitter to broadcast a set of linked content elements, a receiver to select a content element from a set of transmitted content elements for output, and a viewer to switch to a content element selected in response to an operation input by the viewer; the digital broadcast system comprising the following transmitter and receiver.

said transmitter transmits said sets of content elements repeatedly with a plurality of content elements as one set, and transmits repeatedly one or more navigation control data for controlling to determine which of a plurality of content elements to output, and said receiver comprises a receiving portion for receiving transmitted data, an operation receiving portion for receiving an operator operation, and a restoring portion for determining which content element to restore next based on the operation received by the operation receiving portion and in accordance with the navigation control data, for selecting a content element to be restored next out of content elements transmitted repeatedly, and for restoring the element for output; wherein said restoring portion performs processing of restoring and recording other content elements in parallel with processing of selecting and restoring a desired content element determined based on the operation input by the operator, and outputs content elements which have been restored in advance and recorded, in the case where content elements determined based on the operation input by the operator have already been recorded.

Said sets of content elements with a plurality of content elements as one set and one or more navigation control data for controlling to determine which of a plurality of content elements to output are transmitted repeatedly, thereby allowing for selecting and outputting content elements at the receiving side in accordance with navigation control data. Moreover, other content elements are restored and recorded in advance in parallel to restoring and outputting content elements to be outputted, and the recorded content elements are used to output said other content elements. This allows content elements to be switched in a short time, and thus a quick response to the viewer operation can be provided. Moreover, this allows for using content elements transmitted repeatedly in the case of a receiver with small recording capacity available, while allowing for using recorded content elements in the case of large capacity available. That is, a compatible and interactive broadcast can be implemented regardless of the recording capacity of the receiver. Additionally, the processing speed can be improved in accordance with the recording capacity of the receiver.

(35) The digital broadcast system of the present invention is characterized in that the transmitter attaches an associated expiration date or a version to a whole set of content elements or an individual content element for transmission thereof, and the restoring portion of the receiver associates said expiration date or version with a whole set of content elements or an individual content element for recording, and performs optimization processing in accordance with said expiration date or version.

Therefore, this prevents out-of-date information from being outputted to allow up-to-date information to be acquired in accordance with the expiration date and version of the content elements recorded.

(36) The digital broadcast system of the present invention is characterized in that the optimization processing performed by the restoring portion of the receiver causes, in the case where desired content elements determined in accordance with the operator operation have already been written, the recorded content elements not to be outputted or to be outputted together with the information that the expiration date has expired, when the expiration date of said content elements has expired or if the version is not up to date.

Therefore, this can prevent out-of-date information from being reproduced. Moreover, it can be shown that the reproduced information is out of date.

(37) The digital broadcast system of the present invention is characterized in that the optimization processing performed by the restoring portion of the receiver causes, in the case where desired content elements determined in accordance with the operator operation have already been written, the recorded content elements not to be outputted, and allows for selecting a desired content element from a transmitted set of content elements to restore and output the same, when the expiration date of said content elements has expired or if the version is not up to date.

Therefore, this can prevent out-of-date information from being outputted but allows up-to-date information to be outputted even at the time of reproducing recorded information.

(38) The digital broadcast system of the present invention is characterized in that the optimization processing performed by the restoring portion of the receiver performs comparison between a version transmitted associated with content elements and a version already recorded or a comparison between current date and time and expiration date already recorded, and, if the expiration date has expired or the version is not up to date, then allows again for restoring transmitted content elements for recording thereof.

Therefore, this allows recorded content elements to be updated. Incidentally, a comparison of expiration date may be carried out periodically or at the time when said set of content elements is or said content elements are selected.

(39) The digital broadcast system of the present invention is characterized in that the transmitter transmits information regarding whether or not a new set of content elements or content elements having a subsequent version or subsequent expiration date is to be transmitted, associated with a whole set of content elements or individual content elements.

Therefore, this allows for readily determining whether new content elements are to be transmitted, at the receiver side.

(59) The digital broadcast system of the present invention is a digital broadcast system which allows a transmitter to broadcast a set of content elements linked to one another by descriptions of the content elements themselves, a receiver to select a content element from a set of transmitted content elements for output, and a viewer to switch to a content element selected in response to an operation input by the viewer; the digital broadcast system comprising the following transmitter and receiver, Said transmitter transmits said sets of content elements repeatedly with a plurality of content elements as one set, and said receiver comprises a receiving portion for receiving transmitted data, an operation receiving portion for receiving an operator operation, and a restoring portion for determining which content element to restore next based on the operation received by the operation receiving portion and in accordance with link information in the content elements, for selecting a content element to be restored next out of content elements transmitted repeatedly, and for restoring the element for output; wherein said restoring portion performs processing of restoring and recording other content elements in parallel with processing of selecting and restoring a desired content element determined based on the operation input by the operator, and outputs content elements which have been restored in advance and recorded, in the case where content elements determined based on the operation input by the operator have already been recorded.

A set of content elements linked to one another by descriptions of the content elements themselves, thereby allowing for selecting and outputting content elements at the receiving side in accordance with descriptions of the content elements themselves. Moreover, other content elements are restored and recorded in advance in parallel to restoring and outputting content elements to be outputted, and the recorded content elements are used to output said other content elements. This allows content elements to be switched in a short time, and thus a quick response to the viewer operation can be provided. Moreover, this allows for using content elements transmitted repeatedly in the case of a receiver with small recording capacity available, while allowing for using recorded content elements in the case of large capacity available. That is, a compatible and interactive broadcast can be implemented regardless of the recording capacity of the receiver. Additionally, the processing speed can be improved in accordance with the recording capacity of the receiver.

(61) The digital broadcast system of the present invention is characterized in that the transmitter transmits recording process information that is basis for judging whether or not the recording process should be carried out at receiver side, associated with a whole set of content elements, individual content elements, a whole set of navigation control data or individual navigation control data. Therefore, this allows for readily determining whether the recording process should be carried out, at the receiver side. The term recording process information contains recording necessity information that show whether the recording process is necessary or not, expiration information that show expiration of the information and frequency information of revising version that show frequency of version revise.

The receiver according to the present invention has also the following configurations and features.

1. A digital broadcast receiver which receives a digital broadcast transmitting repeatedly a plurality of video image data, the digital broadcast receiver characterized in that said digital broadcast data is a multiplexed stream; said video image data is included in either one video image stream or a plurality of video image streams multiplexed in a multiplexed stream; said video image data is provided with video image stream identification information of an identifier in the multiplexed stream of a video image stream in which the video image data is included, and with reproduction time information for reproducing itself; moreover, in said multiplexed stream, video image correspondence tables are multiplexed which are associated with corresponding video image data one to one; said video image correspondence table has descriptions of a video image correspondence table identifier showing that the table itself is a video image correspondence table in the multiplexed stream, of a video image data identifier for uniquely identifying corresponding video image data, of video image stream identification information including corresponding video image data, and the reproduction start time and reproduction termination time of corresponding video image data; the video image correspondence tables being transmitted repeatedly as well as video image data; moreover, all video image data management tables are multiplexed in said multiplexed stream; said all video image data management tables have descriptions of information relating to an all video image data management table identifiers for identifying the table itself to be an all video image data management table in a multiplexed stream, and relating to a video image data identifier of all video image data included in a multiplexed stream, the all video image data management table being repeatedly transmitted; said digital broadcast receiver comprises a receiving portion, an extracting portion, a reception control portion, and a memory portion; said receiving portion receives said multiplexed streams; said memory portion comprises a video image data memory portion for storing video image data, an all video image data management table memory portion for storing all video image data management tables, and a video image correspondence table memory portion for storing video image correspondence tables; said extracting portion comprises a video image stream extracting portion for extracting a video image data stream, consistent with set extracting conditions, from a multiplexed stream received at said receiving portion, a video image correspondence table extracting portion for extracting video image correspondence tables consistent with set extracting conditions, and an all video image data management table extracting portion for extracting all video image data management tables consistent with set extracting conditions; said reception control portion controls said receiving portion so as to receive multiplexed streams, and with the all video image data management table identifiers as an extracting condition, said reception control portion controls said extracting portion so as to extract an all video image data management table and store the same in an all video image data management table memory portion; as storage process of video image data after an all video image data management table has been stored in the all video image data management table memory portion, said reception control portion controls said extracting portion so as to extract a video image correspondence table and store the same in the video image correspondence table memory portion with a video image correspondence table identifier as an extracting condition; each time any one of video image correspondence tables is extracted from a multiplexed stream and stored in the video image correspondence table memory portion, said reception control portion reads out said video image correspondence table, and acquires a video image data identifier, video image stream identifier, reproduction start time, and reproduction termination time in order to control the extracting portion so as to extract a video image stream identifier with said video stream identifier as an extracting condition; those video image data of which reproduction time information of the extracted video image stream falls within the range of said reproduction start time and said reproduction termination time are stored in the video image memory portion as video image data corresponding to the video image data identifier; and said reception control portion repeats storage process of said video image data until storage of all video image data corresponding to the video image data identifier described in the all video image data management table has been completed.

2. The receiver is characterized in that said reception control portion does not perform overlapped storage process of the same video image data after a video image correspondence table including a video image data identifier for identifying video image data stored in the video image data memory portion has already been extracted.

3. A digital broadcast receiver which receives digital broadcast transmitting repeatedly of a plurality of audio data, the digital broadcast receiver characterized in that said digital broadcast data is a multiplexed stream; said audio data is included in either one audio stream or a plurality of audio streams multiplexed in a multiplexed stream; said audio data is provided with audio stream identification information of an identifier in the multiplexed stream of an audio stream in which audio data is included, and with reproduction time information for reproducing itself; moreover, in said multiplexed stream, audio correspondence tables are multiplexed which are associated with corresponding audio data one to one; said audio correspondence table has descriptions of an audio correspondence table identifier showing that the table itself is an audio correspondence table in the multiplexed stream, of an audio data identifier for uniquely identifying corresponding audio data, of audio stream identification information including corresponding audio data, and the reproduction start time and reproduction termination time of corresponding audio data; the audio correspondence tables being transmitted repeatedly as well as audio data; moreover, all audio data management tables are multiplexed in said multiplexed stream; said all audio data management table has descriptions of information relating to an all video image data management table identifier for showing the table itself to be an all audio data management table in a multiplexed stream, and relating to an audio data identifier of all audio data included in a multiplexed stream, the all audio data management table being repeatedly transmitted; said digital broadcast receiver comprises a receiving portion, an extracting portion, a reception control portion, and a memory portion; said receiving portion receives said multiplexed streams; said memory portion comprises an audio data memory portion for storing audio data, an all audio data management table memory portion for storing all audio data management tables, and an audio correspondence table memory portion for storing audio correspondence tables; said extracting portion comprises an audio stream extracting portion for extracting an audio stream, consistent with set extracting conditions, from a multiplexed stream received at said receiving portion, an audio correspondence table extracting portion for extracting audio correspondence tables consistent with set extracting conditions, and an all audio data management table extracting portion for extracting all audio data management tables consistent with set extracting conditions; said reception control portion controls said receiving portion so as to receive multiplexed streams, and with the all audio data management table identifier as an extracting condition, said reception control portion controls said extracting portion so as to extract an all audio data management table and store the same in an all audio data management table memory portion; as storage process of audio data after an all audio data management table has been stored in the all audio data management table memory portion, said reception control portion controls said extracting portion so as to extract an audio correspondence table and store the same in the audio correspondence table memory portion with an audio correspondence table identifier as an extracting condition; each time any one of audio correspondence tables is extracted from a multiplexed stream and stored in the audio correspondence table memory portion, said reception control portion reads out said audio correspondence table, and acquires an audio data identifier, audio stream identifier, reproduction start time, and reproduction termination time in order to control the extracting portion so as to extract an audio stream identifier with said video stream identifier as an extracting condition; those audio data of which reproduction time information of the extracted audio stream falls within the range of said reproduction start time and said reproduction termination time are stored in the audio memory portion as audio data corresponding to the audio data identifier; and said reception control portion repeats storage process of said audio data until storage of all audio data corresponding to the audio data identifier described in the all audio data management table has been completed.

4. A digital broadcast receiver which receives digital broadcast transmitting repeatedly a plurality of control information tables for implementing interactive processing with users and video image data corresponding to the control information tables;

said digital broadcast receiver characterized in that said digital broadcast data is a multiplexed stream; said video image data is included in either one video image stream or a plurality of video image streams multiplexed in a multiplexed stream; said video image data is provided with video image stream identification information of an identifier in the multiplexed stream of a video image stream in which video image data is included, and with reproduction time information for reproducing itself; each of said control information tables includes a control information table identifier showing that the table itself is a control information table in the multiplexed stream, a control information ID for uniquely identifying control information, and link information linking other video image data with corresponding video image data as well as operation video image data for promoting viewer operations and action information based on viewer operation; moreover, in said multiplexed stream, video image correspondence tables are multiplexed which are associated with corresponding video image data one to one; said video image correspondence table has descriptions of a video image correspondence table identifier showing that the table itself is a video image correspondence table in the multiplexed stream, of a video image data identifier for uniquely identifying corresponding video image data, of video image stream identification information, including corresponding video image data, and the reproduction start time and reproduction termination time of corresponding video image data, the video image correspondence tables being transmitted repeatedly as well as video image data; moreover, all video image data management tables are multiplexed in said multiplexed stream; said all video image data management table has descriptions of information relating to an all video image data management table identifier for showing the table to be an all video image data management table, and relating to a video image data identifier of all video image data included in a multiplexed stream, the all video image data management table being also repeatedly transmitted; moreover, all control information management tables are multiplexed in said multiplexed stream; said all control information management table has descriptions of information relating to an all control information management table identifier for showing the table to be an all control information management table, and relating to control information IDs of all control information tables included in a multiplexed stream, the all control information management tables being also repeatedly transmitted; said digital broadcast receiver comprises a receiving portion, an extracting portion, a reception control portion, and a memory portion; said receiving portion receives said multiplexed streams; said extracting portion comprises a video image stream extracting portion for extracting a video image data stream, consistent with set extracting conditions, from a multiplexed stream received at said receiving portion, a video image correspondence table extracting portion for extracting video image correspondence tables consistent with set extracting conditions, an all video image data management table extracting portion for extracting all video image data management tables consistent with set extracting conditions, a control information table extracting portion for extracting control information tables consistent with set extracting conditions, and an all control information management table extracting portion for extracting all control information management tables consistent with set extracting conditions; said memory portion comprises a video image data memory portion for storing video image data, an all video image data management table memory portion for storing all video image data management tables, a video image correspondence table memory portion for storing video image correspondence tables, a control information table memory portion for storing control information tables, and an all control information management table memory portion for storing all control information management tables; said reception control portion controls said receiving portion so as to receive multiplexed streams, and extract an all video image data management table and store the same in an all video image data management table memory portion with the all video image data management table identifier as an extracting condition as well as an extract of an all control information management table and store the same in an all control information management table memory portion with the all control information management table identifier as an extracting condition; the all video image data management table being stored in the all video image data management table memory portion; as storage process of video image data, said reception control portion controls said extracting portion so as to extract a video image correspondence table and store the same in the video image correspondence table memory portion with a video image correspondence table identifier as an extracting condition; each time a video image correspondence table is extracted from a multiplexed stream and stored in the video image correspondence table memory portion, said reception control portion reads out said video image correspondence table, and acquires a video image data identifier, video image stream identifier, reproduction start time, and reproduction termination time in order to control the extracting portion so as to extract a video image stream identifier with said video stream identifier as an extracting condition; those video image data of which reproduction time information of the extracted video image stream falls within the range of said reproduction start time and said reproduction termination time are stored in the video image memory portion as video image data corresponding to the video image data identifier; and said reception control portion repeats storage process of said video image data until storage of all video image data corresponding to the video image data identifier described in the all video image data management table has been completed; moreover, as storage process of control information tables, after an all control information management table has been stored in the all control information management table memory portion, said reception control portion controls said extracting portion so as to extract a control information table and store the same in the control information table memory portion with a control information table identifier as an extracting condition; and said reception control portion repeats storage process of said control information tables until storage of control information tables corresponding to all control information IDs described in the all control information management table has been completed.

5. A digital broadcast receiver which receives digital broadcast transmitting repeatedly a plurality of control information tables for implementing interactive processing with users, and video image data and audio data corresponding to the control information tables; said digital broadcast receiver characterized in that said digital broadcast data is a multiplexed stream; said video image data, said audio data, and said control information tables are included in said multiplexed stream; said video image data is included in either one video image stream or a plurality of video image streams multiplexed in a multiplexed stream; said audio data is included in a video image stream of either one audio stream or a plurality of audio streams multiplexed in a multiplexed stream; said video image data, said audio data, and said control information are transmitted as multiplexed streams; said video image data is provided with video image stream identification information of an identifier in the multiplexed stream of a video image stream in which video image data is included, and with reproduction time information for reproducing itself; said audio data is provided with audio stream identification information of an identifier in the multiplexed stream of an audio stream in which audio data is included, and with reproduction time information for reproducing itself; each of said control information tables includes a control information table identifier showing that the table itself is a control information table in the multiplexed stream, a control information ID for uniquely identifying control information, and link information linking other video image data with corresponding video image data as well as operation video image data for promoting viewer operations and action information based on viewer operation; moreover, in said multiplexed stream, video image correspondence tables are multiplexed which are associated with corresponding video image data one to one; said video image correspondence table has descriptions of a video image correspondence table identifier showing that the table itself is a video image correspondence table in the multiplexed stream, of a video image data identifier for uniquely identifying corresponding video image data, of video image stream identification information including corresponding video image data, and the reproduction start time and reproduction termination time of corresponding video image data, the video image correspondence tables being transmitted repeatedly as well as video image data; moreover, all video image data management tables are multiplexed in said multiplexed stream; said all video image data management tables have descriptions of information relating to an all video image data management table identifier for showing the table to be an all video image data management table, and relating to a video image data identifier of all video image data included in a multiplexed stream, the all video image data management table being also repeatedly transmitted; moreover, in said multiplexed stream, audio correspondence tables are multiplexed which are associated with corresponding audio data one to one; said audio correspondence table has descriptions of an audio correspondence table identifier showing that the table itself is an audio correspondence table in the multiplexed stream, of an audio data identifier for uniquely identifying corresponding audio data, of audio stream identification information including corresponding audio data, and the reproduction start time and reproduction termination time of corresponding audio data; the audio correspondence tables being transmitted repeatedly as well as audio data; moreover, all audio data management tables are multiplexed in said multiplexed stream; said all audio data management table has descriptions of information relating to an all video image data management table identifier for showing the table itself to be an all audio data management table in a multiplexed stream, and relating to an audio data identifier of all audio data included in a multiplexed stream, the all audio data management table being repeatedly transmitted; moreover, all control information management tables are multiplexed in said multiplexed stream; said all control information management table has descriptions of information relating to an all control information management table identifier for showing the table to be an all control information management table, and relating to control information IDs of all control information tables included in a multiplexed stream, the all control information management table being also repeatedly transmitted; said digital broadcast receiver comprises a receiving portion, an extracting portion, a reception control portion, and a memory portion; said receiving portion receives said multiplexed streams; said memory portion comprises a video image data memory portion for storing video image data, an audio data memory portion for storing audio data, an all video image data management table memory portion for storing all video image data management tables, a video image correspondence table memory portion for storing video image correspondence tables, an all audio data management table memory portion for storing all audio data management tables, an audio correspondence table memory portion for storing audio correspondence tables, a control information table memory portion for storing control information tables, and an all control information management table memory portion for storing all control information management tables; said extracting portion comprises a video image stream extracting portion for extracting a video image data stream, consistent with set extracting conditions, from a multiplexed stream received at said receiving portion, a video image correspondence table extracting portion for extracting video image correspondence tables consistent with set extracting conditions, an all video image data management table extracting portion for extracting all video image data management tables consistent with set extracting conditions, an audio data extracting portion for extracting an audio stream, consistent with set extracting conditions, from a multiplexed stream received at said receiving portion, an audio correspondence table extracting portion for extracting audio correspondence tables consistent with set extracting conditions, an all audio data management table extracting portion for extracting all audio data management tables consistent with set extracting conditions, a control information table extracting portion for extracting control information tables consistent with set extracting conditions, and an all control information management table extracting portion for extracting all control information management tables consistent with set extracting conditions; said reception control portion controls said receiving portion so as to receive multiplexed streams, extract an all video image data management table and store the same in an all video image data management table memory portion with the all video image data management table identifier as an extracting condition, as well as an extract of an all audio data management table and store the same in an all audio data management table memory portion with the all audio data management table identifier as an extracting condition, and as well as an extract of an all control information management table and store the same in an all control information management table memory portion with the all control information management table identifier as an extracting condition; as storage process of video image data after the all video image data management table has been stored in the all video image data management table memory portion, said reception control portion controls said extracting portion so as to extract a video image correspondence table and store the same in the video image correspondence table memory portion with a video image correspondence table identifier as an extracting condition; each time a video image correspondence table is extracted from a multiplexed stream and stored in the video image correspondence table memory portion, said reception control portion reads out said video image correspondence table, and acquires a video image data identifier, video image stream identifier, reproduction start time, and reproduction termination time in order to control the extracting portion so as to extract a video image stream identifier with said video stream identifier as an extracting condition; those video image data of which reproduction time information of the extracted video image stream falls within the range of said reproduction start time and said reproduction termination time are stored in the video image memory portion as video image data corresponding to the video image data identifier; and said reception control portion repeats storage process of said video image data until storage of all video image data corresponding to the video image data identifier stored in the all video image data management table has been completed; moreover, as storage process of audio data after an all audio data management table has been stored in the all audio data management table memory portion, said reception control portion controls said extracting portion so as to extract an audio correspondence table and store the same in the audio correspondence table memory portion with an audio correspondence table identifier as an extracting condition; each time any one of audio correspondence tables is extracted from a multiplexed stream and stored in the audio correspondence table memory portion, said reception control portion reads out said audio correspondence table, and acquires an audio data identifier, audio stream identifier, reproduction start time, and reproduction termination time in order to control the extracting portion so as to extract an audio stream identifier with said video stream identifier as an extracting condition; those audio data of which reproduction time information of the extracted audio stream falls within the range of said reproduction start time and said reproduction termination time are stored in the audio memory portion as audio data corresponding to the audio data identifier; and said reception control portion repeats storage process of said video image data until storage of all video image data corresponding to all audio data identifiers stored in the all audio data management table has been completed; moreover, as storage process of control information tables after the all control information management table has been stored in the all control information management table memory portion, said reception control portion controls said extracting portion so as to extract a control information table and store the same in the control information table memory portion with a control information table identifier as an extracting condition; and said reception control portion repeats storage process of said control information tables until storage of control information tables corresponding to all control information IDs described in the all control information management table has been completed.

6. A digital broadcast receiver which receives digital broadcast transmitting repeatedly a plurality of video image data, the digital broadcast receiver characterized in that said digital broadcast data is a multiplexed stream; said video image data is included in either one video image stream or a plurality of video image streams multiplexed in a multiplexed stream; said video image data is provided with video image stream identification information of an identifier in the multiplexed stream of a video image stream in which audio data is included, and with reproduction time information for reproducing itself; moreover, in said multiplexed stream, audio correspondence tables are multiplexed which are associated with corresponding video image data one to one; said video image correspondence table has descriptions of a video image correspondence table identifier showing that the table itself is a video image correspondence table in the multiplexed stream, of a video image data identifier for uniquely identifying corresponding video image data, of video image stream identification information including corresponding video image data, and the reproduction start time and reproduction termination time of corresponding video image data; the video image correspondence tables being transmitted repeatedly as well as video image data; moreover, all video image data management tables are multiplexed in said multiplexed stream; said all video image data management table has descriptions of information relating to an all video image data management table identifier for identifying the table itself to be an all video image data management table in a multiplexed stream, and relating to a video image data identifier of all video image data included in a multiplexed stream, the all video image data management table being repeatedly transmitted; said digital broadcast receiver comprises a receiving portion, a reproducing portion, an operation control portion, an extracting portion, a reception control portion, a display portion, and a memory portion; said receiving portion receives said multiplexed streams; said memory portion comprises a video image data memory portion for storing video image data, an all video image data management table memory portion for storing all video image data management tables, and a video image correspondence table memory portion for storing video image correspondence tables; said extracting portion comprises a video image stream extracting portion for extracting a video image stream, consistent with set extracting conditions, from a multiplexed stream received at said receiving portion, a video image correspondence table extracting portion for extracting video image correspondence tables consistent with set extracting conditions, and an all video image data management table extracting portion for extracting all video image data management tables consistent with set extracting conditions; said reception control portion controls said receiving portion so as to receive multiplexed streams, and with the all video image data management table identifier as an extracting condition, said reception control portion controls said extracting portion so as to extract an all video image data management table and store the same in an all video image data management table memory portion; as storage process of video image data after an all video image data management table has been stored in the all video image data management table memory portion, said reception control portion controls said extracting portion so as to extract a video image correspondence table and store the same in the video image correspondence table memory portion with a video image correspondence table identifier as an extracting condition; each time any one of video image correspondence tables is extracted from a multiplexed stream and stored in the video image correspondence table memory portion, said reception control portion reads out said video image correspondence table, and acquires a video image data identifier, video image stream identifier, reproduction start time, and reproduction termination time in order to control the extracting portion so as to extract a video image stream identifier with said video stream identifier as an extracting condition; those video image data of which reproduction time information of the extracted video image stream falls within the range of said reproduction start time and said reproduction termination time are stored in the video image memory portion as video image data corresponding to the video image data identifier; and said reception control portion repeats storage process of said video image data until storage of all video image data corresponding to the video image data identifier described in the all video image data management table has been completed; said operation control portion controls reproduction selecting operation of video image data, performed by viewer-designated specific video image data identifiers; when said operation control portion selects reproduction of video image data, said reproducing portion reads video image data corresponding to video image data associated therewith from said video image data memory portion and reproduces the same; and said display portion displays the video image data reproduced by said reproducing portion.

7. The receiver characterized in that said all video image data management table has also a list of access information for making video image data reproducible; said reproducing portion comprises also a clock portion for clocking; selecting the reproduction of video image data by said operation control portion causes said reproducing portion to acquire current time from the clock portion, then read expiration date information which is reproducible and listed in the all video image data management table stored in said all video image data management table memory portion, and then read video image data corresponding to the video image data identifier associated therewith from said video image data memory portion and reproduce the same only when said current time falls within the range of said expiration date information.

8. The receiver characterized in that said all video image correspondence table has also a list of expiration date information for making corresponding video image data reproducible; said reproducing portion comprises also a clock portion for clocking; selecting the reproduction of video image data by said operation control portion causes said reproducing portion to acquire current time from the clock portion, then read expiration date information in the video image correspondence table corresponding to said selected video image data from the video image correspondence table memory portion, and then read video image data corresponding to the video image data identifier associated therewith from said video image data memory portion and reproduce the same only when said current time falls within the range of said expiration date information.

9. A digital broadcast receiver which receives digital broadcast transmitting repeatedly a plurality of audio data, the digital broadcast receiver characterized in that said digital broadcast data is a multiplexed stream; said audio data is included in either one audio stream or a plurality of audio streams multiplexed in a multiplexed stream; said audio data is provided with audio stream identification information of an identifier in the multiplexed stream of an audio stream in which audio data is included, and with reproduction time information for reproducing itself; moreover, in said multiplexed stream, audio correspondence tables are multiplexed which are associated with corresponding audio data one to one; said audio correspondence table has descriptions of an audio correspondence table identifier showing that the table itself is an audio correspondence table in the multiplexed stream, of an audio data identifier for uniquely identifying corresponding audio data, of audio stream identification information including corresponding audio data, and the reproduction start time and reproduction termination time of corresponding audio data; the audio correspondence tables being transmitted repeatedly as well as audio data; moreover, all audio data management tables are multiplexed in said multiplexed stream; said all audio data management table has descriptions of information relating to an all video image data management table identifier for identifying itself to be an all audio data management table in a multiplexed stream, and relating to an audio data identifier of all audio data included in a multiplexed stream, the all audio data management table being repeatedly transmitted; said digital broadcast receiver comprises a receiving portion, a reproducing portion, an operation control portion, an extracting portion, a reception control portion, an audio output portion, and a memory portion; said receiving portion receives said multiplexed streams; said memory portion comprises an audio data memory portion for storing audio data, an all audio data management table memory portion for storing all audio data management tables, and an audio correspondence table memory portion for storing audio correspondence tables; said extracting portion comprises an audio stream extracting portion for extracting an audio stream, consistent with set extracting conditions, from a multiplexed stream received at said receiving portion, an audio correspondence table extracting portion for extracting audio correspondence tables consistent with set extracting conditions, and an all audio data management table extracting portion for extracting all audio data management tables consistent with set extracting conditions; said reception control portion controls said receiving portion so as to receive multiplexed streams, and with the all audio data management table identifier as an extracting condition, said reception control portion controls said extracting portion so as to extract an all audio data management table and stores the same in an all audio data management table memory portion; as storage process of audio data after the all audio data management table has been stored in the all audio data management table memory portion, said reception control portion controls said extracting portion so as to extract an audio correspondence table and stores the same in the audio correspondence table memory portion with an audio correspondence table identifier as an extracting condition; each time any one of audio correspondence tables is extracted from a multiplexed stream and stored in the audio correspondence table memory portion, said reception control portion reads out said audio correspondence table, and acquires an audio data identifier, audio stream identifiers, reproduction start times, and reproduction termination times in order to control the extracting portion so as to extract an audio stream identifier with said video stream identifier as an extracting condition; those audio data of which reproduction time information of the extracted audio stream falls within the range of said reproduction start times and said reproduction termination times are stored in the audio memory portion as audio data corresponding to the audio data identifier; said reception control portion repeats storage process of said audio data until storage of all audio data corresponding to the audio data identifier described in the all audio data management table has been completed; said operation control portion controls reproduction selecting operation of audio data, performed by viewer-designated specific audio data identifiers; when said operation control portion selects reproduction of audio data, said reproducing portion reads audio data corresponding to audio data associated therewith from said audio data memory portion and reproduces the same; and said audio output portion outputs the audio data reproduced by said reproducing portion.

10. A digital broadcast receiver which receives digital broadcast transmitting repeatedly a plurality of control information tables for implementing interactive processing with users and video image data corresponding to the control information tables;

said digital broadcast receiver characterized in that said video image data and control information are transmitted as multiplexed streams; said video image data is provided with video image stream identification information of an identifier in the multiplexed stream of a video image stream in which video image data is included, and with reproduction time information for reproducing itself; each of said control information tables includes a control information table identifier showing that the table itself is a control information table in the multiplexed stream, a control information ID for uniquely identifying control information, and link information linking other video image data with corresponding video image data as well as operation video image data for promoting viewer operations and action information based on viewer operation; moreover, in said multiplexed stream, video image correspondence tables are multiplexed which are associated with corresponding video image data one to one; said video image correspondence table has descriptions of a video image correspondence table identifier showing that the table itself is a video image correspondence table in the multiplexed stream, of a video image data identifier for uniquely identifying corresponding video image data, of video image stream identification information including corresponding video image data, and the reproduction start times and reproduction termination times of corresponding video image data, the video image correspondence tables being transmitted repeatedly as well as video image data; moreover, all video image data management tables are multiplexed in said multiplexed stream; said all video image data management table has descriptions of information relating to an all video image data management table identifier for showing the table to be an all video image data management table, and relating to a video image data identifier of all video image data included in a multiplexed stream, the all video image data management table being also repeatedly transmitted; moreover, all control information management tables are multiplexed in said multiplexed stream; said all control information management table has descriptions of information relating to an all control information management table identifier for showing the table to be an all control information management table, and relating to control information IDs of all control information tables included in a multiplexed stream, the all control information management table being also repeatedly transmitted; said digital broadcast receiver comprises a receiving portion, a reproducing portion, an operation control portion, an extracting portion, a reception control portion, a display portion, an audio output portion, and a memory portion; said receiving portion receives said multiplexed streams; said extracting portion comprises a video image stream extracting portion for extracting a video image data stream, consistent with set extracting conditions, from a multiplexed stream received at said receiving portion, a video image correspondence table extracting portion for extracting video image correspondence tables consistent with set extracting conditions, an all video image data management table extracting portion for extracting all video image data management tables consistent with set extracting conditions, a control information table extracting portion for extracting control information tables consistent with set extracting conditions, and an all control information management table extracting portion for extracting all control information management tables consistent with set extracting conditions; said memory portion comprises a video image data memory portion for storing video image data, an all video image data management table memory portion for storing all video image data management tables, a video image correspondence table memory portion for storing video image correspondence tables, a control information table memory portion for storing control information tables, and an all control information management table memory portion for storing all control information management tables; said reception control portion controls said receiving portion so as to receive multiplexed streams, and extracts an all video image data management table and stores the same in an all video image data management table memory portion with the all video image data management table identifier as an extracting condition as well as extracts an all control information management table and stores the same in an all control information management table memory portion with the all control information management table identifier as an extracting condition; the all video image data management table being stored in the all video image data management table memory portion; as storage process of video image data, said reception control portion controls said extracting portion so as to extract a video image correspondence table and stores the same in the video image correspondence table memory portion with a video image correspondence table identifier as an extracting condition; each time a video image correspondence table is extracted from a multiplexed stream and stored in the video image correspondence table memory portion, said reception control portion reads out said video image correspondence table, and acquires a video image data identifier, video image stream identifier, reproduction start times, and reproduction termination times in order to control the extracting portion so as to extract a video image stream identifier with said video stream identifier as an extracting condition; those video image data of which reproduction time information of the extracted video image stream falls within the range of said reproduction start times and said reproduction termination times are stored in the video image memory portion as video image data corresponding to the video image data identifier; and said reception control portion repeats storage process of said video image data until storage of all video image data corresponding to the video image data identifier described in the all video image data management table has been completed; moreover, as storage process of control information tables after an all control information management table has been stored in the all control information management table memory portion, said reception control portion controls said extracting portion so as to extract a control information table and store the same in the control information table memory portion with a control information table identifier as an extracting condition; said reception control portion repeats storage process of said control information tables until storage of control information tables corresponding to all control information IDs described in the all control information management table has been completed; said operation control portion controls reproduction selecting operation of video image data and control information tables, performed by a viewer-designated specific video image data identifier and control information ID; said reproducing portion reads the video image data associated with the video image data identifier selected for reproduction from said video image data memory portion and reproduces the same, and reads the control information table associated with the control information ID selected for reproduction from said control information table and reproduces an operation screen data in the control information table; and said display portion combines the video image data reproduced by said reproducing portion with the operation screen data in order to display the same.

11. A digital broadcast receiver which receives digital broadcast transmitting repeatedly a plurality of control information tables for implementing interactive processing with users, and video image data and audio data corresponding to the control information tables;

said digital broadcast receiver characterized in that said video image data, said audio data, and said control information are transmitted as multiplexed streams; said video image data is provided with video image stream identification information of an identifier in the multiplexed stream of a video image stream in which video image data is included, and with reproduction time information for reproducing itself; said audio data is provided with audio stream identification information of an identifier in the multiplexed stream of an audio stream in which audio data is included, and with reproduction time information for reproducing itself; each of said control information tables includes a control information table identifier showing that the table itself is a control information table in the multiplexed stream, a control information ID for uniquely identifying control information, and link information linking other video image data with corresponding video image data as well as operation video image data for promoting viewer operations and action information based on viewer operation; moreover, in said multiplexed stream, video image correspondence tables are multiplexed which are associated with corresponding video image data one to one; said video image correspondence table has descriptions of a video image correspondence table identifier showing that the table itself is a video image correspondence table in the multiplexed stream, of a video image data identifier for uniquely identifying corresponding video image data, of video image stream identification information including corresponding video image data, and the reproduction start times and reproduction termination times of corresponding video image data, the video image correspondence tables being transmitted repeatedly as well as video image data; moreover, all video image data management tables are multiplexed in said multiplexed stream; said all video image data management table has descriptions of information relating to an all video image data management table identifier for showing the table to be an all video image data management table, and relating to a video image data identifier of all video image data included in a multiplexed stream, the all video image data management table being also repeatedly transmitted; moreover, in said multiplexed stream, audio correspondence tables are multiplexed which are associated with corresponding audio data one to one; said audio correspondence table has descriptions of an audio correspondence table identifier showing that the table itself is an audio correspondence table in the multiplexed stream, of an audio data identifier for uniquely identifying corresponding audio data, of audio stream identification information including corresponding audio data, and the reproduction start times and reproduction termination times of corresponding audio data; the audio correspondence tables being transmitted repeatedly as well as audio data; moreover, all audio data management tables are multiplexed in said multiplexed stream; said all audio data management table has descriptions of information relating to an all video image data management table identifier for showing the table itself to be an all audio data management table in a multiplexed stream, and relating to an audio data identifier of all audio data included in a multiplexed stream, the all audio data management table being repeatedly transmitted; moreover, all control information management tables are multiplexed in said multiplexed stream; said all control information management table has descriptions of information relating to an all control information management table identifier for showing the table to be an all control information management table, and relating to control information IDs of all control information tables included in a multiplexed stream, the all control information management table being also repeatedly transmitted; said digital broadcast receiver comprises a receiving portion, a reproducing portion, an operation control portion, an extracting portion, a reception control portion, a display portion, and a memory portion; said receiving portion receives said multiplexed streams; said memory portion comprises a video image data memory portion for storing video image data, an audio data memory portion for storing audio data, an all video image data management table memory portion for storing all video image data management tables, a video image correspondence table memory portion for storing video image correspondence tables, an all audio data management table memory portion for storing all audio data management tables, an audio correspondence table memory portion for storing audio correspondence tables, a control information table memory portion for storing control information tables, and an all control information management table memory portion for storing all control information management tables; said extracting portion comprises a video image stream extracting portion for extracting a video image data stream, consistent with set extracting conditions, from a multiplexed stream received at said receiving portion, a video image correspondence table extracting portion for extracting video image correspondence tables consistent with set extracting conditions, an all video image data management table extracting portion for extracting all video image data management tables consistent with set extracting conditions, an audio data extracting portion for extracting an audio stream, consistent with set extracting conditions, from a multiplexed stream received at said receiving portion, an audio correspondence table extracting portion for extracting audio correspondence tables consistent with set extracting conditions, an all audio data management table extracting portion for extracting all audio data management tables consistent with set extracting conditions, a control information table extracting portion for extracting control information tables consistent with set extracting conditions, and an all control information management table extracting portion for extracting all control information management tables consistent with set extracting conditions; said reception control portion controls said receiving portion so as to receive multiplexed streams, extract an all video image data management table and store the same in an all video image data management table memory portion with the all video image data management table identifier as an extracting condition, as well as an extract of an all audio data management table and store the same in an all audio data management table memory portion with the all audio data management table identifier as an extracting condition, and as well as an extract of an all control information management table and store the same in an all control information management table memory portion with the all control information management table identifier as an extracting condition; as storage process of video image data after the all video image data management table has been stored in the all video image data management table memory portion, said reception control portion controls said extracting portion so as to extract a video image correspondence table and stores the same in the video image correspondence table memory portion with a video image correspondence table identifier as an extracting condition; each time a video image correspondence table is extracted from a multiplexed stream and stored in the video image correspondence table memory portion, said reception control portion reads out said video image correspondence table, and acquires a video image data identifier, video image stream identifier, reproduction start time, and reproduction termination time in order to control the extracting portion so as to extract a video image stream identifier with said video stream identifier as an extracting condition; those video image data of which reproduction time information of the extracted video image stream falls within the range of said reproduction start times and said reproduction termination times are stored in the video image memory portion as video image data corresponding to the video image data identifier; and said reception control portion repeats storage process of said video image data until storage of all video image data corresponding to the video image data identifier stored in the all video image data management table has been completed; moreover, as storage process of audio data after an all audio data management table has been stored in the all audio data management table memory portion, said reception control portion controls said extracting portion so as to extract an audio correspondence table and stores the same in the audio correspondence table memory portion with an audio correspondence table identifier as an extracting condition; each time any one of the audio correspondence tables is extracted from a multiplexed stream and stored in the audio correspondence table memory portion, said reception control portion reads out said audio correspondence table, and acquires an audio data identifier, audio stream identifier, reproduction start time, and reproduction termination time in order to control the extracting portion so as to extract an audio stream identifier with said video stream identifier as an extracting condition; those audio data of which reproduction time information of the extracted audio stream falls within the range of said reproduction start times and said reproduction termination times are stored in the audio memory portion as audio data corresponding to the audio data identifier; and said reception control portion repeats storage process of said video image data until storage of all video image data corresponding to all audio data identifiers stored in the all audio data management table has been completed; moreover, as storage process of control information tables after the all control information management table has been stored in the all control information management table memory portion, said reception control portion controls said extracting portion so as to extract a control information table and store the same in the control information table memory portion with a control information table identifier as an extracting condition; said reception control portion repeats storage process of said control information tables until storage of control information tables corresponding to all control information IDs described in the all control information management table has been completed; said operation control portion controls reproduction selecting operation of video image data, audio data, and control information tables, performed by a viewer-designated specific video image data identifier, audio data identifier, and control information ID; said reproducing portion reads the video image data associated with the video image data identifier selected for reproduction from said video image data memory portion and reproduces the same, reads the audio data associated with the audio data identifier selected for reproduction from said audio data memory portion and reproduces the same, and reads the control information table associated with the control information ID selected for reproduction from said control information table and reproduces an operation screen data in the control information table; said display portion combines the video image data reproduced by said reproducing portion with the operation screen data in order to display the same; and said audio output portion outputs the audio data reproduced by said reproducing portion.

12. A digital broadcast receiver which receives digital broadcast transmitting repeatedly a plurality of control information tables for implementing interactive processing with users and video image data corresponding to the control information tables;

said digital broadcast receiver characterized in that said video image data and control information are transmitted as multiplexed streams; said video image data is provided with video image stream identification information of an identifier in the multiplexed stream of a video image stream in which video image data is included, and with reproduction time information for reproducing itself; each of said control information tables includes a control information table identifier showing that the table itself is a control information table in the multiplexed stream, a control information ID for uniquely identifying control information, and link information linking other video image data with corresponding video image data as well as operation video image data for promoting viewer operations and action information based on viewer operation; moreover, in said multiplexed stream, video image correspondence tables are multiplexed which are associated with corresponding video image data one to one; said video image correspondence table has descriptions of a video image correspondence table identifier showing that the table itself is a video image correspondence table in the multiplexed stream, of a video image data identifier for uniquely identifying corresponding video image data, of video image stream identification information including corresponding video image data, and the reproduction start time and reproduction termination time of corresponding video image data, the video image correspondence tables being transmitted repeatedly as well as video image data; moreover, all video image data management tables are multiplexed in said multiplexed stream; said all video image data management table has descriptions of information relating to an all video image data management table identifier for showing the table to be an all video image data management table, and relating to a video image data identifier of all video image data included in a multiplexed stream, the all video image data management table being also repeatedly transmitted; moreover, all control information management tables are multiplexed in said multiplexed stream; said all control information management table has descriptions of information relating to an all control information management table identifier for showing the table to be an all control information management table, and relating to control information IDs of all control information tables included in a multiplexed stream, the all control information management table being also repeatedly transmitted; said digital broadcast receiver comprises a receiving portion, an extracting portion, an operation control portion, a reproducing portion, a reception control portion, and a memory portion; said operation control portion receives viewer operations for selecting reception and storage of streams or reception and reproduction, and also receives operations for selecting a video image data identifier and control information table identifier as a pair of video image data and control information to be reproduced in the case of receiving operation for selecting reception and reproduction; said receiving portion receives said multiplexed streams; said memory portion comprises a video image data memory portion for storing video image data, an all video image data management table memory portion for storing all video image data management tables, a video image correspondence table memory portion for storing video image correspondence tables, a control information table memory portion for storing control information tables, and an all control information management table memory portion for storing all control information management tables; said reception control portion controls, in the case of having received viewer operation for selecting reception and storage of the stream, said receiving portion so as to receive a multiplexed stream, extract an all video image data management table and store the same in an all video image data management table memory portion with the all video image data management table identifier as an extracting condition as well as extract an all control information management table and store the same in an all control information management table memory portion with the all control information management table identifier as an extracting condition; the all video image data management table being stored in the all video image data management table memory portion; as storage process of video image data, said reception control portion controls said extracting portion so as to extract a video image correspondence table and store the same in the video image correspondence table memory portion with a video image correspondence table identifier as an extracting condition; each time a video image correspondence table is extracted from a multiplexed stream and stored in the video image correspondence table memory portion, said reception control portion reads out said video image correspondence table, and acquires a video image data identifier, video image stream identifier, reproduction start time, and reproduction termination time in order to control the extracting portion so as to extract a video image stream identifier with said video stream identifier as an extracting condition; those video image data of which reproduction time information of the extracted video image stream falls within the range of said reproduction start time and said reproduction termination time are stored in the video image memory portion as video image data corresponding to the video image data identifier; said reception control portion repeats storage process of said video image data until storage of all video image data corresponding to the video image data identifier described in the all video image data management table has been completed; moreover, as storage process of control information tables after an all control information management table has been stored in the all control information management table memory portion, said reception control portion controls said extracting portion so as to extract a control information table and stores the same in the control information table memory portion with a control information table identifier as an extracting condition; said reception control portion repeats storage process of said control information tables until storage of control information tables corresponding to all control information IDs described in the all control information management table has been completed; moreover, said reception control portion controls, in the case of having received viewer operations for selecting reception and storage of the stream, said receiving portion so as to receive a multiplexed stream, extract an all video image data management table and store the same in an all video image data management table memory portion with the all video image data management table identifier as an extracting condition as well as an extract of an all control information management table and store the same in an all control information management table memory portion with the all control information management table identifier as an extracting condition; the all video image data management table being stored in the all video image data management table memory portion; as reproducing processing of video image data, said reception control portion controls said extracting portion so as to extract a video image correspondence table corresponding to the specified video image data identifier and store the same in the video image correspondence table memory portion with a video image correspondence table identifier as an extracting condition; each time a video image correspondence table is extracted from a multiplexed stream and stored in the video image correspondence table memory portion, said reception control portion reads out said video image correspondence table, and acquires a video image data identifier, video image stream identifier, reproduction start time, and reproduction termination time in order to control the extracting portion so as to extract a video image stream identifier with said video stream identifier as an extracting condition; said reproducing portion reproduces only those video image data of which reproduction time information of the extracted video image stream falls within the range of said reproduction start times and said reproduction termination times; moreover, as reproducing processing of control information tables after an all control information management table has been stored in the all control information management table memory portion, said reception control portion controls said extracting portion so as to extract the specified control information table and store the same in the control information table memory portion with a control information table identifier and control information ID as extracting conditions; when the control information table has been stored in the control information table memory portion, said reproducing portion reproduces an operation screen data in the control information table; and said display portion combines the video image data reproduced by said reproducing portion with the operation screen data in order to display the same.

13. A receiver characterized in that in the case where said operation control portion receives user operations for selecting reception and reproduction of a stream, and a video image data identifier and control information ID of a pair of video image data to be reproduced and control information are not specified, reception and reproduction are performed assuming that the video image data identifier first described in said all video image data management table and the control information ID first described in said all control information table have been specified.

14. A receiver characterized in that when said operation control portion receives user operations for selecting reception and reproduction of a stream and when video image data corresponding to the specified video image data identifier has already been stored in said video image data memory portion, said reception control portion does not perform extracting processing of the corresponding video image data from the multiplexed stream; said reproducing portion reproduces video image data stored in said video image data memory portion; and, moreover, when the control information table corresponding to the specified control information ID has been stored in said control information table memory portion, said reception control portion does not perform extracting processing of the corresponding control information table from the multiplexed stream, and said reproducing portion reproduces operation screen data in the control information table stored in said control information table memory portion.

15. A receiver characterized in that expiration date information allowing for making video image data reproducible is further described in said all video image data management table; expiration date information allowing for making control information tables reproducible is further described in said all control information management table; said reproducing portion further has a clock portion for clocking; when said operation control portion receives user operations for selecting reception and reproduction of a stream, when the video image data corresponding to the specified video image data identifier has already been stored in said video image data memory portion, and moreover, when said operation control portion acquires current time from the clock portion and reads reproducible expiration date information described in the all video image data management table stored in said all video image data management table memory portion to find that said current time falls within the range of said expiration date information, said reception control portion does not perform extracting processing of the corresponding video image data from the multiplexed stream, and said reproducing portion reproduces video image data stored in said video image data memory portion; moreover, when the control information table corresponding to the specified control information ID has been stored in said control information table memory portion and when said operation control portion acquires current time from the clock portion and reads reproducible expiration date information described in the all control information management table stored in said all control information management table memory portion to find that said current time falls within the range of said expiration date information, said reception control portion does not perform extracting processing of the corresponding control information table from the multiplexed stream, and said reproducing portion reproduces operation screen data in the control information table stored in said control information table memory portion.

16. A receiver characterized in that expiration date information allowing for making corresponding video image data reproducible is further described in said video image correspondence table; further in said control information table, expiration date information allowing for making control information tables reproducible is described; said reproducing portion further has a clock portion for clocking; when said operation control portion receives user operations for selecting reception and reproduction of a stream, when the video image data corresponding to the specified video image data identifier has already been stored in said video image data memory portion, and moreover, when said operation control portion acquires current time from the clock portion and reads reproducible expiration date information described in the video image correspondence table corresponding to video image data identifiers stored in said video image correspondence table memory portion to find that said current time falls within the range of said expiration date information, said reception control portion does not perform extracting processing of the corresponding video image data from the multiplexed stream, and said reproducing portion reproduces video image data stored in said video image data memory portion; moreover, when the control information table corresponding to the specified control information ID has been stored in said control information table memory portion and when said operation control portion acquires current time from the clock portion and reads reproducible expiration date information described in said control information management table corresponding to control information IDs stored in said control information table memory portion to find that said current time falls within the range of said expiration date information, said reception control portion does not perform extracting processing of the corresponding control information table from the multiplexed stream, and said reproducing portion reproduces operation screen data in the control information table stored in said control information table memory portion.

17. A receiver characterized in that version information of video image data is further described in said all video image data management table; version information of control information tables is further described in said all control information management table; when said operation control portion receives user operations for selecting reception and reproduction of a stream, when the video image data corresponding to the specified video image data identifier has already been stored in said video image data memory portion, and moreover, when the extracted version information of the all video image data management table is consistent with the version information stored in the all video image data management table memory portion, said reception control portion does not perform extracting processing of the corresponding video image data from the multiplexed stream, and said reproducing portion reproduces video image data stored in said video image data memory portion; and, moreover, when the control information table corresponding to the specified control information ID has been stored in said control information table memory portion and when the extracted version information of the all control information management table is consistent with the version information stored in the all control information management table memory portion, said reception control portion does not perform extracting processing of the corresponding video image correspondence table from the multiplexed stream, and said reproducing portion reproduces operation screen data in the control information table stored in said control information table memory portion.

18. A digital broadcast system for transmitting repeatedly a plurality of video image data comprises the following digital broadcast transmitter and digital broadcast receiver, characterized in that said digital broadcast transmitter comprises a transmitting means which multiplexes and transmits repeatedly, as multiplexed streams, a plurality of video image data, video image correspondence tables corresponding to video image data, and all video image data management tables; said video image data is included in any one of or a plurality of video image streams; said video image data is provided with video image stream identification information of an identifier in the multiplexed stream of a video image stream in which the video image data is included, and with reproduction time information for reproducing itself; said video image correspondence table has descriptions of a video image correspondence table identifier showing that the table itself is a video image correspondence table in the multiplexed stream, of a video image data identifier for uniquely identifying corresponding video image data, of video image stream identification information including corresponding video image data, and the reproduction start time and reproduction termination time of corresponding video image data; said all video image data management table has descriptions of information relating to an all video image data management table identifier for identifying the table itself to be an all video image data management table in a multiplexed stream, and relating to a video image data identifier of all video image data included in the multiplexed stream;

said digital broadcast receiver comprises a receiving portion, an extracting portion, a reception control portion, and a memory portion; said receiving portion receives said multiplexed streams; said memory portion comprises a video image data memory portion for storing video image data, an all video image data management table memory portion for storing all video image data management tables, and a video image correspondence table memory portion for storing video image correspondence tables; said extracting portion comprises a video image stream extracting portion for extracting a video image data stream, consistent with set extracting conditions, from a multiplexed stream received at said receiving portion, a video image correspondence table extracting portion for extracting video image correspondence tables consistent with set extracting conditions, and an all video image data management table extracting portion for extracting all video image data management tables consistent with set extracting conditions; said reception control portion controls said receiving portion so as to receive multiplexed streams, and with the all video image data management table identifier as an extracting condition, said reception control portion controls said extracting portion so as to extract an all video image data management table and store the same in an all video image data management table memory portion; as storage process of video image data after an all video image data management table has been stored in the all video image data management table memory portion, said reception control portion controls said extracting portion so as to extract a video image correspondence table and store the same in the video image correspondence table memory portion with a video image correspondence table identifier as an extracting condition; each time any one of video image correspondence tables is extracted from a multiplexed stream and stored in the video image correspondence table memory portion, said reception control portion reads out said video image correspondence table, and acquires a video image data identifier, video image stream identifier, reproduction start time, and reproduction termination time in order to control the extracting portion so as to extract a video image stream identifier with said video stream identifier as an extracting condition; those video image data of which reproduction time information of the extracted video image stream falls within the range of said reproduction start times and said reproduction termination times are stored in the video image memory portion as video image data corresponding to the video image data identifier; and said reception control portion repeats storage process of said video image data until storage of all video image data corresponding to the video image data identifier described in the all video image data management table has been completed.

19. A digital broadcast system for transmitting repeatedly a plurality of control information tables for implementing interactive processing with users and a plurality of video image data corresponding to said control information tables comprises the following digital broadcast transmitter and digital broadcast receiver, characterized in that said digital broadcast transmitter comprises a transmitting means which multiplexes and transmits repeatedly, as multiplexed streams, a plurality of video image data, video image correspondence tables corresponding to the video image data, all video image data management tables, a plurality of audio data, audio correspondence tables corresponding to the audio data, all audio data management tables, said control information tables, and all control information management tables; said video image data is provided with video image stream identification information of an identifier in the multiplexed stream of a video image stream in which the video image data is included, and with reproduction time information for reproducing itself; each of said control information tables includes a control information table identifier showing that the table itself is a control information table in the multiplexed stream, a control information ID for uniquely identifying control information, and link information linking other video image data with corresponding video image data as well as operation video image data for promoting viewer operations and action information based on viewer operation; said video image correspondence table has descriptions of a video image correspondence table identifier showing that the table itself is a video image correspondence table in the multiplexed stream, of a video image data identifier for uniquely identifying corresponding video image data, of video image stream identification information including corresponding video image data, and the reproduction start time and reproduction termination time of corresponding video image data, the video image correspondence tables being transmitted repeatedly as well as video image data; said all video image data management table has descriptions of information relating to an all video image data management table identifier for showing the table to be an all video image data management table, and relating to a video image data identifier of all video image data included in a multiplexed stream, the all video image data management table being also repeatedly transmitted; said all control information management table has descriptions of information relating to an all control information management table identifier for showing the table to be an all control information management table, and relating to control information IDs of all control information tables included in a multiplexed stream, the all control information management table being also repeatedly transmitted; said digital broadcast receiver comprises a receiving portion, an extracting portion, an operation control portion, a reproducing portion, a reception control portion, and a memory portion; said operation control portion receives viewer operations for selecting reception and storage of streams or reception and reproduction, and also receives operations for selecting a video image data identifier and control information table identifier as a pair of video image data and control information to be reproduced in the case of receiving operations for selecting reception and reproduction; said receiving portion receives said multiplexed streams; said memory portion comprises a video image data memory portion for storing video image data, an all video image data management table memory portion for storing all video image data management tables, a video image correspondence table memory portion for storing video image correspondence tables, a control information table memory portion for storing control information tables, and an all control information management table memory portion for storing all control information management tables; said reception control portion controls, in the case of having received viewer operations for selecting reception and storage of the stream, said receiving portion so as to receive a multiplexed stream, extract an all video image data management table and store the same in an all video image data management table memory portion with the all video image data management table identifier as an extracting condition as well as an extract of an all control information management table and stores the same in an all control information management table memory portion with the all control information management table identifier as an extracting condition; the all video image data management table being stored in the all video image data management table memory portion; as storage process of video image data, said reception control portion controls said extracting portion so as to extract a video image correspondence table and store the same in the video image correspondence table memory portion with a video image correspondence table identifier as an extracting condition; each time a video image correspondence table is extracted from a multiplexed stream and stored in the video image correspondence table memory portion, said reception control portion reads out said video image correspondence table, and acquires a video image data identifier, video image stream identifier, reproduction start times, and reproduction termination times in order to control the extracting portion so as to extract a video image stream identifier with said video stream identifier as an extracting condition; those video image data of which reproduction time information of the extracted video image stream falls within the range of said reproduction start times and said reproduction termination times are stored in the video image memory portion as video image data corresponding to the video image data identifier; said reception control portion repeats storage process of said video image data until storage of all video image data corresponding to the video image data identifier described in the all video image data management table has been completed; moreover, as storage process of control information tables after an all control information management table has been stored in the all control information management table memory portion, said reception control portion controls said extracting portion so as to extract a control information table and stores the same in the control information table memory portion with a control information table identifier as an extracting condition; said reception control portion repeats storage process of said control information tables until storage of control information tables corresponding to all control information IDs described in the all control information management table has been completed; moreover, said reception control portion controls, in the case of having received viewer operations for selecting reception and storage of the stream, said receiving portion so as to receive a multiplexed stream, extract an all video image data management table and store the same in an all video image data management table memory portion with the all video image data management table identifier as an extracting condition as well as an extract of an all control information management table and store the same in an all control information management table memory portion with the all control information management table identifier as an extracting condition; the all video image data management table being stored in the all video image data management table memory portion; as reproducing processing of video image data, said reception control portion controls said extracting portion so as to extract a video image correspondence table corresponding to the specified video image data identifier and store the same in the video image correspondence table memory portion with a video image correspondence table identifier as an extracting condition; each time a video image correspondence table is extracted from a multiplexed stream and stored in the video image correspondence table memory portion, said reception control portion reads out said video image correspondence table, and acquires a video image data identifier, video image stream identifier, reproduction start time, and reproduction termination time in order to control the extracting portion so as to extract a video image stream identifier with said video stream identifier as an extracting condition; said reproducing portion reproduces only those video image data of which reproduction time information of the extracted video image stream falls within the range of said reproduction start times and said reproduction termination times; moreover, as reproducing processing of control information tables after an all control information management table has been stored in the all control information management table memory portion, said reception control portion controls said extracting portion so as to extract the specified control information table and store the same in the control information table memory portion with a control information table identifier and control information ID as extracting conditions; when the control information table has been stored in the control information table memory portion, said reproducing portion reproduces an operation screen data in the control information table; and said display portion combines the video image data reproduced by said reproducing portion with the operation screen data in order to display the same.

20. A digital broadcast receiver which receives digital broadcast transmitting repeatedly a plurality of control information tables for implementing interactive processing with users and video image data corresponding to the control information tables;

said digital broadcast receiver characterized in that each of said control information tables includes a control information table identifier showing that the table itself is a control information table in the multiplexed stream, a control information ID for uniquely identifying control information, and link information linking other video image data with corresponding video image data as well as operation video image data for promoting viewer operations and action information based on viewer operation; moreover, all control information management tables are multiplexed in said multiplexed stream; said all control information management table has descriptions of information relating to an all control information management table identifier for showing the table to be an all control information management table, and relating to control information IDs of all control information tables included in a multiplexed stream, the all control information management table being also repeatedly transmitted; said digital broadcast receiver comprises a receiving portion, an extracting portion, an operation control portion, a reproducing portion, a reception control portion, and a memory portion; said operation control portion receives user operations for selecting reception and storage of streams or reception and reproduction, and when receiving operations for selecting reception and reproduction, also receives operations for selecting control information table identifiers as control information to be reproduced; said receiving portion receives said multiplexed streams; said memory portion comprises a control information table memory portion for storing control information tables and an all control information management table memory portion for storing all control information management tables; said reception control portion controls, in the case of having received user operations for selecting reception and storage of a stream, said receiving portion so as to receive a multiplexed stream, and controls said extracting portion so as to extract an all control information management table and store the same in an all control information management table memory portion with the all video image data management table identifier as an extracting condition; as storage process of control information tables after the all control information management table is stored in the all control information management table memory portion, said reception control portion controls said extracting portion so as to extract a control information table and store the same in the control information table memory portion with a control information table identifier as an extracting condition; said reception control portion repeats storage process of said control information tables until storage of control information tables corresponding to all control information IDs described in the all control information management table has been completed; moreover, said reception control portion controls, in the case of having received user operations for selecting reception and reproduction of a stream at said operation control portion, said receiving portion so as to receive a multiplexed stream; as reproduction processing of control information tables after the all control information management table has been stored in the all control information management table memory portion, said reception control portion controls said extracting portion so as to extract the specified control information table and store the same in the control information table memory portion with a control information table identifier and control information ID as extracting conditions; when the control information table has been stored in the control information table memory portion, said reproducing portion reproduces an operation screen in the control information table; and said display portion displays the operation screen reproduced by said reproducing portion.

21. A receiver characterized in that in the case where said operation control portion receives user operations for selecting reception and reproduction of a stream, and a video image data identifier and control information ID of a pair of the video image data to be reproduced and control information are not specified, reception and reproduction are performed assuming that the control information ID first described in said all control information table has been specified.

22. A receiver characterized in that when said operation control portion receives user operations for selecting reception and reproduction of a stream, and moreover, when the control information table corresponding to the specified control information ID has been stored in said control information table memory portion, said reception control portion does not perform extracting processing of the corresponding control information table from the multiplexed stream, and said reproducing portion reproduces operation screen data in the control information table stored in said control information table memory portion.

23. A receiver characterized in that expiration date information allowing for making control information tables reproducible is further described in said all control information management table; said reproducing portion further has a clock portion for clocking; when said operation control portion receives user operations for selecting reception and reproduction of a stream, when the control information table corresponding to the specified control information ID has been stored in said control information table memory portion, and when said operation control portion acquires current time from the clock portion and reads reproducible expiration date information described in the all control information management table stored in said all control information management table memory portion to find that said current time falls within the range of said expiration date information, said reception control portion does not perform extracting processing of the corresponding control information table from the multiplexed stream, and said reproducing portion reproduces operation screen data in the control information table stored in said control information table memory portion.

24. A receiver characterized in that expiration date information allowing for making control information tables reproducible is further described in said control information table;

said reproducing portion further has a clock portion for clocking; when said operation control portion receives user operations for selecting reception and reproduction of a stream, when the control information table corresponding to the specified control information ID has been stored in said control information table memory portion, and when said operation control portion acquires current time from the clock portion and reads reproducible expiration date information described in said control information management table corresponding to control information IDs stored in said control information table memory portion to find that said current time falls within the range of said expiration date information, said reception control portion does not perform extracting processing of the corresponding control information table from the multiplexed stream, and said reproducing portion reproduces operation screen data in the control information table stored in said control information table memory portion.

25. A receiver characterized in that version information of control information tables is further described in said all control information management table; when said operation control portion receives user operations for selecting reception and reproduction of a stream, when the control information table corresponding to the specified control information ID has been stored in said control information table memory portion, and when the extracted version information of the all control information management table is consistent with the version information stored in the all control information management table memory portion, said reception control portion does not perform extracting processing of the corresponding video image correspondence table from the multiplexed stream, and said reproducing portion reproduces operation screen data in the control information table stored in said control information table memory portion.

In this specification, the digital broadcast means broadcasting by transmitting at least digitized data irrespective of the satellite broadcast, the ground wave broadcast, or the wired broadcast.

The content element refers to part of video image, voice, or the like which is finally provided to viewers. In the embodiments, this is applicable to the still video image VE1 as presentation information or like.

The linked content element refers to the association of content elements with one another. In the embodiments, the content elements are indirectly associated with one another by navigation control data. As a matter of course, this also refers to such conception as includes the case where the elements are directly linked using the HTML language, the SML language, or the like.

The content element list refers to each of the listed contents constituting a set of contents. In the embodiments, this is applicable to the VET_DII.

The recording medium on which programs are recorded refers to ROM, RAM, flexible disks, CD-ROM, memory cards, hard disks, and the like, in which programs are recorded. This also refers to such conception as includes not only a recording medium such as a hard disk which is connected to a CPU and recorded programs are directly executed, but also a recording medium such as a CD-ROM in which programs are recorded which are executed after installed once in the hard disk or the like. Furthermore, the programs herein referred to include not only directly executable programs, but also source programs, compressed programs, encrypted programs, and the like.

While the novel features of the invention are set forth in a general fashion, both as to organization and content, along with other objects and features thereof from the following detailed description taken in conjunction with the drawings.

BRIEF DESCRIPTION OF THE DRAWING

FIG. 4 is a view showing the configuration of a packetized data.

FIG. 6 is a view showing control data NIT.

FIG. 9 is a view showing still video image identification information VET.

FIG. 12 is a view showing control data NVT1.

FIG. 15 is a view showing NVT_DII.

FIG. 16 is a view showing VET_DII.

FIG. 17(A) is a view showing control data NIT.

FIG. 17(B) is a view showing control data SDT.

FIG. 17(C) is a view showing control data EIT.

FIG. 18(A) is a view showing control data PAT.

FIG. 18(B) is a view showing control data PMT.

FIG. 25 is a view showing the filter conditions of TS decoder 320.

FIG. 26 is a view showing filter conditions.

FIG. 29 is a view showing a stored data management table.

FIG. 32 is a view showing filter conditions.

FIG. 37 is a view showing a navigation information table.

FIG. 38 is a view showing NVT_DII.

FIG. 39 is a view showing VET_DII.

FIG. 40 is a view showing storage data control table.

FIG. 45 is a view showing NVT_DII that contains information on frequency of revision.

FIG. 46 is a view illustrating VET_DII that contains information on frequency of revision.

DETAILED DESCRIPTION OF THE PREFERRED EMBODIMENT

1. First Embodiment

1.1 Outline of Technique for Implementing Interactive Broadcast

The inventors have already invented a system which allows interactivity with viewers in the digital broadcast (Japanese Patent Application No. Hei 9 (1997)-212937). This invention repeatedly multiplexes into transport streams presentation information (content elements) for use in background images or still images, image data for encouraging users to perform interactive operation, and navigation information which includes the contents such as actions to be executed in response to user operations of a remote controller. In the receiver, interactivity is implemented by selecting the presentation information and navigation information which users have selected by means of a transport stream decoder (TS decoder) for output.

Figure 1:
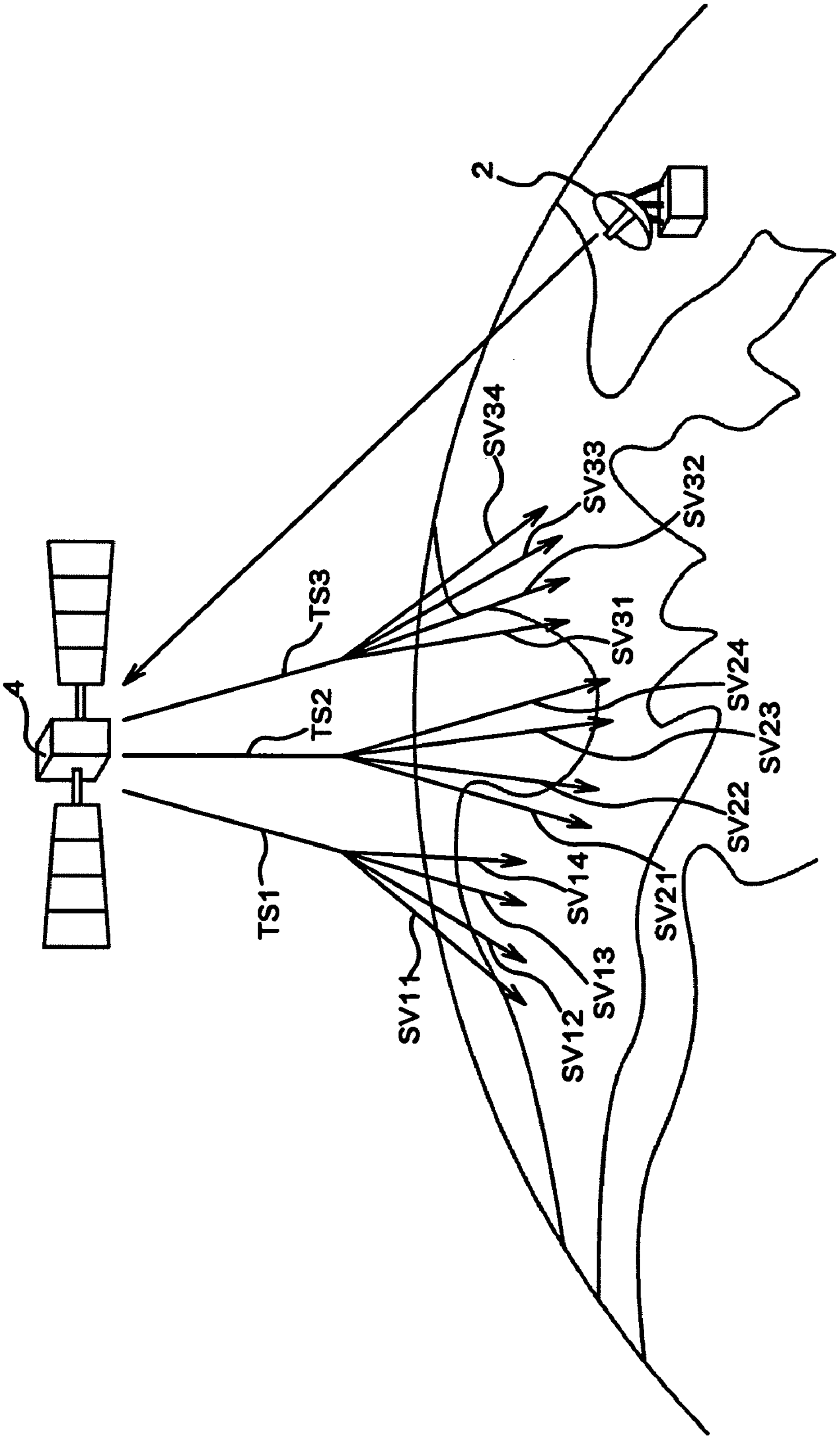
FIG.1 PRIOR ART
FIG. 1 is a schematic illustration of the radio wave transmission status in a satellite broadcast.
Figure 2:
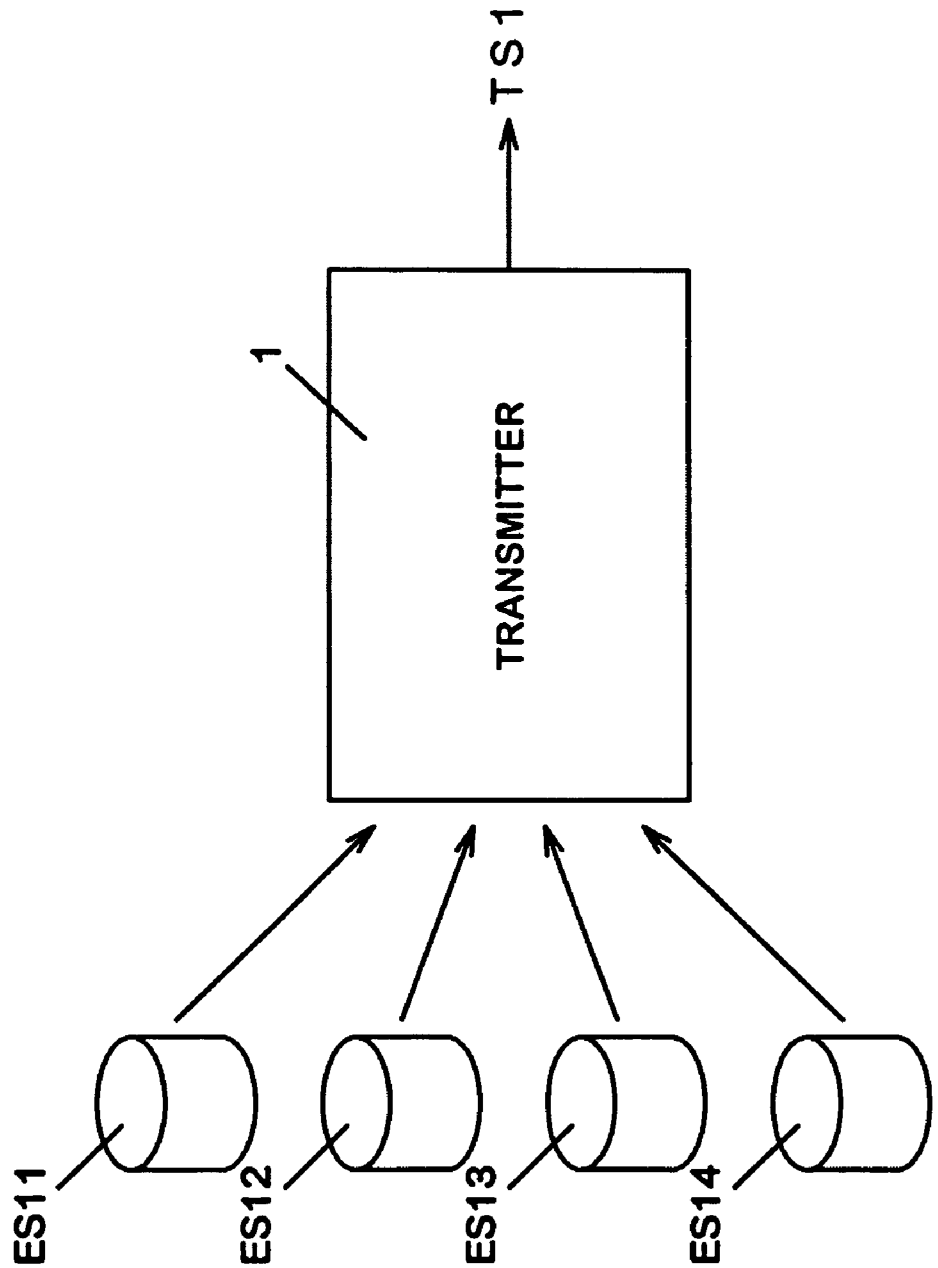
FIG. 2 is a view showing the outline of processing of a transmitter.
Figure 3:
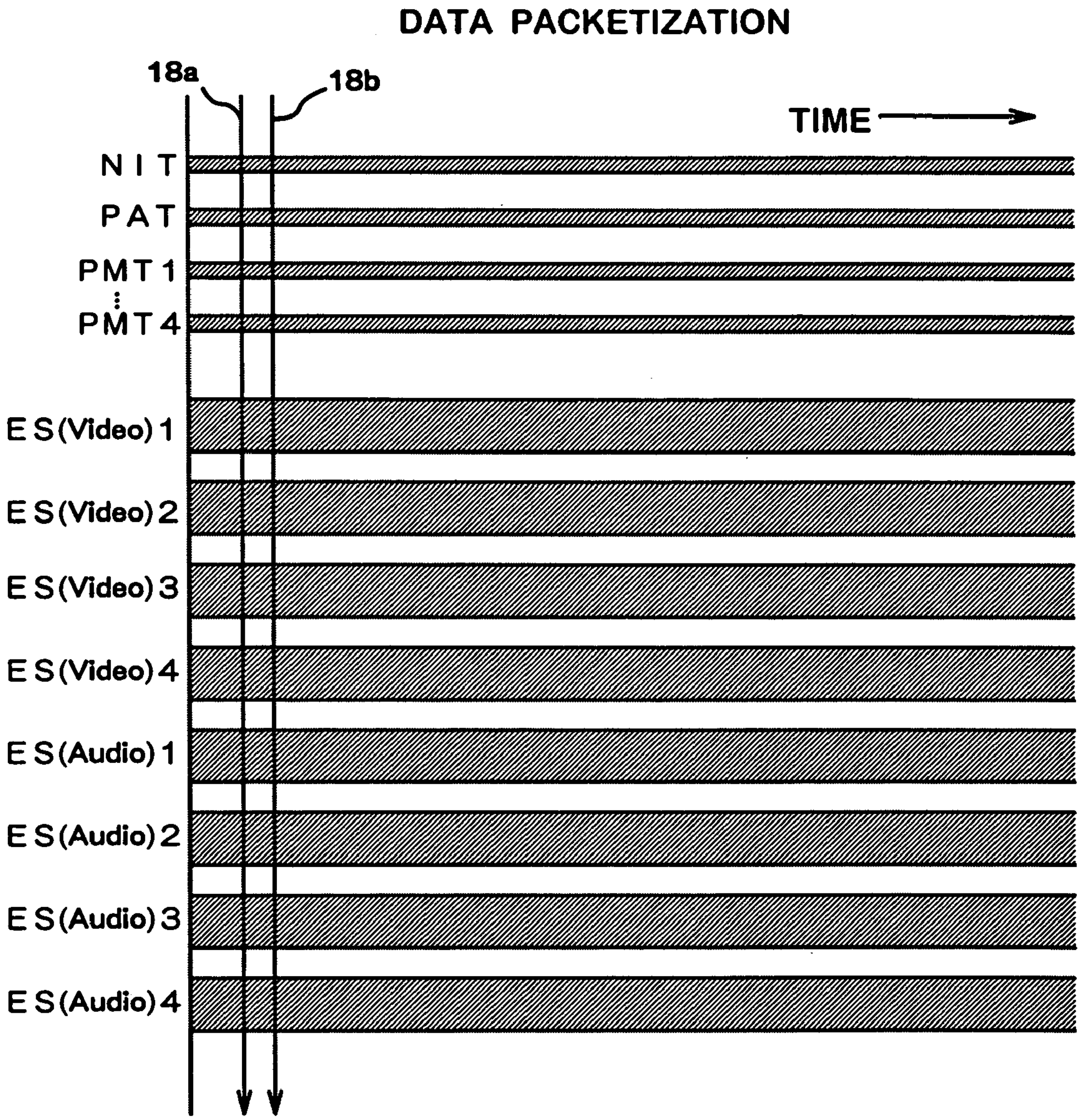
FIG.3 PRIOR ART
FIG. 3 is a view showing a transport stream.
Figure 5:
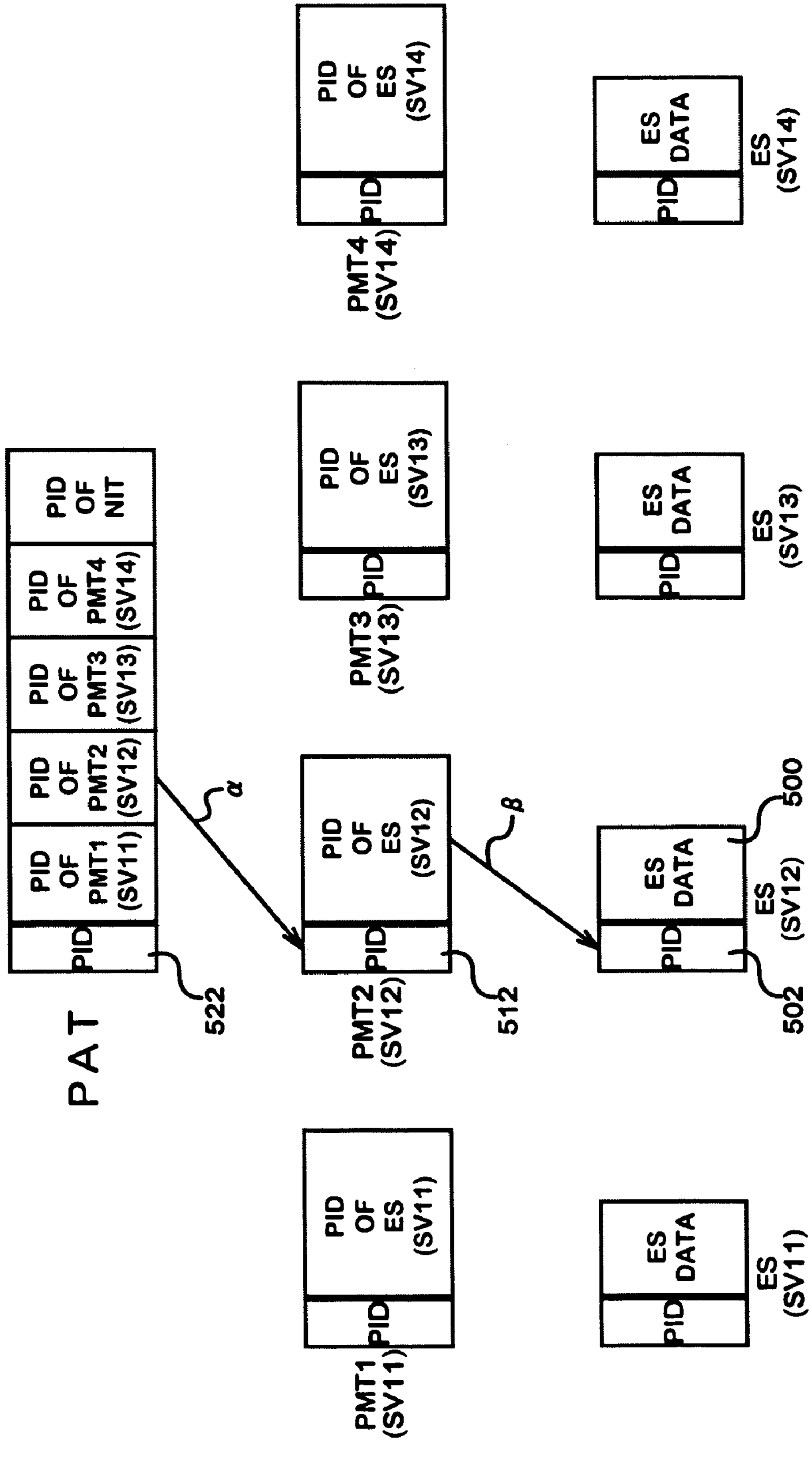
FIG.5 PRIOR ART
FIG. 5 is a view showing the relationship between control data and a elementary stream.

In this system, a plurality of content elements is transmitted using elementary streams (see ES of FIG. 3) which are originally to transmit a series of sequential video images or audio data. This allows for displaying full-color video images without requiring extra memories.

Figure 8:
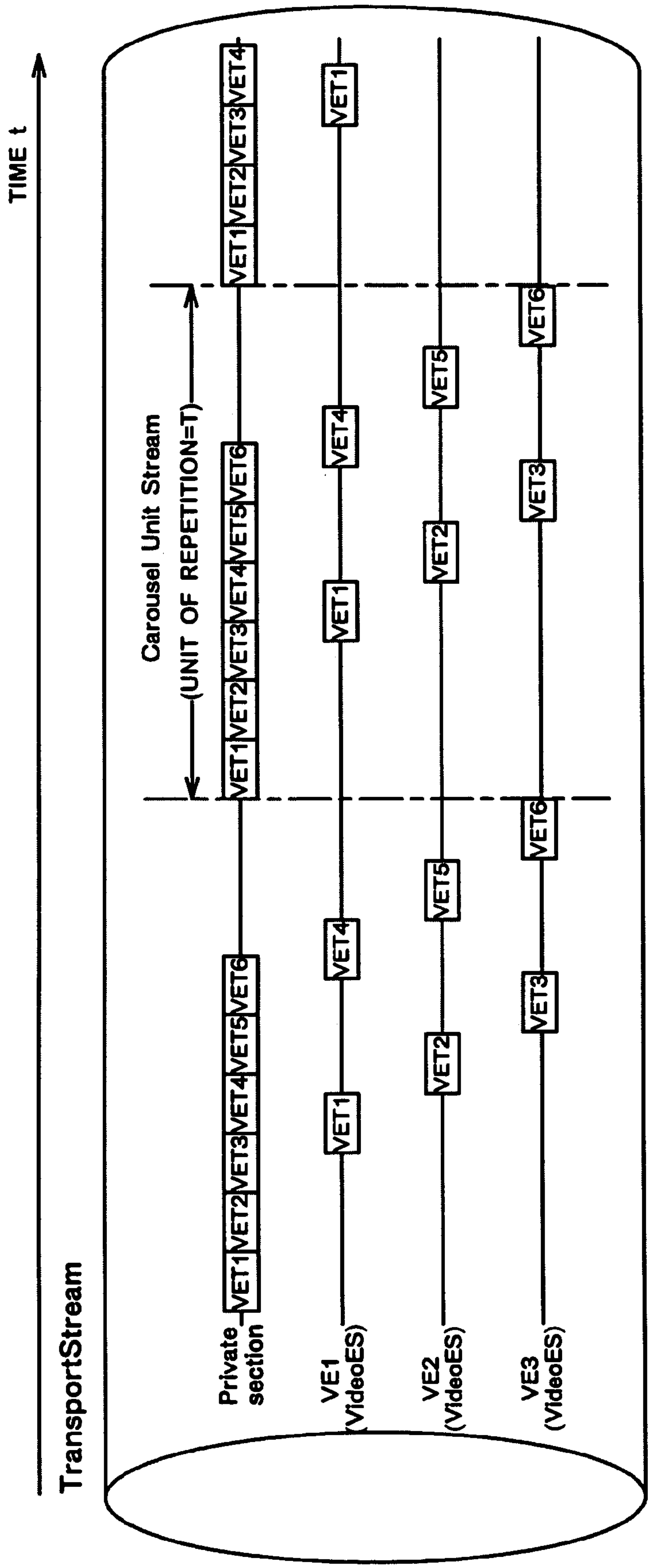
FIG. 8 is a view showing still video image identification information VET and still image VE of a transport stream.

1.1.2 Technique for Broadcasting a Plurality of Content Elements Using Elementary Stream FIG. 8 shows a configuration for multiplexing a plurality of content elements using elementary streams. In this section, explanation is to be made for the case of using still video images VE1 to VE6 as content elements. Incidentally, in FIG. 8, other control data such as NIT or PAT are not shown. Additionally, in FIG. 3, one service comprises two elementary streams ES (Video) 1 and ES (Audio) 1, however, the example of FIG. 8 allows three elementary streams VE1, VE2, and VE3 to constitute one service.

Still-video-image information identification tables VET1 to VET16 of fetch control data are used for identifying still video images VE1 to VE6 included in elementary streams VE1, VE2, and VE3. The elementary streams VE1, VE2, and VE3 are originally designed to include a series of sequential video images or audio data and not designed to fetch a particular still image out of the series. Accordingly, in this configuration, the still-video-image information identification tables VET1 to VET16 are allowed for fetching each of still video images of content elements.

The video elementary stream VE1 includes still video images VE1 and VE4. The still video images VE1 and VE4 comprise a MPEG-I frame (data reproducible as a still video image by itself). Similarly, the video elementary stream VE2 includes still video images VE2 and VE5, while the video elementary stream VE3 includes still video images VE3 and VE6. This set of still video images VE1 to VE6 is repeatedly transmitted at a time interval of T in the same form. The still-video-image information identification tables VET1 to VET16 are transmitted as control data in a private section. The still-video-image information identification tables VET1 to VET16 correspond to still video images VE1 to VE6, respectively.

FIG. 9 shows the contents of the still-video-image information identification tables VET1 associated with the still video image VE1. The table_id_extension describes an identifier (VE_id) of the associated still video image VE1. In this example, ×0001 is described, which shows that VE_id=1. The first_pts describes the start time for the still video image VE1 in the video elementary stream, while the last_pts describes the termination time of the still video image VE1 in the video elementary stream. In this example, the start time should be equal to the termination time for still video images. Other still-video-image information identification tables VET2 to VET16 have the same configuration. Incidentally, in order to identify a dynamic video image or audio data, the start time and termination time of said dynamic video image or audio data should be described.

Video elementary streams are transmitted associated with time information (PCR (Program Clock Reference)). Accordingly, as mentioned in the foregoing, a still video image can be identified and fetched by describing the start time and the termination time in the still-video-image information identification tables VET1 to VET16.

1.1.2 Technique for Implementing Interactive Broadcast

Figure 10A:
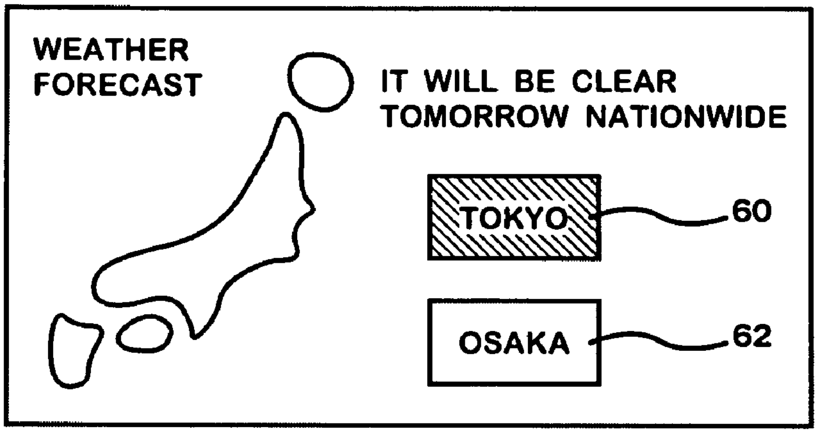
FIG. 10A, 10B, and 10C are views showing the contents of display of interactive broadcast.
Figure 10B:
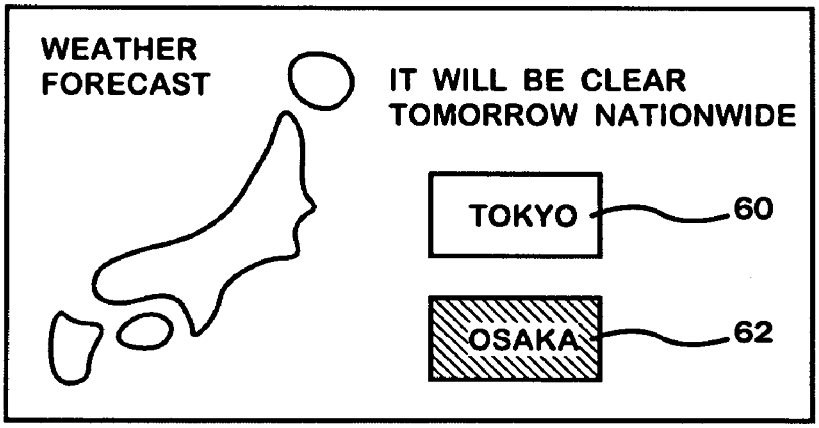
Figure 10C:
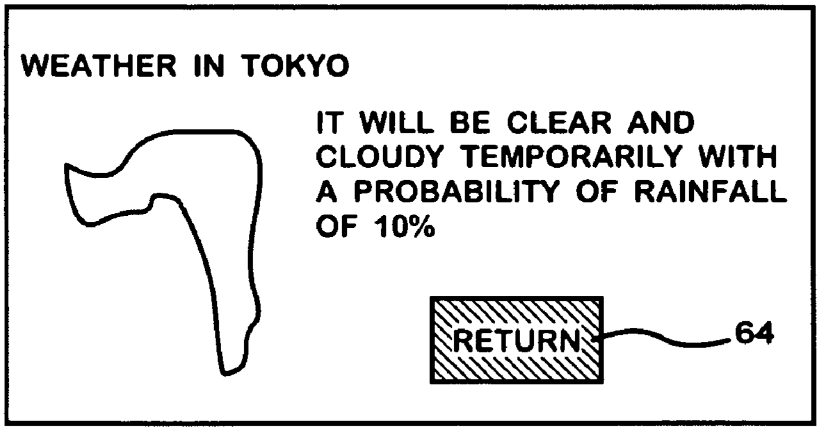

Now referring to FIGS. 10 to 13, the outline of the workings for implementing interactive operation is to be explained. FIG. 10 shows frames appearing on a display of the receiver. For example, suppose that the display shown in FIG. 10(B) is currently appearing. Under this situation, allowing the viewer to depress the up arrow key of the remote controller or the like causes the display to change to the situation shown in FIG. 10(A). That is, depressing the button will cause the status of having selected saka (the status shown with the diagonally shaded portion) to change into a status of selecting okyo Additionally, under the status of FIG. 10(A), depressing the Select key of the remote controller or the like will cause the status to change to a status shown in FIG. 10(C). That is, the display changes to the weather forecast for Tokyo.

Figure 11:
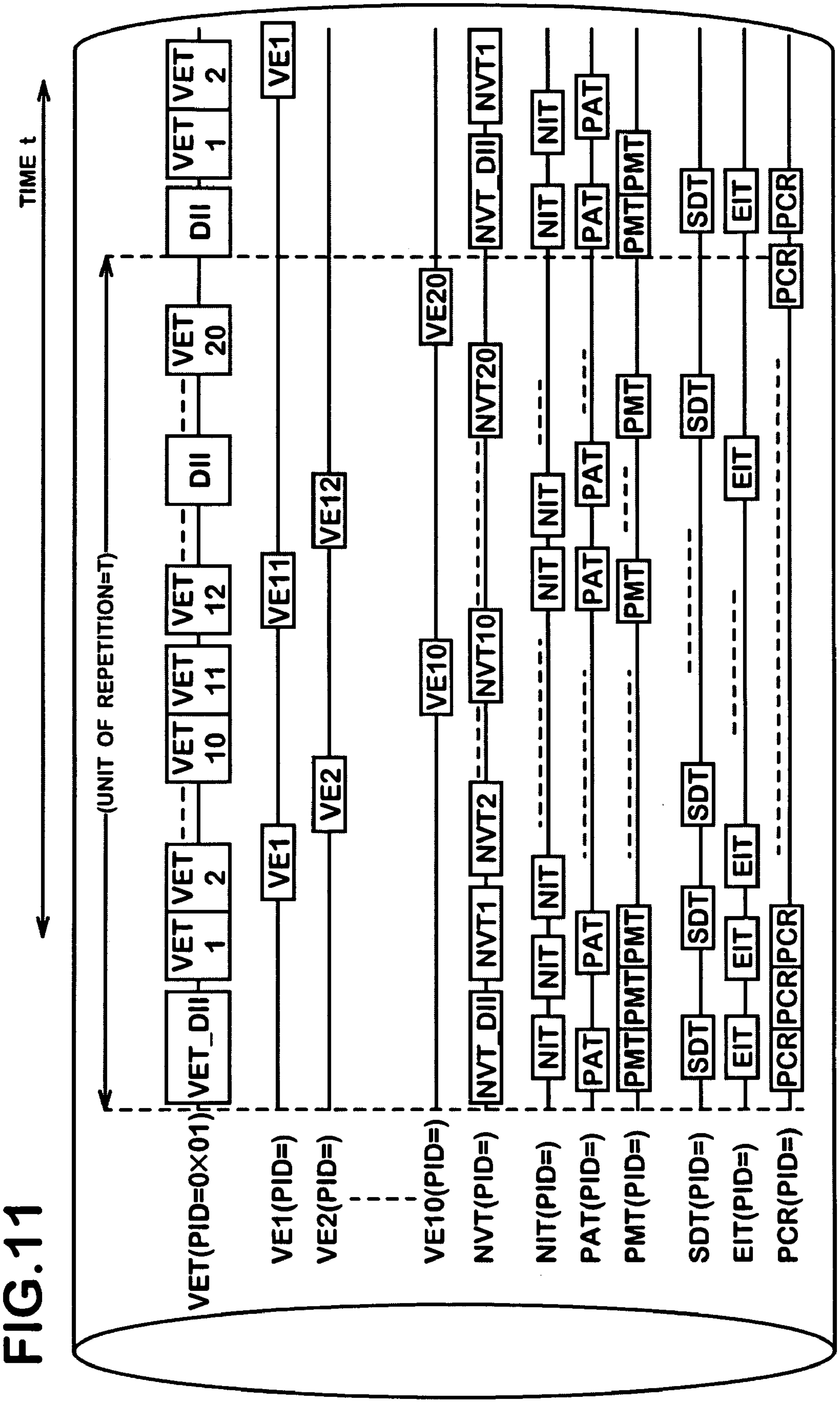
FIG. 11 is a view showing a transport stream.
Figure 11A:
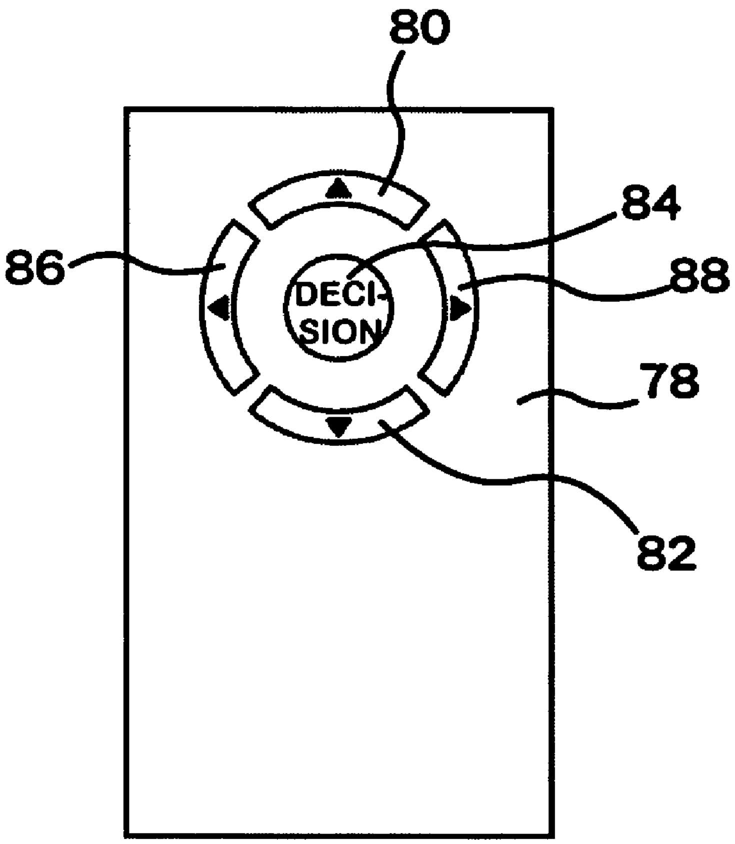
FIG. 11*a* is a view showing the appearance of a remote controller.

FIG. 11 shows transport streams for implementing such interactive broadcast. The still video image VE1 removes the buttons of okyo and saka shown in FIG. 10(A). The still video image VE2 removes the buttons of okyo and saka shown in FIG. 10(B). The still video image VE7 removes the buttons of return shown in FIG. 10(C). Still-video-image information identification tables VET1 to VET20 are transmitted corresponding to still video images VE1 to VE20, respectively. Additionally, navigation information tables NVT1 to NVT20 of navigation control data are also transmitted.

A set of the still video images VE1 to VE20, a set of still-video-image information identification tables VET1 to VET20, and a set of navigation information tables NVT1 to NVT20 are repeatedly transmitted with the same contents at a time interval of T.

Figure 13:
FIG. 13 is a view showing control data NVT2.

FIG. 12 shows the contents of the navigation information table NVT1. FIG. 13 shows the contents of the navigation information table NVT2. In the navigation information table NVT1 of FIG. 12 defines buttons 60 and 62 of FIG. 10(A) by the description of Object Definition Table 521.

In the line of index of the Object definition table 521, 00 and 00 are described as the coordinates X and Y to show that a button is displayed at this position. Moreover, in the Normal Bitmap, the index of display data under normal status (status of no selection) is displayed. In accordance with this index, a bitmap in the Bitmap Table (the button of okyo with no diagonal lines drawn) is selected and displayed in the non-selection status. In the Focused Bitmap, an index of display data in the selection status is shown. In accordance with this index, a bitmap in the Bitmap Table (the button of okyo with diagonal lines drawn) is selected and displayed in the selection status. Moreover, in the Handler, the index of the Handler is described which is to be executed when the decision button is depressed under a condition that this button is under selection status. The contents of the Handler are described in the Handler Definition Table.

Like the foregoing, in the line of the index of the Object Definition Table 521, description relating to button 62 is provided.

Using such navigation information table NVT, the receiver performs the following operation.

A status is shown in FIG. 10(A), wherein the button of index=0 in the Object Definition Table 521 is under selection with other buttons being under non-selection status. That is, the button 60, okyo is displayed under selection status, while the button 62, saka is displayed under non-selection status. Incidentally, under the initial status, the button of index=0 is set to selection status, while other buttons are set to non-selection status.

Under this status, depressing a down button 82 of a remote controller 78 causes the index of the selected button to increase by one. That is, the button of index=1 is now under selection status. This causes the display of the screen to appear as shown in FIG. 10(B). That is, the button 60 becomes okyo under non-selection status, while the button 62 becomes saka under selection status.

Now, under the status shown in FIG. 10(B), depressing an up button 80 causes the index of the selected button to decrease by one. This causes the display of the screen to appear as shown in FIG. 10(A). That is, the button 60 becomes okyo under selection status, while the button 62 becomes saka under non-selection status.

Under the status shown in FIG. 10(A), that is, where the button of index=0 is selected, depressing a decision button 84 causes the index=0 of the handler which is to be executed to be acquired from the column of the Handler of the Object Definition Table 521. Subsequently, the script described in the line of index=0 is executed from the Handler Definition Table. The goto contents (index 0) are executed here. The goto contents ( ) are a command to refer to switching to contents whose index is consistent with that shown in the Hyperlink Table. Therefore, in this case, switching is carried out to the contents shown in the first line (index=0) of the Hyperlink Table.

In the first line (index=0) of the Hyperlink Table, it is described that the still video-image information table is switched to VET7 and the navigation information table to NVT2. This allows the receiver to acquire the still video-image information table VET7 among the still video-image information tables transmitted repeatedly. Moreover, the receiver acquires and displays the still video image VE7 transmitted repeatedly accordingly. As such, the screen as shown in FIG. 10(C) is displayed. Moreover, the receiver acquires the navigation information table NVT2 (see FIG. 13) from the navigation information tables transmitted repeatedly. In accordance with this navigation information table NVT2, a button 64 is displayed on the lower right of the screen. As such, depressing the decision button under the status shown in FIG. 10(A) is responded to change the screen display into that shown in FIG. 10(C).

Incidentally, depressing the decision button 80 under the status shown in FIG. 10(C) results in the display status shown in FIG. 10(A) in accordance with the navigation information table NVT2. As mentioned above, interactive broadcast is implemented.

1.2. Digital Broadcast System

Now, a digital broadcast system according to an embodiment of the present invention is to be explained in detail. In this embodiment, the aforementioned interactive broadcast is to be immediately recorded and reproduced at the receiver side.

1.2.1. Digital Broadcast Transmitter

Figure 14:
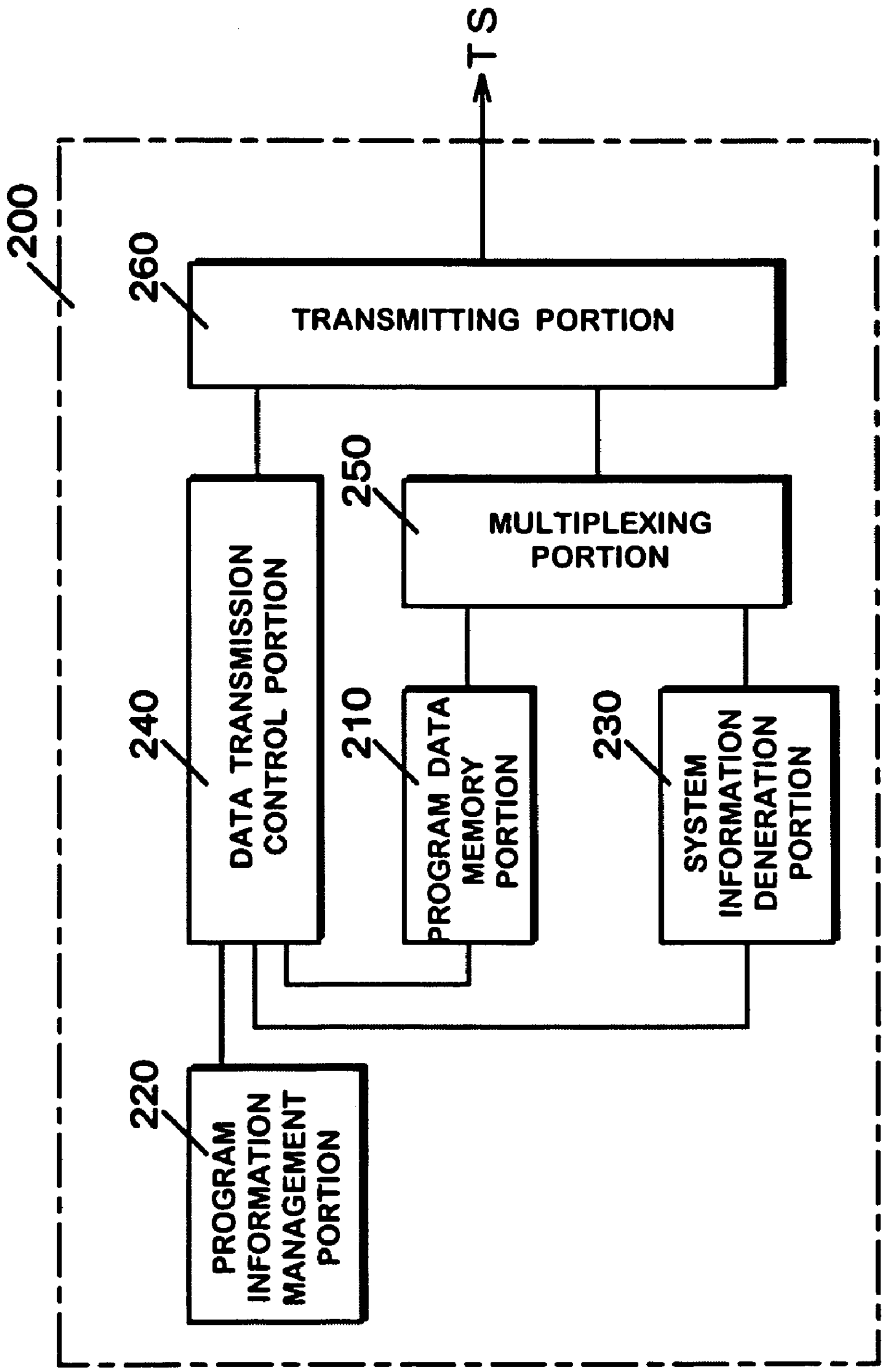
FIG. 14 is a view showing the configuration of transmitter 200.

FIG. 14 shows a digital broadcast transmitter 200 according to an embodiment of the present invention. This digital broadcast transmitter 200 comprises a program data memory portion 210, a program information management portion 220, a system information generation portion 230, a data transmission control portion 240, a multiplexing portion 250, and a transmitting portion 260.

The program data memory portion 210 stores the very data of the broadcast program contents such as video elementary streams by the still video images constituting multimedia contents, navigation information, video elementary streams used for ordinary broadcast, and audio elementary streams.

The program information management portion 220 stores and manages broadcast schedules of programs, outlines of each of the programs, link information to program data in the corresponding program data memory portion 210, etc.

At the time of transmission of program data in accordance with the information of the program information management portion 220, the system information generation portion 230 generates SI data such as control data NIT (Network Information Table) to be multiplexed in the MPEG-2 transport stream), EIT (Event Information Table), SDT (Service Description Table); PSI data such as PAT (Program Association Table) and PMT (Program Map Table); and PCR streams of time information.

According to the directions of the data transmission control portion 240, the multiplexing portion 250 multiplexes the table data generated at the system information generation portion 230 and the content data stored in the program data memory portion 210 in order to generate MPEG-2 transport streams.

According to the broadcast schedule in the program information management portion 220, the data transmission control portion 240 directs the system information generation portion 230 to prepare table data as well as reads necessary content data from the program data memory portion 210. The data transmission control portion 240 directs the multiplexing portion 250 to multiplex the MPEG-2 transport streams based on program data and the system information generated by the system information generation portion 230.

The transmitting portion 260 transmits the MPEG-2 transport streams generated by the multiplexing portion 250.

(Configuration of MPEG-2 Transport Stream)

FIG. 11 shows an example of configuration of the MPEG-2 transport stream which is prepared and transmitted by the digital broadcast transmitter 200. In this transport stream, multiplexed are still video-image information identification table VET, video elementary stream VE1 to VE10, navigation information tables NVT, NIT, PAT, PMT, SDT, and PCR. The contents included in these transport streams are to be explained in detail below.

(Navigation Information Table NVT)

Navigation information table NVT is table data which includes video image data such as buttons for promoting interactive operations of users and navigation information comprising actions to be executed for user operations in the data portion in the private section format of the MPEG2 system. A unique ID (NE_id) identifies each piece of the navigation information.

FIG. 12 shows an example of the contents of NVT. In the field of the private section table_id, a value (0×90) unique to NVT is provided, while a value consistent with the NE_id is set to the field table_id_extension.

The contents of the data portion of NVT include the Object Definition Table, the Handler Definition Table, the Hyperlink Table, and the Bitmap Table, which are shown in a table format.

The Object Definition Table shows the information relating to the type, attribute, and the like of graphic objects, for example, such as buttons to be displayed on the display screen for each index number thereof An index number starting from is displayed at the index column. A type of a graphic object is indicated at the type column. At the and columns, the values of the X and Y coordinates of a display reference point on the display screen are shown. At the andler column, the index number of a handler is shown which is executed when the user selects the object indicated at the digital broadcast receiver 300. At the Normal Bitmap column, the index number of a bitmap is shown which is displayed when respective objects are under the non-focused status. On the other hand, at the Focused Bitmap column, the index number of a bitmap is shown which is displayed when respective objects are under the focused status. The focused status herein referred to means the status where an object displayed can be selected, whereas the non-focused status means a status where an object is only displayed. For example, it is shown that the bitmap of index number is changed to that of the index number of when the button causes the type to be displayed and selected at the position of X=400 and Y=300 in the line of index number of the Object Definition Table 521.

The Handler Definition Table shows the script which describes the behavior of the data receiver by each index number in response to user operations. For example, the script goto_contents (index0) is described in the line of index number of the Handler Definition Table 522 of FIG. 12. This script directs the switching to contents indicated by the hyperlink of index number 0. Incidentally, scripts may be provided with a description, for example, for the position of graphic objects or for switching display and non-display.

The Hyperlink Table shows a hyperlink to contents designated for each index number. A pair of VE_id and NE_id constituting the contents designates the contents. For example, the line of index number of the Hyperlink Table 523 shows the hyperlink to the contents comprising a pair of presentation information VE_id=7 and navigation information NE_id=2.

The Bitmap Table shows bitmap data to be identified by index numbers. For example, the contents of the bitmap data to be displayed when a graphic object of index 0 is turned to the focused status are included in the line of index number of the Bitmap Table 524 in FIG. 12.

Incidentally, in the example of FIG. 12 of this embodiment, though NVT is described as one section, there is no problem even if NVT has a large amount of bitmap data to occupy a plurality of sections.

(Download Info Indication Relating to NVT)

In an embodiment of the present invention, as information relating to navigation information included in one program in addition to NVT, the information relating to what amount of NVT is included in a program is multiplex in a stream as a navigation list.

As one means in the embodiment, data in the private section format is multiplexed which is identified by the same PID as that of NVT in accordance with the format of the Download Info Indication specified in Chapter 7, ser-to-Network of DSM-CC (Digital Storage Media Command & Control) standard (ISO/IEC13818-6). This data is designated VT_DII hereinafter.

FIG. 15 shows the contents of the NVT_DII. Individual navigation information included in a program is associated with one module in DSM-CC to set a value of NE_id to the field corresponding to the module ID. In the module_size portion, the size of navigation information (the number of bytes) is also described. Moreover, the number_of_modules shows the total number of pieces of navigation information included in a program. Moreover, as the header information of the private section, the table_id=0×81 is designated which shows that the data is NVT_DII. The table_id_extension is not used, being made 0×0000. In the example of FIG. 6, it is shown that the program includes 20 pieces of navigation information and a value of NE_id and the size of NVT (the number of bytes) for individual pieces of navigation information.

(VET)

FIG. 9 shows an example of the contents of VET. As the contents of the header portion, a value of VE_id of the table_id_extension, consistent with the value unique to VET (0×90) is provided in the field of the table_id. The value of the table_id_extension teaches that the VET is the VET of VE_id=0×0001.

The values of component tag and stream_id are provided as a pair of pieces of information for uniquely identifying the video elementary stream VE1 in which still video image data to be identified by VE_id=1 of VET is multiplexed as MPEG-I frame. Additionally, first_PTS and last_PTS are included as the information indicating from which part of the video elementary stream to which part thereof shows the still video image data of VE_id=1 associated with PTS (Presentation Time Stamp) provided to each frame of the video elementary stream. This shows that only such data as have a value, within the range of the first_PTS and last_PTS written in the PTS field of PES (Packetized Elementary Stream) of a packet constituting the video elementary stream is the desired still video image data. In the embodiment where the desired still video image data corresponds to the MPEG-I frame, it holds that the first_PTS=last_PTS=<PTS provided to the corresponding to MPEG-I frame>. Incidentally, the component_tag is a value used for referring indirectly to PID and the associated relationship with the PID is provided in the PMT described later. Moreover, the stream_id is a value specified in the last 8 bits of the 32-bit packet start code of the system header of a MPEG system transport packet, used for discriminating streams. The stream ID will have values ranging from xe0 to xef for video image.

Thereby, PID to be referred to by component_tag and stream_ id identify uniquely video elementary streams.

The first_PTS denotes the start reproduction time information expressing the time at which the first frame of the corresponding video-image data in units of 9000th of a second. On the other hand, the last_PTS denotes the reproduction termination time information at which the last frame of the corresponding video-image data. If the corresponding video image data is a still video image (MPEG-I frame), it holds that first_PTS=last_PTS.

(VET_Download Info Indication)

Concerning VET, in addition to VET itself, the information relating to what amount of VET is included in a program is included in a stream. In other words, it shows that how much still video image data is included in the program. In the embodiment, as a means thereof, like NVT_DII, the DSM-CC Download Info Indication is multiplexed as data in the private section format to be identified by the same PID as that of VET. This data is called the VET_DII hereinafter.

FIG. 16 shows the contents of the VET_DII. The individual still video image data included in a program is associated with one module in the DSM-CC, and the VE_id is set to the field corresponding to the module ID. Moreover, the size (the byte length) of the still video image data is described in the module_size. Additionally, the number_of_modules shows the total number of still video image data included in the program. In addition, the table_id=09×91 which shows that it is a VET_DII is specified as the header information of the private section. The table_id_extension is not used, being made equal to 0×0000.

In the example of FIG. 16, it is shown that 20 pieces of still video image data are included in the program, and the value of VE_id and the size of still video image data (the number of bytes) are described for individual pieces of still video image data.

(Video Elementary Stream VE)

FIG. 11 shows video elementary streams wherein VE1 to VE10 comprise only MPEG-I frames.

(NIT, SDT, and EIT)

FIG. 17 shows the configuration of NIT (Network Information Table), SDT (Service Description Table) and EIT (Event Information Table) in accordance with ETS 300 468 (DVB-SI) standard and ISO/IEC 13818-1 (MPEG2 system).

The NIT records physical information relating to transmission paths for individual transport streams transmitted from the network to be identified by a particular network. FIG. 17(A) is an example of NIT, which shows that in a network where the network_id is identified with ×0001 the transport stream is distributed which allows the original_network_id to be identified with ×0001 and the transport_stream_id to be identified with ×0001 and the specifications relating to the frequency and modulation scheme are expressed by ransmission parameters The SDT records information relating to service names and the like concerning each of the services included in a particular transport stream. FIG. 17(B) is an example of SDT, which shows that in a transport stream where the transport_stream_id is identified with ×0001 services allowing the service_id to be identified with ×0001 are included, and information relating to the service names is expressed by nformation relating to service name, etc The EIT records information relating to event name, start time, termination time, and the like for individual events included in a particular service. FIG. 17(C) is an example of EIT, which shows that in a service where the service_id is identified with ×0001 events allowing the event_id to be identified with ×0001 are included, and information relating to the event names is expressed by nformation relating to event name, etc (PAT and PMT)

FIG. 18 shows the contents of PAT (Program Associated Table) and PMT (Program Map Table) in accordance with ISO/IEC 13818-1. (MPEG2 system).

The PAT records information relating to PID of PMT (Program Map Table) concerning each of the programs included in a particular transport stream. FIG. 18 (A) is an example of PAT, which shows that in a transport stream where the transport_stream_id is identified with ×001 a program with the program_no thereof being ×0001 is included and the PID of PMT thereof is ×0080 The program_no is consistent with the service_id, and the program corresponds to the event.

FIG. 18(B) is an example of PMT. In the PMT of the figure, the identifier showing that this table is PMT has table_id=0×01, and the program_number is consistent with a value of service_id of ×0001 The CR_PID is a value denoting the PID of the packet in which clock information (PCR) is included which is a reference for combining the program. In addition to this, further in the PMT, included are DVX_Program_descriptor, NE_component_descriptor,
VE_Information_component_descriptor,
stream_identifier_descriptor, and
expiration_descriptor.

FIG. 19 shows the contents of these Descriptors included in PMT. FIG. 19(A) shows the contents of the DVX_Program_descriptor. The presence of this descriptor shows that this program is a program allowing for interactive operation in the embodiment of the present invention. Moreover, as information for identifying a pair of pieces of presentation information and navigation information which are first reproduced, included are entry_VE_id and entry_NE_id.

Figure 19A:
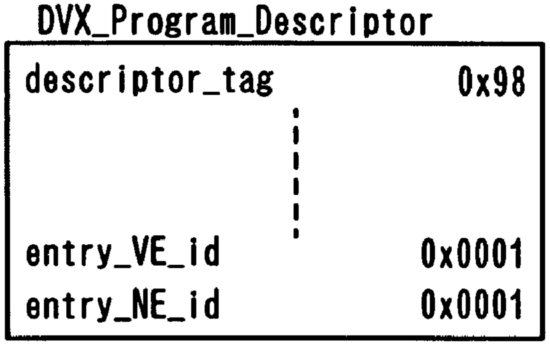
FIG. 19A, 19B, 19C, 19D, and 19E are views showing the description of control data PMT.
Figure 19B:
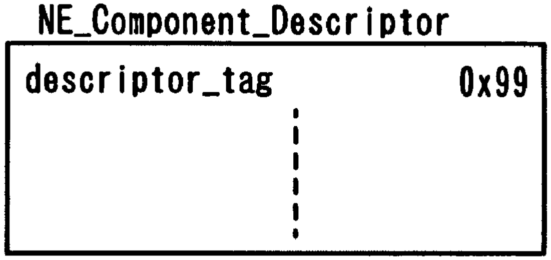

FIG. 19(B) shows the contents of the NE_component_descriptor. The presence of this descriptor shows that a component including NVT is present in this program.

Figure 19C:
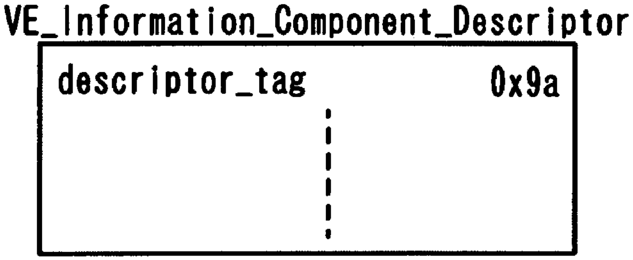

FIG. 19(C) shows the contents of the VE_Information_component_descriptor. The presence of this descriptor shows that a component including VET is present in this program.

Figure 19D:
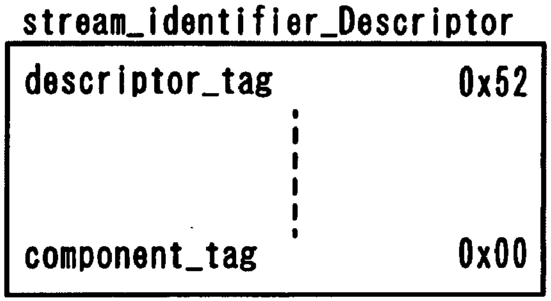

FIG. 19(D) shows the contents of the stream_identifier_descriptor. This descriptor shows the correspondence relationship of component_tag assigned to PID and a component.

Figure 19E:
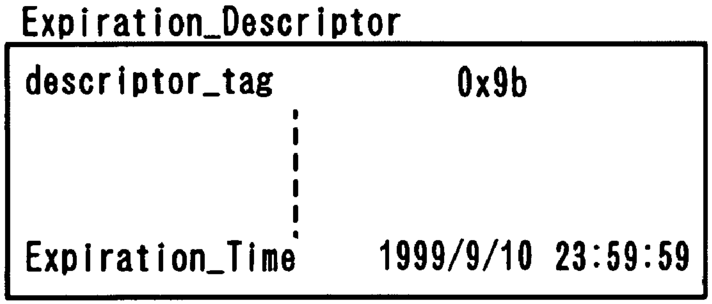

FIG. 19(E) shows the contents of the Expiration_descriptor. This descriptor shows an expiration date for reproducibility in the case of accumulation of programs. The example of FIG. 19(E) shows that programs are reproducible until 23:59:59, Sep. 10, 1999.

1.2.2 Digital Broadcast Receiver

Figure 20:
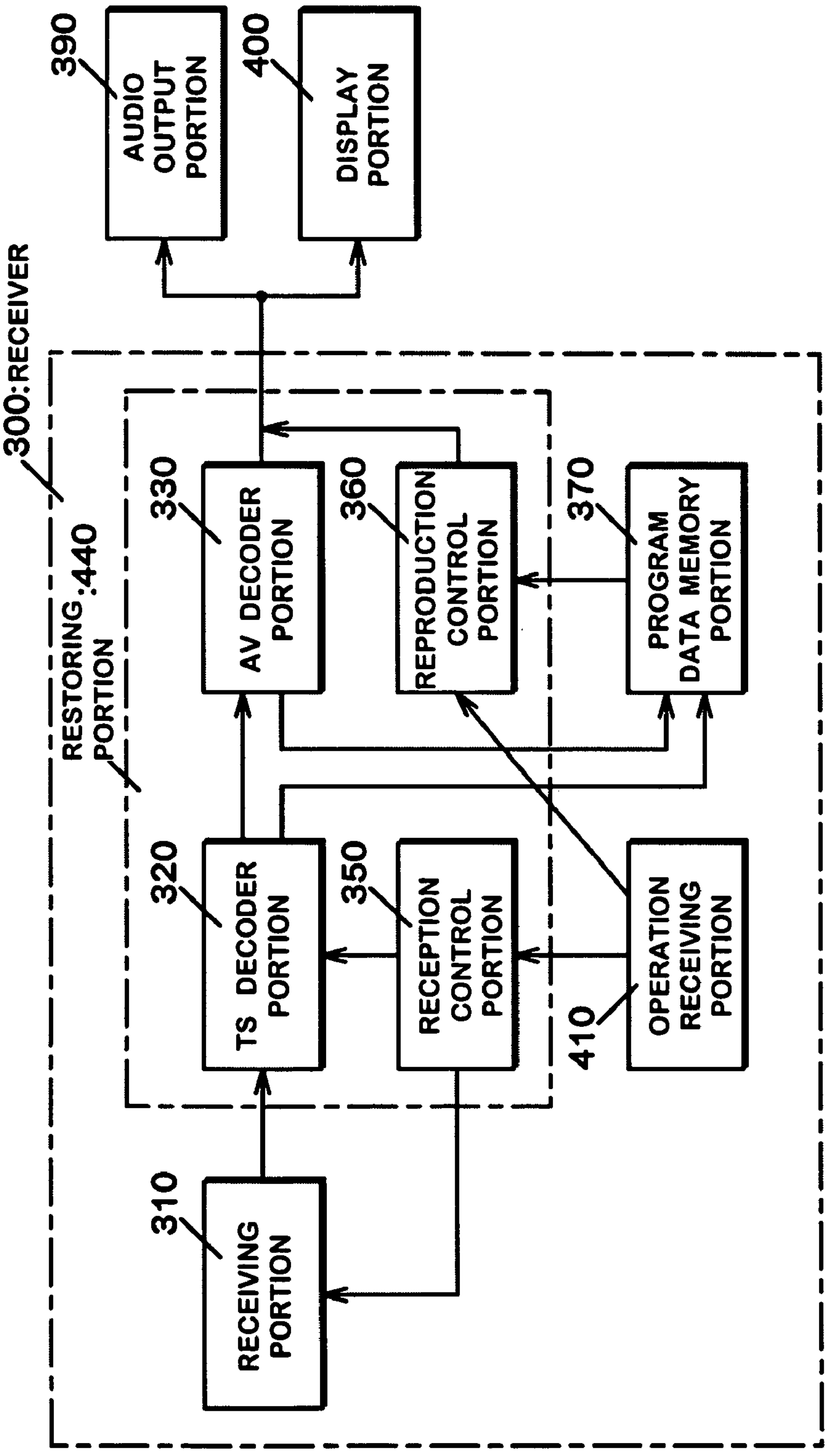
FIG. 20 is a view showing the general configuration of a digital broadcast receiver according to a first embodiment.

FIG. 20 shows an embodiment of the digital broadcast receiver 300 which receives and restores the aforementioned transport streams.

This digital broadcast receiver 300 comprises a receiving portion 310, a restoring portion 440, a program data memory portion 370, and an operation reception portion 410. Furthermore, the restoring portion 440 comprises a TS decoder portion 320, an AV decoder portion 330, a reception control portion 350, and a reproducing control portion 360.

The output of this digital broadcast receiver 300 is provided to an audio output portion 390 and a display portion 400. Incidentally, in this embodiment, a digital broadcast receiver which does not include the audio output portion 390 and the display portion 400, however, the digital broadcast receiver may be configured including the audio output portion 390 and the display portion 400.

This digital broadcast receiver 300 has three modes: the receiving mode, recording mode, and reproducing mode. Incidentally, the operation reception portion 410 receives a command from the remote controller of the viewer or the like to switch respective modes.

(Reception and Reproduction Mode)

In the reception and reproduction mode, the receiving portion 310 selectively receives transport streams which are transmitted. This transport stream is provided to the transport decoder portion (TS decoder portion) 320. The TS decoder portion 320 separates packets of video image data and audio data associated with the desired service in accordance with the control of the reception control portion 350 from this transport stream and then provides the same to the AV decoder portion 330. The AV decoder portion 330 melts (extends) the compressed video image data and audio data to provide the same to the audio output portion 390 and the display portion 400 to output as voice and video images.

Furthermore, when having received interactive broadcast, the reception control portion 350 separates and acquires the navigation information table NVT, still video image VE, and the like by means of the TS decoder portion 320, as required in response to operation input. This allows for switching to the contents in response to the operation command as shown in FIG. 10.

(Recording Mode)

The recording mode allows for recording a set of still video images VE and a set of navigation data NVT, which are transmitted repeatedly, into the program data memory portion 370. The reception control portion 350 controls the TS decoder portion 320 to separate and acquire the still video-image information table VET. In accordance with this, the reception control portion 350 further controls the TS decoder portion 320 to separate still video images to provide the same to the AV decoder portion 330. In the recording mode, the output of the AV decoder portion 330 is stored in the program data memory portion 370. This is carried out for all still video images. As such, a set of extended still video images can be stored in the program data memory portion 370.

Furthermore, the reception control portion 350 controls the TS decoder portion 320 to separate and acquire the navigation information table NVT. This is carried out for all navigation information tables NVT. As such, a set of navigation information tables can be stored in the program data memory portion 370.

(Reproducing Mode of Recorded Contents)

In the reproducing mode of recorded contents, the processing shown in FIG. 10 is performed with a set of still video images and a set of navigation information tables stored in the program data memory portion 370 in response to the operator command in accordance with the control of the reproducing control portion 360. In this reproducing mode, the still video images which have been separated by means of the TS decoder portion 320 and extended by means of the AV decoder portion 330 are acquired from the program data memory portion 370 and processed, thereby providing a quick response to the viewer operation.

(Hardware Construction of Digital Broadcast Receiver)

Figure 21:
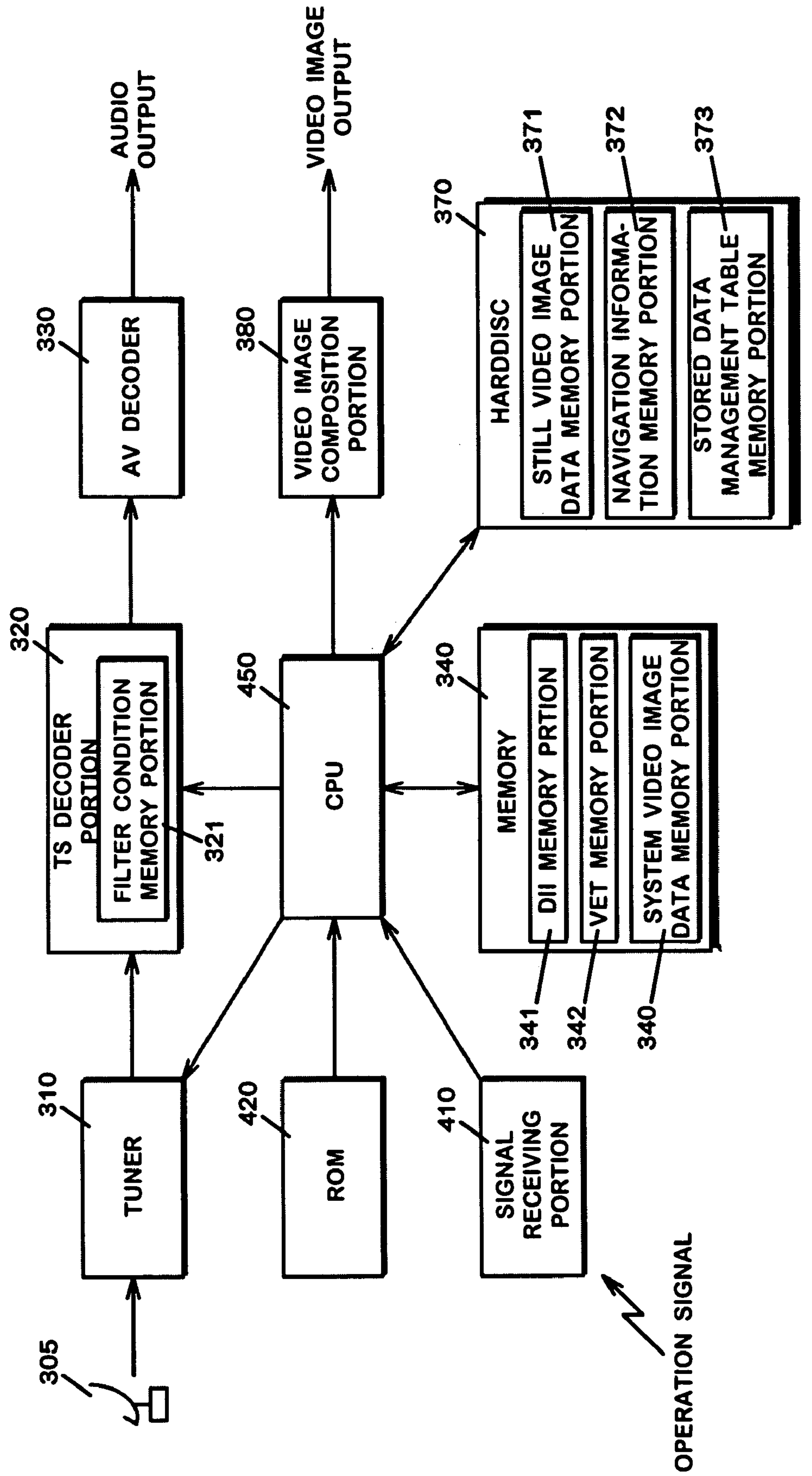
FIG. 21 is a view showing the hardware configuration of a digital broadcast receiver.

FIG. 21 shows a hardware construction where a receiver shown in FIG. 20 is achieved by using a CPU. In this preferred embodiment, a tuner 310 corresponds to a receiving portion 310. Further, the receiving portion may be a device which receives wired broadcasting. Also, a signal-receiving portion 410 which receives signals such as a remote controller corresponds to an operation receiving portion 410. Further, the operation receiving portion may be an operating button, etc., which is provided in the receiver body. A ROM 420 stores programs which causes the CPU 450 to carry out a receiving process, recording process, and reproducing process. Also, a memory 340 is constructed to be rewritable and is for temporarily recording information. Hardware 370 corresponds to a program data storing portion 370.

Herein, first, a description is given of setting of filter conditions of a TS decoder portion 320. The TS decoder portion 320 has a filter condition storing portion 321 which stores filter conditions established by a receiving CPU 450, and the TS decoder portion 320 separates image data having designated identifiers or audio data from a transport stream outputted from the receiving portion 310 and outputs them to an AV decoder portion 330. Also, the TS decoder portion 320 separates table data having designated identifiers and outputs them into an area secured in the receiving data storing portion 340 or program data storing portion 370 in compliance with the identifiers. It further separates PCR (reference clock information) of 1106 or a designated identifier and outputs it into the AV decoder portion 330. In addition, a plurality of filter conditions can be simultaneously stored in the filter condition storing portion 321, and the TS decoder portion 320 can carry out a plurality of separation processes in parallel.

FIG. 25 is a view showing an example of a filter condition table stored by the filter condition storing portion 321. Each line of a filter condition table 2201 expresses one filter condition. A "Filter identifier number" 1101 is a number for identifying the respective filter conditions. In a row "START/STOP" 1102, "START" is set where the respective filter conditions are commenced, and "STOP" is set where the respective filter conditions are stopped. A TS decoder portion 123 performs a filter process on the basis of the filter condition which is a commenced state, but does not perform separation on the basis of the filter conditions which are in a stop state. A PID value of data separated by the respective filter conditions is established in a row "PID" 1103. A stream-id value of data separated by the respective filter conditions is set in a row "stream-id" 1104. A "table-id" 1105 of data separated by the respective filter conditions is established in a row "table-id" 1105. As well, a "table-id-extension" value of data separated by the respective filter conditions is set in a row "table-id-extension" 1106. In a case where "-" is set in rows "PID" 2204, "stream-id" 2205, "table-id", and "table-id-extension" 2206, there is no condition. That is, even though the value of the identifier is any value, it is meant that the data is separated. An output address to which separated data are outputted is set in "Output" 2207.

A line corresponding to a filter identifier number [0] of the filter condition table expresses a filter condition of image data. An AV decoder portion 330 is designated in the [Output address] 1107, wherein a row [table-id] 1105 and row [table-id-extension] 1106 cannot be established. Values of PID and stream-id of image data to be separated by the TS decoder portion 320 are set in the TS decoder portion 320.

A line corresponding to a filter identifier number [1] expresses a filter condition of a stream comparison table VET. A VET storing portion 342 is set in the [output address] 1107, and the row [stream-id] 1104 cannot be set. PID of the image data to be separated by the TS decoder portion and values of table-id and table-id-extension are designated in the row [PID]I 1103, row [table-id] 1105, and row [table-id-extension] 1106.

A line corresponding to a filter identifier number [2] expresses a filter condition of navigation information. A navigation information table storing portion 372 is set in the [output address] 1107, and the row [stream-id] 1104 can not be set. PID of the navigation information table to be separated by the TS decoder portion 320 and values of table-id and table-id-extension are set in the row [PID] 1103, row [table-id] 1105 and row [table-id-extension].

A line corresponding to a filter identifier number [2] expresses a filter condition of the navigation information. A navigation information table storing portion 372 is set in the [output address] 1107, and the row [stream-id] 1104 cannot be set. PID of the navigation information table to be separated by the TS decoder portion 320 and values of table-id and table-id-extension are designated.

A line corresponding to a filter identifier number [3] expresses a filter condition of VET-DII. The DII storing portion 341 is set in the [output address] 1107, and the row [stream-id] 1104 cannot be set. Further, the row [table-id-extension] 1106 is not set as a filter condition. PID of the VET-DII to be separated by the TS decoder portion 320 and a value of table-id are designated in the row [PID] 1103 and row [table-id-extension] 1106.

A line corresponding to a filter identifier number [4] expresses a filter condition of NVT-DII. A DII storing portion 341 is set in the [output address] 1107, and the row [stream-id] 1104 cannot be set therein. Further, the row [table-id-extension] 1106 is not set as a filter condition. PID of the NVT-DII to be separated by the TS decoder portion 320 and a value of table-id are set in the row [PID] 1103 and row [table-id-extension] 1106.

Also, [START] or [STOP] is set in the row [START/STOP] 1102 of the respective filter conditions by the CPU 450, whereby a START state or a STOP state is established.

Further, the filter condition storing portion 321 further stores system information tables such as NIT, SDT, EIT, PAT, PMT, etc., and filter conditions (not illustrated) for PCR (reference clock information) in addition thereto.

The TS decoder portion 320 separates, from the transport streams 1801 illustrated in FIG. 11, ones which are made coincident with the filter conditions, sets the filter condition table in FIG. 25, stores them in the fields designated by the output address, and indicates to the CPU 450.

The AV decoder portion 330 has a clock portion (not illustrated). The clock portion is set to the correct reference time by a value of the PCR (reference clock information) outputted by the TS decoder portion 320 and counts the time which will be the reference to decode image data and audio data while securing correct synchronization. Further, the AV decoder portion 330 decodes the image data and audio by the unit of decoding, in compliance with instructions of the CPU 450, outputs them while securing synchronization by the clock portion, and indicates a success of decoding to the CPU 450. Also, the AV decoder portion 330 outputs the image data (MPEG-1 frame) data and audio data stored in the program data storing portion 370 while securing synchronization by the clock portion and indicates a success of decoding to the CPU 450.

Figure 22:
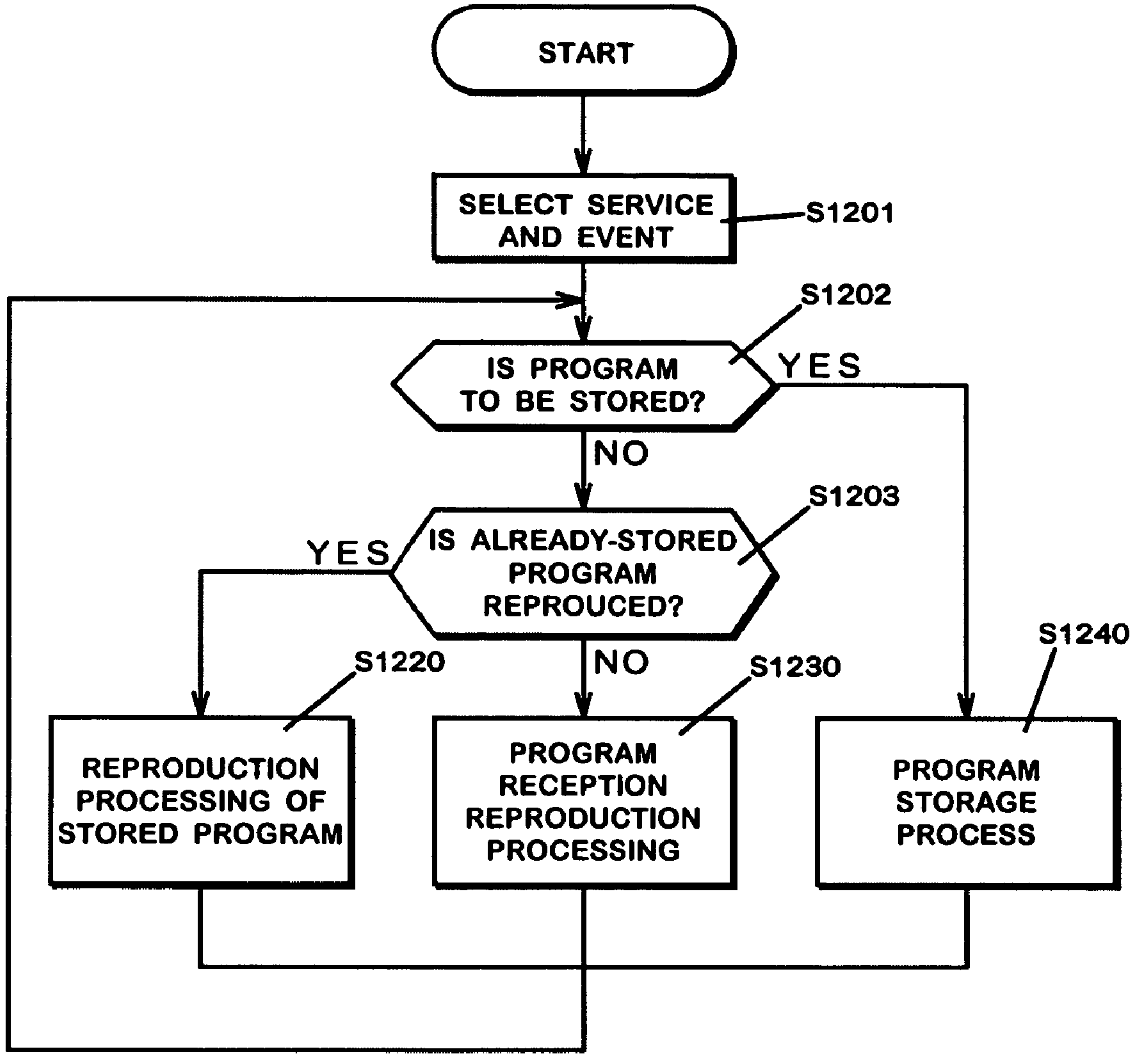
FIG. 22 is a view showing a flowchart of reception, recording, and reproduction processing.

FIG. 22 is a flow chart showing a sequence of actions of a digital broadcast receiver stored in the ROM 420. First, Service and Event predetermined in the digital broadcast receiver are selected (Step S1201), wherein when an instruction of accumulating the program data specified by the selected service and event is not provided (Step S1202), an accumulating process of programs is carried out (Step S1240).

Where an instruction of accumulating program data is not provided in Step S1202, but a reproduction instruction of the accumulated programs is provided, or where a reproduction instruction of programs is provided and the instructed programs are already accumulated (Step S1202), the reproducing process of the accumulated programs is carried out (Step S1220).

Where a reproduction instruction of a program is provided and the designated program is not accumulated in Step S1203, a receiving reproduction process of the program is carried out (Step S1230). A description will be given later of a method for judging whether or not the designated program has already been accumulated.

Where, after accumulating process in Step S1240, or a reproducing process of the accumulated programs in Step S1220 or a receiving reproduction process of programs in Step S1230 is carried out, receiving and reproduction or accumulation of programs are carried out by selection of new service and/or event in accordance with a result of input processes, etc. made by a user among them, the processes after Step S1202 are repeated.

Figure 23:
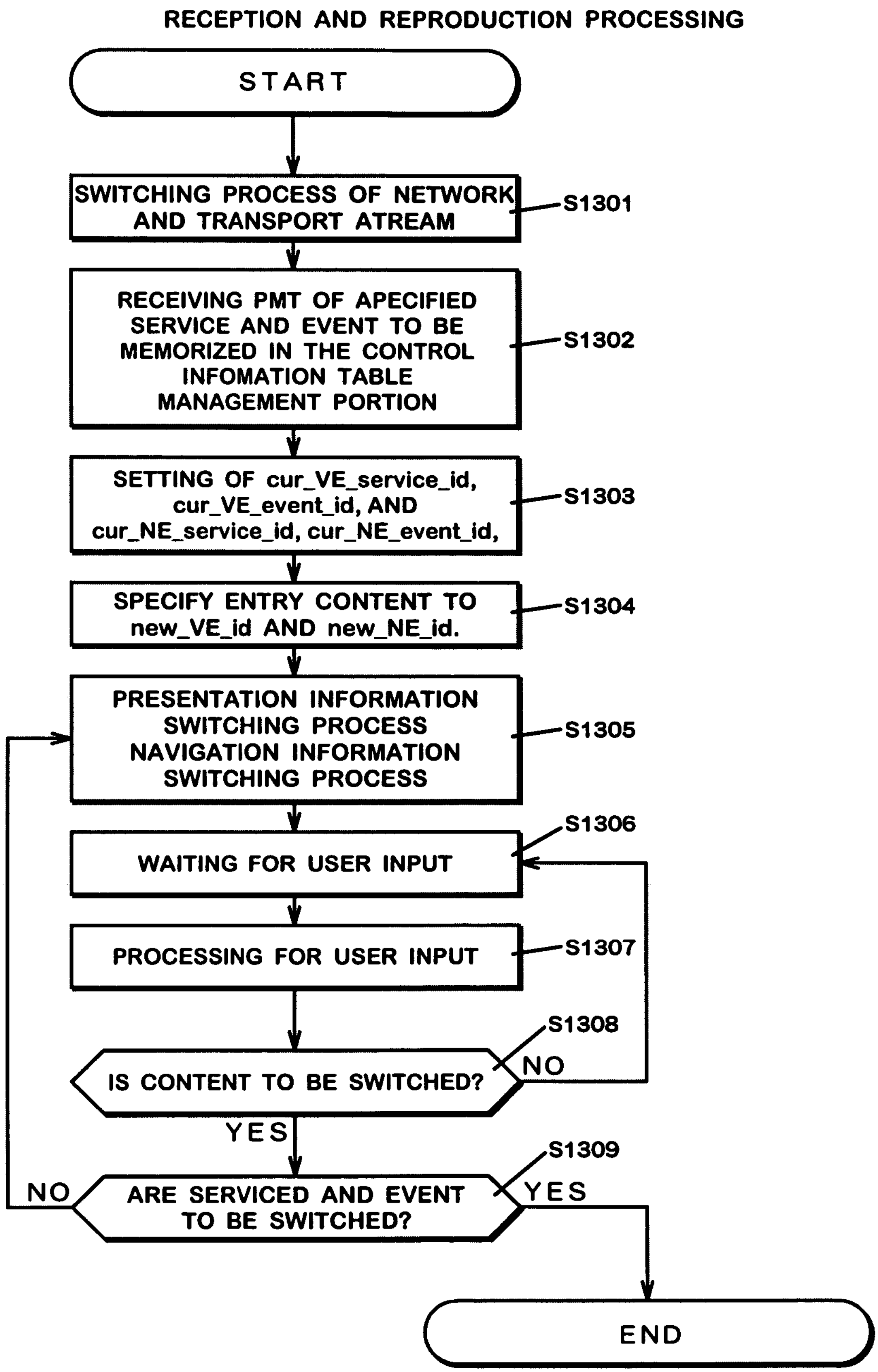
FIG. 23 is a view showing a flowchart of reception and reproduction processing.

First, a detailed description is given of a receiving and reproducing process of programs in Step S1230. FIG. 23 shows a flow chart of actions of receiving and reproducing by selecting programs and selecting program data from broadcasting.

First, in cases where, when a program is selected, the initial state exists where a variable cur-original-network-id and a variable cur-transport-stream-id are not set, or a variable original-network-id in which a service having the selected program included is transmitted is not coincident with the cur-original-network-id, and a variable transport-stream-id is not coincident with a variable cur-transport-stream-id, the CPU 450 performs the next process. With reference to the system information table in compliance with the procedures defined in the standards ISO13818-1 (MPEG2 system) and ETS 300 468 (DVB-SI), which are used in general satellite digital broadcast receivers, a switching process to the transport stream identified by the original-network-id and transport-stream-id is carried out, wherein values of the variable cur-original-network-id and variable cur-transport-stream-id are renewed (Step S1301).

Next, With reference to the system information table in compliance with the procedures defined in the standards ISO13818-1 (MPEG2 system) and ETS 300 468 (DVB-SI), which are used in general satellite digital broadcast receivers, receiving of the transport stream is instructed to a tube 310, and separation of the PMT corresponding to the event selected is instructed to the TS decoder portion 320. Next, the CPU 450 acquires an identifier of PCR with reference to the PMT which the TS decoder portion 340 writes in the system information table storing portion 343 of a memory 340, and set it in the filter condition storing portion 321 of the TS decoder 320 (Step S1302).

Next, the CPU 450 sets the original-network-id of the selected event in the variable cur-original-network-id, sets the transport-stream-id of the selected event in the variable cur-transport-stream-id, designates a service-id of the service selected by the variable cut-VE-service-id and variable cur-NE-service-id, sets the even-id of the event selected by the variable cur-VE-event-id and variable cur-NE-event-id, and clears the variable cur-VE-id and variable cur-NE-id. These variables express information of an identifier of the contents which are now being reproduced (Step S1301).

Next, the CPU 450 sets values of entry-VE-id and entry-NE-id in the variables new-VE-id and new-NE-id with reference to the DVX-program-descriptor of the PMT of the system information table storing portion 343 acquired in Step S1302 (Step S1304).

Next, the CPU 450 carries out, in parallel, a switching process of presentation information and navigation information on the basis of the variables new-VE-id and new-NE-id which are obtained in Step S1304, as a switching process of contents (Step S1305). A detailed description will be given of the switching process later.

Next, the CPU 450 waits for a signal input of selecting operation from a user, which is indicated from the signal receiving portion 410 (Step S1306).

The CPU 450 carries out a processing of a user input signal where the signal is inputted from the signal receiving portion 410. A detailed description will be given of a processing of the user input signal (Step S1307).

Next, as a result of the input process in Step S1307, where it is judged that a switching of the contents is not designated (Step S1308), the CPU 450 returns to Step S1306 and waits for a signal inputted by a user.

Where a switching of contents is designated, it is judged whether or not alternation of service or event is simultaneously accompanied (Step S1309). If the alternation is not accompanied, the process returns to Step S1305, wherein the CPU 450 performs a switching process of the contents. Further, where alternation of service or event is accompanied, the CPU 450 terminates a receiving reproduction process of programs and returns to Step S1202 in FIG. 22.

(Switching Process of Presentation Information)

Figure 24:
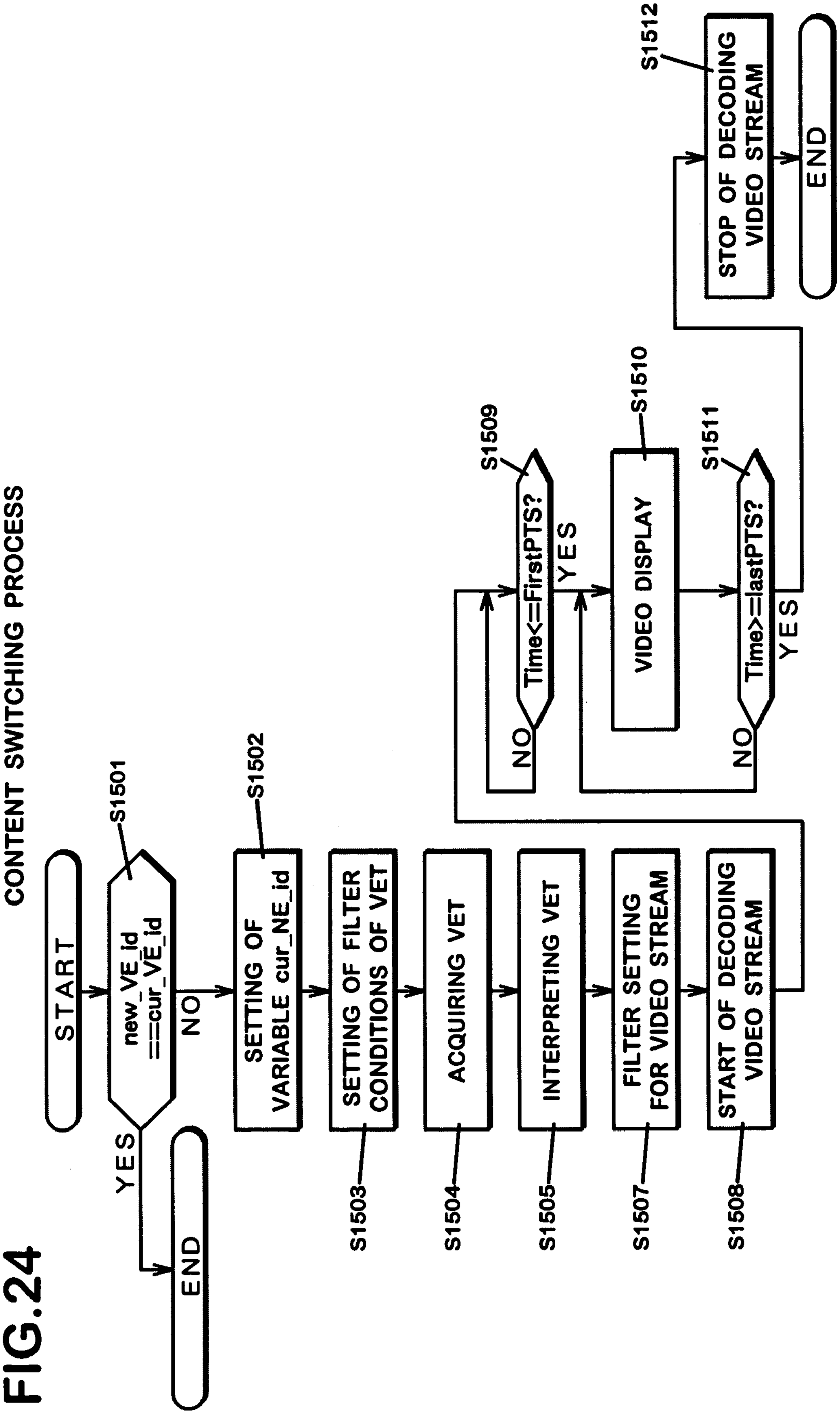
FIG. 24 is a view showing a flowchart of content switching process.

Next, a detailed description is given of a switching process of presentation information (still image data), of the switching process of contents in step S1305, with reference to a flow chart in FIG. 24.

The receiving portion 450 judges (step S1501) whether or not the value of a variable new-VE-id and that of cur-VE-id are identical to each other. If they are identical to each other, the process is terminated. In the initial state where a program is selected, the variable new-VE-id is entry-VE-id, and no cur-VE-id is set. The CPU 450 sets a value of the variable new-VE-id in the variable cur-VE-id (Step S1502).

The CPU 450 fetches PID=0×0083 of a component to which a VE-Information-Component-Descriptor is attached, with reference to PMT illustrated in FIG. 9(*b*) in the system table storing portion 343, and establishes table-id=0×90, which expresses VET, and a value of the variable new-VE-id in the filter conditions as table-id-extension, and further causes the filter conditions to enter a start state (Step S1503). Herein, for only the description, it is assumed that new-VE-id=0×0001.

FIG. 26 shows filtering conditions set and stored with respect to the filter condition storing portion 321 when receiving and reproducing contents. The filter condition of a filter identifying number [1] of the filter conditions illustrated in FIG. 26 is a condition regarding to the VET filter, wherein [PID]=0×0083 [table-id=0×90] [table-id-extension=0×0001] is set as a filter condition, and a VET storing portion 342 is set as an output address of VET which meets the filter condition. The other filter conditions shown in FIG. 26 will be described later.

The TS decoder portion 320 separates a VET corresponding to a value of the variable new-VE-id from the transport stream in compliance with the filter conditions, stores the VET in the VET storing portion 342 and indicates it to the CPU 450 (Step S1504).

Next, the CPU 450 interprets the VET stored in the VET storing portion 322 in Step S1504, sets a value of [first-pts] in the variable first PTS and a value of [last-pts] in the variable last PTS, and fetches [stream-pts] and [component-tag] (Step S1505).

Next, the CPU 450 initializes a flag [first-flag] to [0], which express whether or not the first frame of image data is successfully decoded (Step S1506).

Next, with reference to PMT corresponding to the events identified by variables cur-VE-service-id and cur-VE-event-id in the system table storing portion 343, the CPU 450 fetches PID=0×0084 of a component to which stream-identifier-descriptor having the value of [component-tag] equal to a value of [component-tag] fetched in Step S2612 is attached, with the type of data to be transmitted being image data, sets it in the filter conditions of image data in the filter condition storing portion 321 along with a value 0xe5 of [stream-id] fetched in Step S2612, and causes this filter condition to enter a start state (Step S1507) Conditions of filter identifying number [0] in FIG. 26 are filter conditions regarding the image data.

The TS decoder portion 320 separates image data in compliance with the filter conditions and outputs to the AV decoder portion 330. The AV decoder portion 330 commences decoding of vide elementary stream (compressed image restoration or elongation) outputted from the TS decoder portion 320 (Step S1508).

The CPU 450 fetches the current time by the unit of one-$90000^{th}$ second with reference to a value of the clock portion of the AV decoder portion 330, and compare the current time with the value of a variable firstPTS, wherein if they are equal to each other or the current time is larger than the value of the variable first PTS, the process goes to S2626. In all the other cases, the same process is repeated until the current time reaches the value of firstPTS (Step S1509).

The CPU 450 output the image data outputted from the AV decoder portion as the current time reaches the value of firstPTS to a picture synthesizing portion 380 (Step S1510).

At the same time, the CPU 450 continuously fetches the current time by the unit of one-$90000^{th}$ second with reference to the value of the clock portion of the AV decoder portion 330, and compares it with the value of the variable lastPTS, wherein the comparison process is repeatedly performed until the current time becomes equal to or larger than the value of the variable lastPTS (Step S1511).

As the current time value exceeds the value of the lastPTS, the CPU 450 stops outputting of image data to the picture synthesizing portion and causes the filter condition regarding to the image data to enter a stop state. Further, the CPU 450 terminates a decoding process of the video stream (Step S1512)

(Switching Process of Navigation Information)

Figure 27:
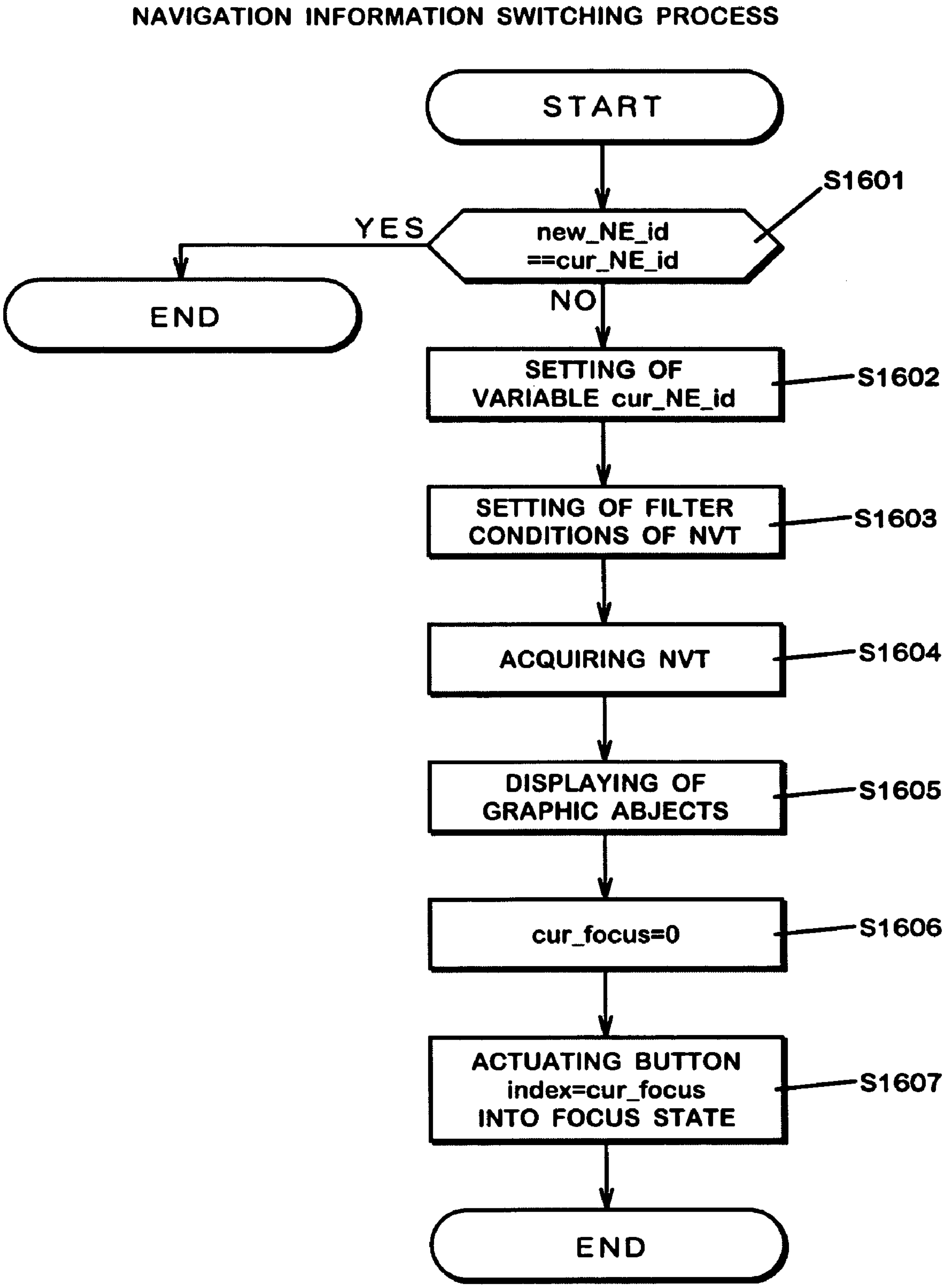
FIG. 27 is a view showing a flowchart of navigation information switching process.

Next, with reference to a flow chart in FIG. 27, a detailed description is given of a switching process of navigation information in the contents switching process in Step S1305 in FIG. 23.

The CPU 450 judges whether or not the value of new-VE-id designated to be switched is identical to that of the cur-VE-id (Step S1601). If they are identical to each other, the process is then terminated. However, in the initial state where a program is selected, the value new-NE-id is entry-NE-id, and no cur-NE-id is set.

The CPU 450 sets a new-NE-id in the variable cur-NE-id (Step S1602).

The CPU 450 fetches PID=0×0082 of a component to which a NE-Component-Descriptor is attached with reference to the PMT designated in FIG. 18B in the system table storing portion 343, sets table-id=0×80 expressing NVT and a value of a variable new-NE-id in the filter conditions as table-id-extension, and cause the filter conditions to enter in a start state (Step S1603). Herein, for only the description, it is assumed that the filter condition is new-NE-id=0×0001.

The filter condition of filter identifying number [2] of the filter conditions shown in FIG. 26 is a condition regarding the NVT, wherein [PID]=0×0082 [table-id=0×80] [table-id-extension=0×0001] is set as filter conditions, and the navigation information storing portion 372 is set as an output address of the NVT which meets the filter condition.

The TS decoder portion 320 separates an NVT corresponding to the value of variable new-NE-id from the transport stream in compliance with the filter conditions, stores it in the navigation information storing portion 372 and indicates it to the CPU 450 (Step S1604).

Next, the CPU 45—reproduces the navigation information table NVT fetched in Step S1604 from the navigation information table storing portion 372 on the basis of the navigation information interpreting programs. The CPU 450 fetches display coordinates [X] and [Y] of a button object and continuously fetches an index value of [Normal Bitmap], wherein with reference to a bitmap table, the CPU 450 fetches bitmap data corresponding to the index value, and on the basis of the bitmap data, the CPU 450 generates graphic information of the button and outputs it to the picture synthesizing portion 380. The picture synthesizing portion 380 causes the graphic information to overlap on the image data decoded by the AV decoder portion 330 and outputs it to a display 400 (Step S1605).

A variable cur-focus, which expresses the index value of a button object being currently selected, is initialized to 0 (Step S1606). With an object definition table of the navigation information table storing portion 372 fetched in Step S1604 in the navigation information table storing portion 372, the CPU 450 fetches display coordinates [X] and [Y] of the button object in which the index value is equal to a value of the variable cur-focus, and continuously fetches bitmap data corresponding to the index value with reference to the bitmap table while fetching the index value of [focused bitmap]. The CPU 450 generates graphic information of the button object in which the bitmap of the button having the index value corresponding to the variable cur-focus is caused to enter a selected state on the basis of the above bitmap data, and outputs to the picture synthesizing portion 38. Herein, a switching process of navigation information is terminated (Step S1607).

FIG. 10A shows one example of a display outputted to the display portion 400, wherein still image data containing a Japanese map is outputted with buttons, with which Tokyo and Osaka can be selected, overlapped thereon. In this example, a button object in which the label is Tokyo is set as a variable cur-focus, and bitmap data corresponding to the focus state are displayed.

[Process of Input Signals]

Figure 28:
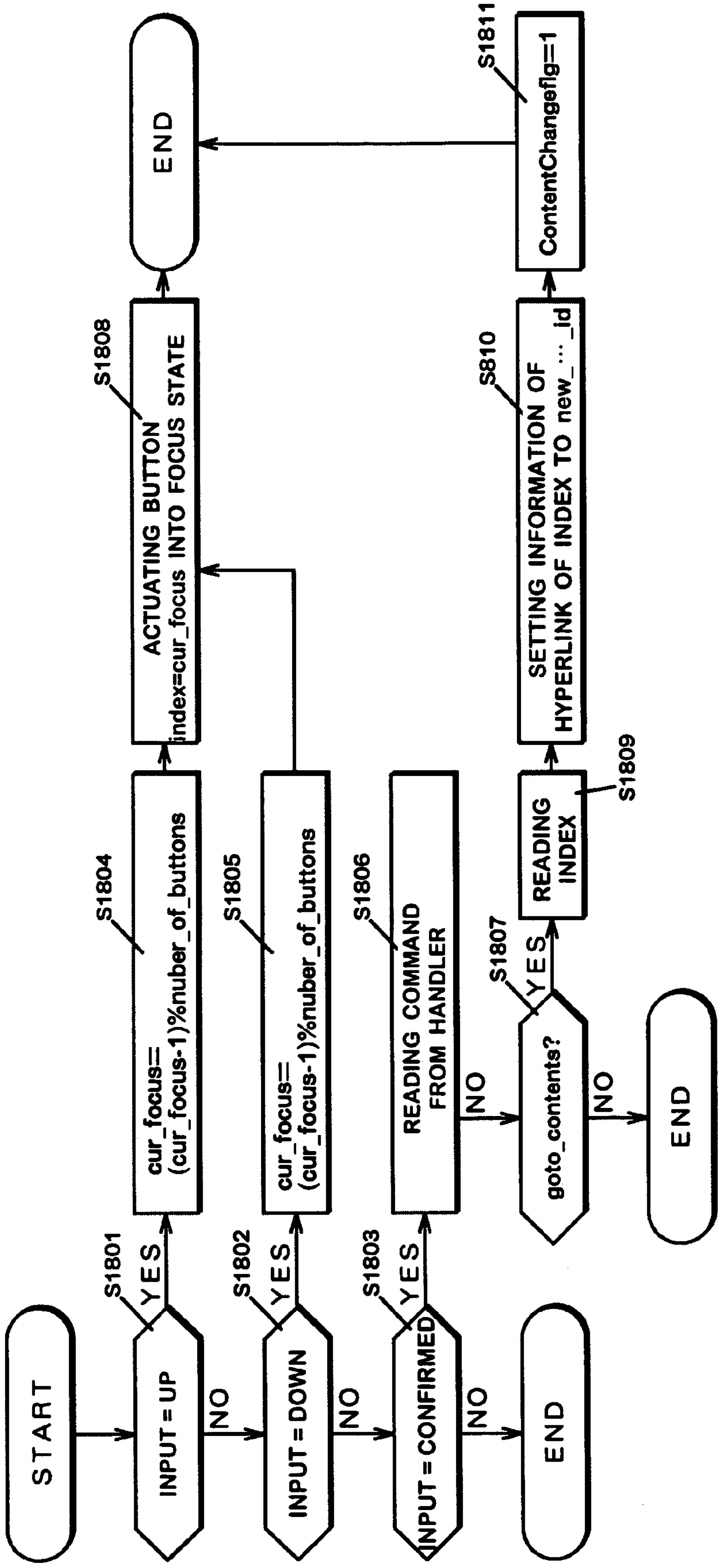
FIG. 28 is a view showing a flowchart of user input signal processing.

Next, a description is given of a process of input signals made by a user in Step S1307 with reference to a flow chart of FIG. 28.

The CPU 450 judges whether or not the user input received by the signal receiving portion 410 is [UP]. In the case of [UP], the process advances to Step S1804, and if not so, the process shifts to Step S1802 (Step S1801).

The CPU 450 subtracts the value of the variable cur-focus by one. However, in a case where the value of the variable cur-focus is already 0, the value remains as it is 0 (Step S1804).

With reference to the object definition table in the NVT in the navigation information table storing portion 372, the CPU 450 fetches display coordinates [X] and [Y] of a button object in which the index value is equal to the value of the variable cur-focus, and continuous fetches an index value of [Focused Bitmap], wherein with reference to the bitmap table, the CPU 450 fetches the bitmap data corresponding to the index value, and causes the bitmap of a button having the index value corresponding to the value of the variable cur-focus to enter a selected state. Further, the CPU 450 generates graphic information of the button object in which the bitmap of the button corresponding to the index value corresponding to the value of the variable cur-focus is caused to become a bitmap in a usual state. Hereby, the CPU 450 terminates a switching process of the navigation information. The CPU 450 causes the graphic information to overlap on the image data decoded by the AV decoder portion 330, and displays it on a display 400. Hereby, a user input process is then terminated (Step S1808).

The CPU 450 judges whether or not the user input received by the signal receiving portion 410 is [DOWN]. In the case of [DOWN], the process advances to Step S1805, and if not so, the process shifts to Step S1803 (Step S1802).

The CPU 450 increments the value of the variable cur-focus by one. However, if the value of the variable cur-focus is equal to the maximum value of an identifier of the button object in the navigation information table NVT fetched by S2710 in the navigation information table storing portion 133, the value of the variable cur-focus remains unchanged, and the process shifts to Step S1808 (Step S1805). The CPU 450 judges whether or not the user input received by the signal receiving portion 410 is [DECIDE]. In the case of [DECIDE], the process advances to Step S1806, and if not so, the user input process is terminated (Step S1803).

With reference to the object definition table of the NV in the navigation information storing portion 372, the CPU 450 fetches an index value of a handler of the button object in which the index value is equal to the value of the variable cur-focus, and with reference to the handler definition table, reads a byte code instruction from the handler corresponding to the index value (Step S1806).

If the byte code instruction is [goto-contents], the process advances to Step S1809, and if not so, the process is then terminated (Step S1807).

The CPU 450 reads the index value of an argument of the goto—contents instruction from the handler (Step S1809).

With reference to a hyper link table of the abovementioned navigation information table, the CPU 450 sets values of VE-id and NE-id of identifiers of the contents corresponding to the index values read in Step S1810 in the respective new-VE-id and new-NE-id (Step S1810).

The CPU 450 sets the value of a contents change flag Contents Changeflg to [1] as a flag showing that a change request of contents occurs, and the user signal process is then terminated (Step S1811).

FIG. 10B shows display when [DOWN] is inputted by the user. With input of [DOWN], the variable cur-focus is changed to a button object having [OSAKA] as a label. In line therewith, the bitmap data displayed as a button object are changed.

In compliance with the procedures described with reference to FIG. 22 through FIG. 28, receiving and reproduction of programs by a digital broadcast receiver 300 and contents switching with input operations by a user are achieved.

(Accumulation Process of Program Data)

Next, a detailed description is given of a program accumulating process in Step S1240. First, the contents of an accumulating data management table stored in the program data storing portion 370 is explained. The accumulating data management table is stored as one file corresponding to one program data.

The accumulating table management table is included in the following directories made hierarchical by utilizing original-network-id, transport-stream-id, service-id, and event-id of the corresponding programs and is prepared as original-network-id/transport-stream-id/service-id/event-id whose file name is [saveinfo].

FIG. 29 shows an example of an accumulating data management table 1900. The accumulating data management table 1900 consists of an accumulating completion flag field 1901, an Expiration field 1902, an entry-VE-id field 1903, en entry-NE-id field 1904, an image data management table 1905, and a navigation information management table 1906.

The accumulating completion flag field 1901 is a flag showing whether or not accumulation of all data contained in the program is completed, wherein if completed, TRUE is set, and if not completed, FALSE is set.

The Expiration field 1902 is a field showing the term of validity of programs corresponding to the accumulating data management table 1900. A value of Expiration of Expiration-descriptor in the PMT illustrated in FIG. 19E is set in the Expiration field.

In the entry-VE-id field 1903, a VE-id being presentation information in contents first reproduced when reproducing programs accumulated corresponding to the accumulating data management table 1900 is set. The value is made coincident with the value of the entry-VE-id in the DVX-program-descriptor of the PMT illustrated in FIG. 19A.

An NE-id being navigation information in the contents first reproduced when reproducing programs accumulated corresponding to the accumulating data management table 1900 is set in the entry-NE-id field 1904. The value is made coincident with the value of the entry-NE-id in the DVX-program descriptor illustrated in FIG. 19A.

VE-id for the respective still image data, and storing position and size, in the still image data storing portion 371, are set as accumulating information of still image data being all presentation information contained in programs corresponding to the accumulating management table 1900 in a case where still image data identified by VE-id, and a pair of accumulating flags are set, in which TRUE is set where the still image data are accumulated, and FALSE is set where the still image data are not accumulated.

As well, NE-id for the respective navigation information, storing position and size, in the navigation information storing portion 372, where the navigation information identified by the NE-id, are set in the navigation information management table 1906 as accumulating information of all navigation information, and a pair of accumulating flags are set, in which TRUE is set where the navigation information is accumulated, and FALSE is set where the navigation information is not set.

Figure 30:
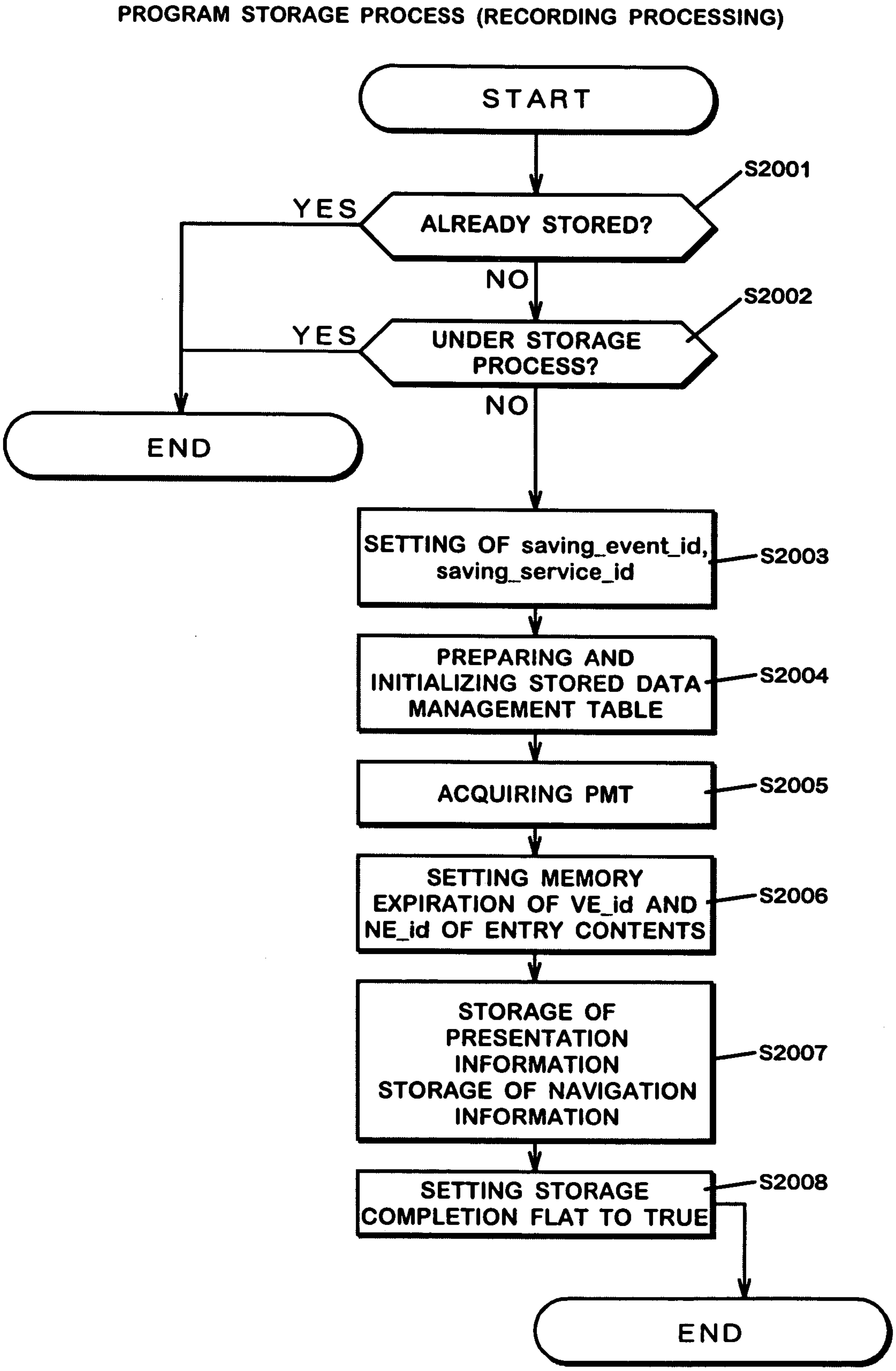
FIG. 30 is a view showing a flowchart of program storage process.

FIG. 30 is a flow chart showing detailed procedures of a program accumulating process.

First, as an instruction of accumulation is issued by a user, the CPU 450 judges whether or not the selected program is already accumulated (Step S2001). The conditions to affirm that the selected program is already accumulated are that an accumulating data management table which is coincident with original-network-id/transport-stream-id/service-id/event-id/saveinfo exists in the accumulating data management table storing portion 373, the value of the accumulating completion flag field is TRUE, and the current time is before the time designated by Expiration. By the above judgement, if it is judged that the selected program is already accumulated, the process is terminated.

In Step S2001, if it is judged that the program is not accumulated, the CPU 450 judges whether or not the program is being accumulated (Step S2002). The conditions to affirm this judgement are that an accumulating data management table which is coincident with the original-network-id/transportat-stream-id/service-id/event-id/saveinfo exists in the accumulating data management table storing portion 373 and the value of the accumulating completion flag field is FALSE.

Where the judgment in Step S2002 becomes affirmative, no new process is performed, and the accumulating process being now performed is continued.

Where the judgment in Step S2002 becomes negative, a new accumulating process is commenced. First, a selected service-id is set in saving-service-id as a variable showing he object for which an accumulating process is now carried out, and a selected even-id is set in a variable saving-even-id (Step S2003).

Next, an accumulating data management table in which the file name is coincident with the original-network-id/transport-stream-id/service-id/event-id/saveinfo is prepared in the accumulating data management table storing portion 373. And, the value of the accumulating completion fag is initialized to FALSE (Step S2004).

Next, the CPU 450 instructs separation of PMT to the TS decoder portion 320, which corresponds to an event identified by the designated service-id and -event-id with reference to the system information table in compliance with the procedures defined in standards ISO138118-1 (MPEG2 system) and ETS 300468 (DVB-SI) which are generally used in a satellite digital broadcast receiving system.

The TS decoder portion 320 separates the designated PMT, writes it in the system information table storing portion 343 in the control information table management portion 343, and indicates it to the CPU 450 (Step S2005).

With reference to entry-VE-id and entry-NE-id in the DVX-program-descriptor in the PMT corresponding to the events identified by saving-service-id and saving-event-id in the system table storing portion 343, the respective values are set in the entry-VE-id field and entry-NE-id field in the accumulating data management table. Further, with reference to the value of expiration in the expiration-descriptor in the PMT, they are set in the expiration field in the accumulating data management table.

Thereafter, accumulating processes pertaining to presentation information and navigation information are carried out in parallel (Step S2007).

As the accumulating processes of all presentation information and navigation information are completed, the accumulating completion flag is set to TRUE, and the accumulating processes are completed (Step S2008).

(Accumulating Process of Presentation Information)

Hereinafter, a detailed description is given of the accumulating process of presentation information, which is carried out in Step S2007, with reference to a flow chart in FIG. 31.

With reference to PMT corresponding to the events identified by variables saving-service-id and saving-event-id in the system table storing portion 134, the CPU 450 fetches PID of a component to which VE-Information-Component-Descriptor is attached, and sets a table-id=0×91 showing VET-DII and a filter condition, which designates the DII storing portion 341 as an output address, to the TS decoder portion 320 as a start state (Step S2201).

Figure 31:
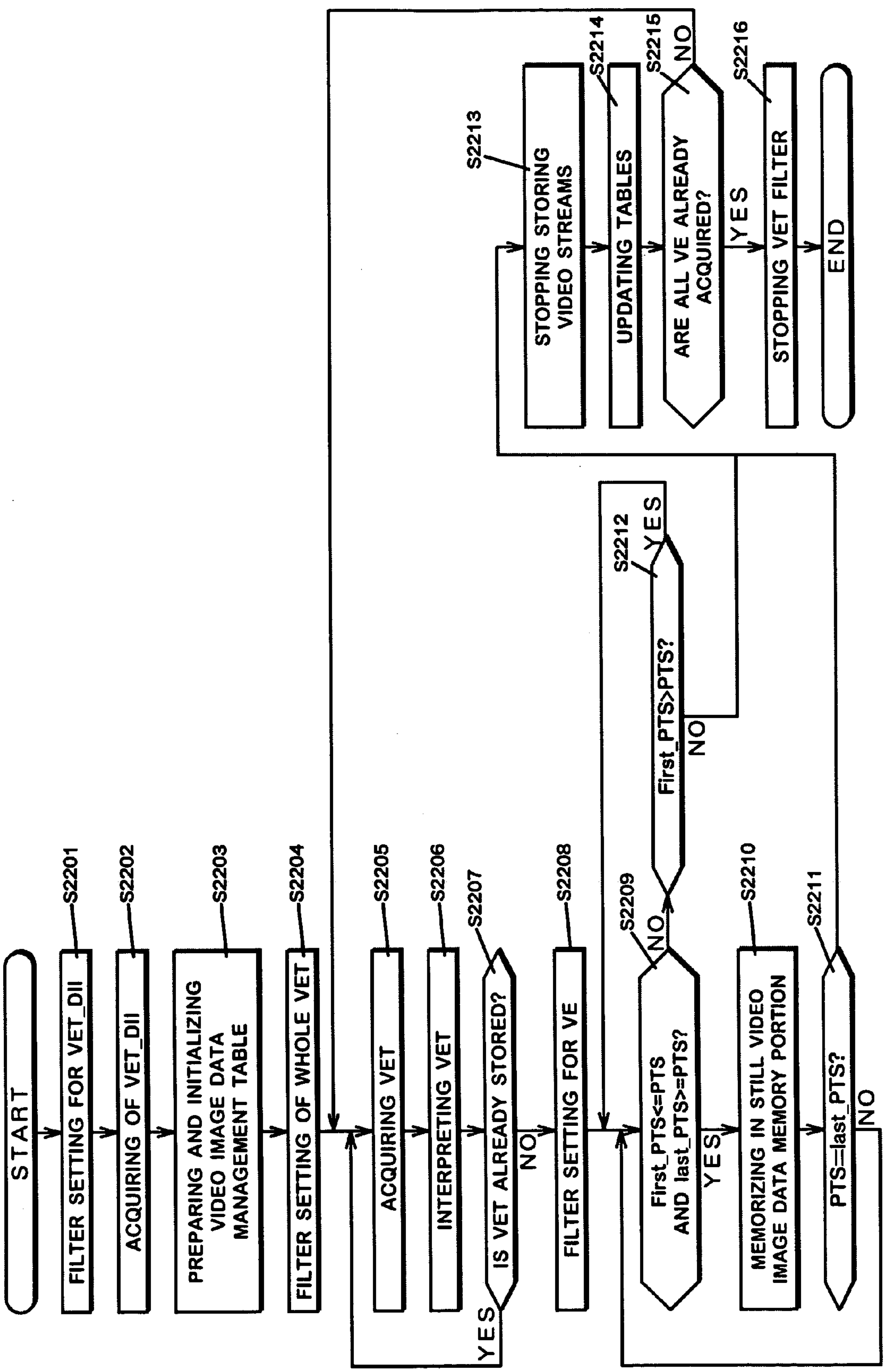
FIG. 31 is a view showing a flowchart of presentation information storage process.

FIG. 31 shows a filter condition to be set when performing an accumulating process of programs. The filter condition of the filter identifier [3] expresses a condition set by Step S2201.

Also, separately therefrom, the PID=0×0083 which is the same as above, and a filter condition designating a VET storing portion are set in the TS decoder portion 320 as an output address of table-id=0×80 showing the VET. However, being different from receiving and reproduction of programs, the field of table-id-extension is [-], that is, separation is carried out even though the value is any, and in the stage of step S2201, the filter condition is set in a still state.

In FIG. 32, the filter conditions of the filter identifying number [1] relates to VET, and [PID]=0×0083, [table-id=0×90] and [table-id-extension=-] are set as filter conditions, wherein a VET storing portion 342 is set in the [output address] as an output address of the VET which meets the filter conditions.

The TS decoder portion 320 separates VET-DII from the transport stream in compliance with the filter conditions, stores it in the DII storing portion 134, and indicates it to the CPU 450 (Step S2202).

Figure 7:
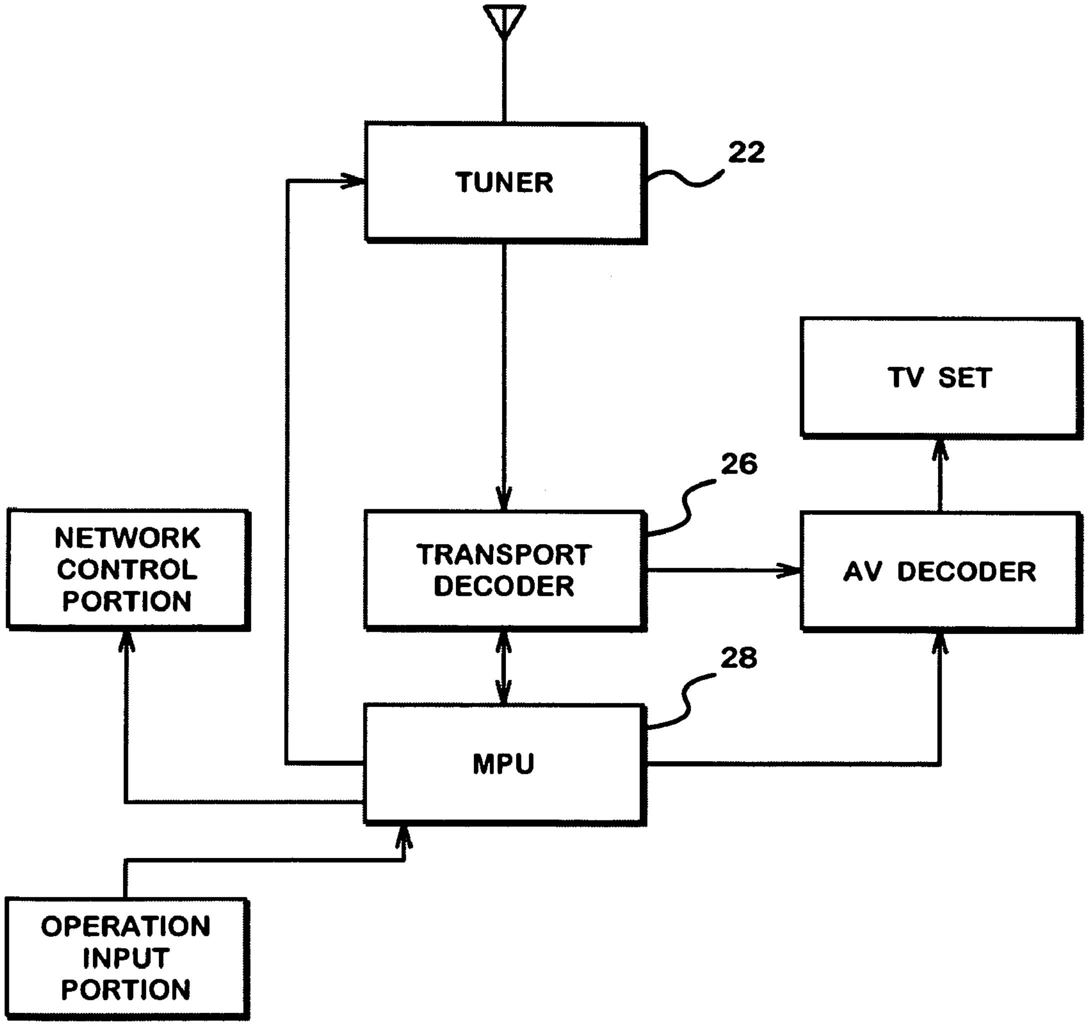
FIG.7 PRIOR ART
FIG. 7 is a view showing the configuration of a receiver.

With reference to the contents of the VET-DII stored in the DII storing portion 341, the CPU 450 carries out an initializing process of an image data management table in the accumulating data management table stored in the accumulating data management table storing portion. The Contents of the VET-DII is as shown in FIG. 7, and a field area of the image data management table equivalent to the value of the number-of-modules therein can be secured. Further, the value of module-id is set in the field of VE-id of the image data management table as information regarding the individual modules in the VET-DII, and the value of module-size is set in the size field of the image data management table. Also, the value of the accumulating flag field is set to FALSE. Still further, a file name which VE0-id is added to [ve] is allotted as the file name in which the image data stored in the image data management table are retained.

These processes are carried out with respect to all modules described with VET-DII (Step S2203).

Next, the CPU 450 causes the filter conditions regarding the VET, which are set in Step S2201, to enter a start state (Step S2204).

In compliance with the filter conditions, the TS decoder portion 320 separates an optical VET which is first made coincident with the filter condition, from the transport stream, stores it in the VET storing portion 342, and indicates it to the CPU 450 (Step S2205).

With reference to the contents of the VET fetched in Step S2205 in the VET storing portion 342, the CPU 450 searches for a field in which the value of VE-id is made coincident with the VE-id in the image data management table in the accumulating data management table stored in the accumulating management table storing portion. Where, as a result, the accumulating flag in the filed obtained is TRUE, the fetched VET is abandoned, and the CPU 450 waits for an indication of fetching the next VET (Step S2207).

Where Step S2207 is denied, with reference to the contents of the obtained VET in Step S2205 in the VET storing portion 342, a value of [first-pts] is set in the variable firstPTS, and a value of [last-pts] is set in the variable lastPTS, and then values of [stream-id] and [component-tag] are fetched. With reference to PMT corresponding to the events identified by variables saving-service-id and saving-event-id in the system table storing portion 134, the CPU 450 fetches the PID of a component, in which the type of transmitted data is image data, having a value equal to the value of [component-tag], and sets it in the image data storing portion 371 along with the value of [stream-id]. At this time, the output address is set to the image data storing portion 371, and at the same time, the filter condition is set to a start state. In FIG. 21, the filter condition of a filter identifying number [0] is a condition regarding image data. Being different from the case of receiving and reproduction, the output address is set to the image data storing portion 371 (Step S2208).

The TS decoder portion 320 separates image data in compliance with the filter conditions, stores the image data in the image data storing portion 371, and indicates it to the CPU 450.

With reference to a PES header field of the data stored in the still image data storing portion 371, the CPU 450 judges whether or not a given PTS exists between the first-PTS and the last-PTS (Step S2209). In only the case where this condition is affirmed, data stored in the still image data storing portion 371 are added in the order that the file name is read in a file specified by [value of ve-(VE-id)], and are copied (Step S2210). Further, where the PTS is made coincident with the last-PTS (Step S2211), the process shifts to Step S2213.

In the case where the judgement in Step S2211 is denied, a fetching process of image data is continued, and the judgement in Step S2209 is repeated.

If the judgement in Step S2209 is denied, a fetching process of image data is continued where the PTS value is smaller than the First-PTS (Step S2212), and the judgment in Step S2209 is repeated.

In a case where the judgement in Step S2212 is denied, the process shifts to Step S2213.

In Step S2213, the CPU 450 causes the filter conditions regarding the image data to stop, and stops accumulating of video streams.

After that, the accumulating flag of the corresponding field in the image data management table in the accumulating data management tables stored in the accumulating data management table storing portion is set to TRUE (Step S2214).

As a result in Step S2214, where all accumulating flag fields in the image data management table are TRUE (Step S2215), it is judged that all image data in a program are fetched, the filter condition regarding the VET is stopped (Step S2216), wherein he accumulating process of the presentation information is terminated.

Where the judgement in Step S2215 is denied, the process shifts to Step S2205 in order to carry out a fetching process of the next VET (Accumulating Process of Navigation Information).

Figure 33:
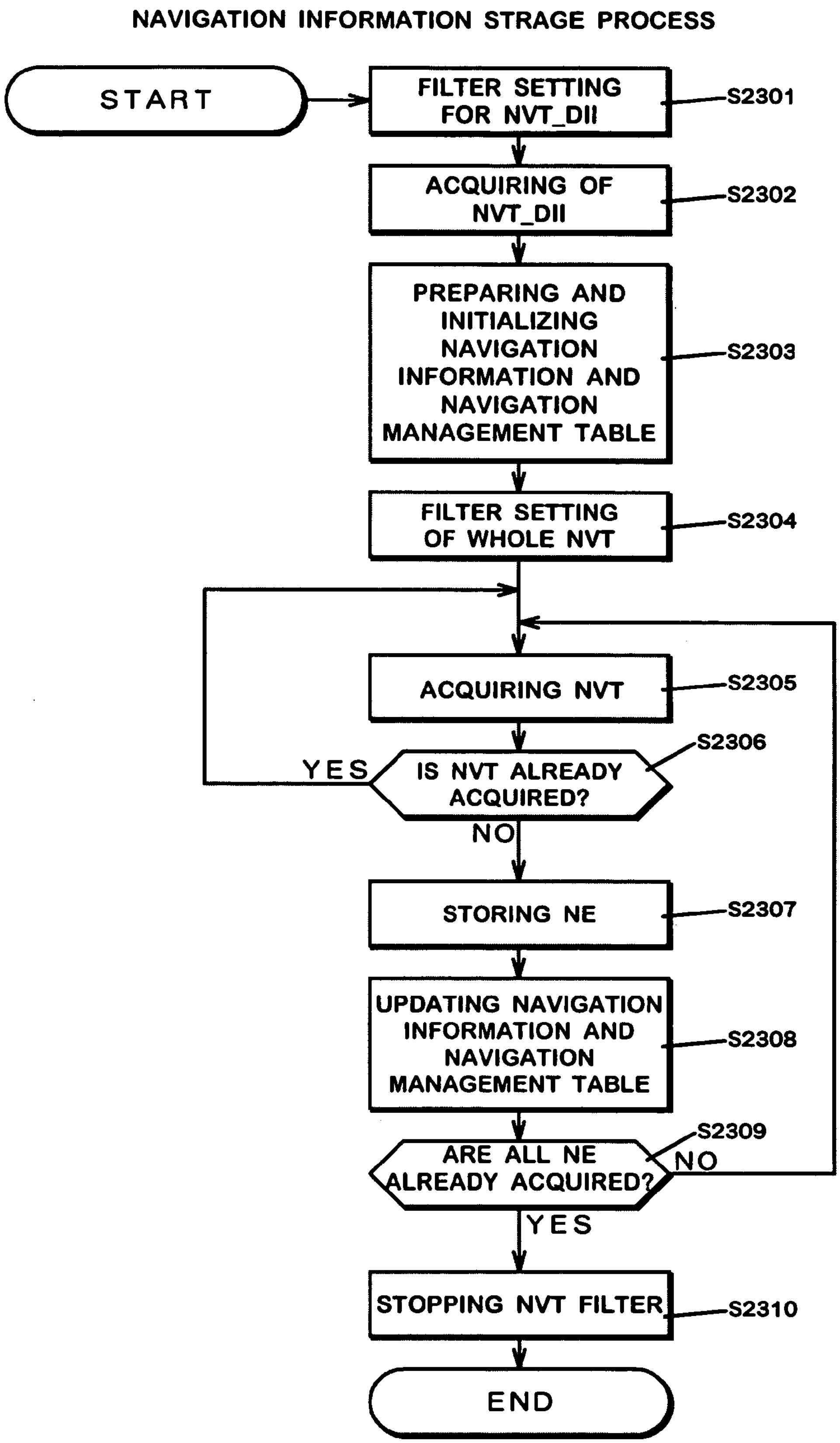
FIG. 33 is a view showing a flowchart of navigation information storage process.

Hereinafter, a detailed description is given of an accumulating process of navigation information which is performed in Step S 2007 in FIG. 30, with reference to a flow chart in FIG. 33.

With reference to PMT corresponding to an event identified by variables saving-service-id and saving-event-id in the system table storing portion 134, the CPU 450 fetches a PID=0×0082 of a component to which NE-Information-Component-Descriptor is attached, and sets table-id=0×81 showing NET-DII, and filter conditions for designating the DII storing portion 341 as an output address, to the TS decoder portion 320 as a start state (Step S2301).

In FIG. 32, the filter condition of a filter identifying number [4] expresses a condition set in Step S2301.

Also, separately therefrom, the PID=0×0082 which is the same as the above, table-id=0×80 and a filter condition designating the navigation information storing portion as an output address are set to the TS decoder portion 320. However, being different from the time when recording and reproducing programs, it is assumed that the field of table-id-extension is [-], that is, the field is separated even though the value is any value, and the filter condition is set so as to enter a stop state in the stage of Step S2301.

In FIG. 32, the filter condition of a filter identifying number [2] pertains to an NVT. The TS decoder portion 320 separates NVT-DII from the transport streams in compliance with the filter conditions, stores it in the DII storing portion 134, and indicates it to the CPU 450 (Step S2302).

With reference to the contents of the NVT-DII stored in the DII storing portion 341, the CPU 450 initializes the navigation information management table in the accumulating data management tables stored in the accumulating management table storing portion. The contents of the NV-DII are those shown in FIG. 6. A field area of the navigation information management table equivalent to the value of the number-of-modules therein is secured. Further, the value of modules-id in the NVT-DII is set in the field of NE-id of the navigation information management table as information regarding the individual modules. Also, the value of the module-size is set in the size field. Still further, the value of the accumulating flag field is set to FALSE. And, those in which NE-id is added to [ne-] is allotted as a file name in which the navigation information stored in the navigation information management table is retained. These processes are carried out with respect to all modules described in the NVT-DII (Step S2303).

Next, the CPU 450 sets the filter conditions regarding the NV set in Step S2301 to a start state (Step S2304).

In compliance with the filter conditions, the TS decoder portion 320 separates an optional NVT which is made coincident with the filter conditions, from the transport stream, stores it in the navigation information storing portion 372, and indicates it to the CPU 450 (Step S2305).

Next, upon receiving an indication in Step S2305, the CPU 450 searches for a field where the value of NE-id in the NVT stored in the navigation information storing portion 372 is made coincident with the NE-id in the navigation information management table in the accumulating data management tables stored in the accumulating data management table storing portion. As a result, where the accumulating flag in the obtained field is TRUE, the fetched NVT is abandoned, and the CPU 450 waits for a fetching indication of the next NVT (Step S2306).

Where the judgement in Step S2306 is denied, the NVT fetched in Step S2305 in the navigation information storing portion 372 is copied to a file specified by the file name [ne-(value of NE-id) (Step S2307).

And, the accumulating flag in the corresponding field in the navigation information management table in the accumulating management tables stored in the accumulating data management table storing portions is set to TRUE (Step S2308).

As a result in Step S2308, if the values of all accumulating flag fields in the navigation information management table is TRUE (Step S2309), it is judged that all navigation information in a program are fetched, wherein the filter conditions corresponding to the NVT are stopped (Step S2310), and the accumulating process of navigation information is terminated.

Where the judgement in Step S2309 is denied, the process shifts to Step S2305 in order to carry out a fetching process of the next NVT.

As described above, an accumulating process of programs in a digital broadcast receiver 300 is achieved in compliance with the procedures shown in FIG. 19 through FIG. 23.

(Reproducing Procedures of the Accumulated Data)

Hereinafter, a detailed description is given of a reproducing procedure of accumulated data in Step S1220 in FIG. 22. Before that, a judgement about whether or not programs instructed to be reproduced have already been accumulated in Step S1203 in FIG. 22 is performed by the same method as in the judgement in Step S2001 in the procedures of an accumulating process of programs. That is, the conditions to affirm that the programs have been accumulated are that an accumulating data management table whose file name is coincident with original-network-id/transport-stream-id/service-id/event-id/saveinfo already exists in the accumulating data management table storing portion 373, the value of the accumulating completion flag field is TRUE, and the current time is before the time designated by Expiration. Where the judgement is affirmed, a reproducing action of the accumulated program data is performed, and where the judgement is denied, a receiving and reproducing process of program data shown in Step S1220 is performed.

Figure 34:
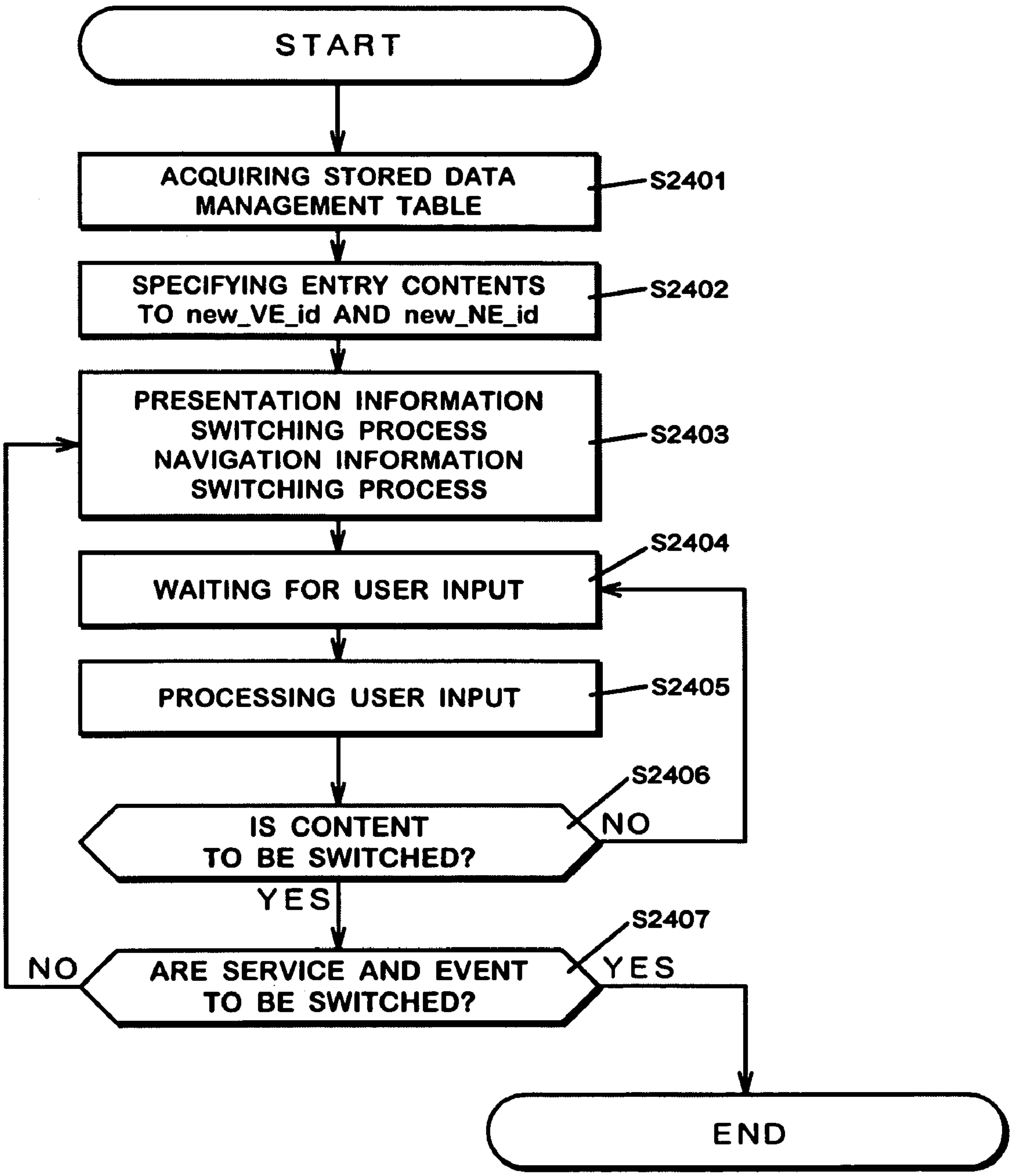
FIG. 34 is a view showing a flowchart of reproduction processing of stored program data.

FIG. 34 is a flow chart showing the reproducing actions of the accumulated program data. The CPU 45 reads a file whose file name is coincident with original-network-id/transport-stream-id/service-id/event-id/saveinfo on the basis of the event-id, service-id, transport-stream-id, and original-network-id to which the programs selected by he accumulating data management table storing portion corresponds (Step S2401). The CPU 450 fetches the values of entry-VE-id and entry-NE-id from the accumulating data management table, and sets the values as variables new-VE-id and new-NE-id (Step S2402).

Next, the CPU 450 performs, in parallel, switching processes of the presentation information corresponding to the new-VE-id set in Step S2402 and navigation information corresponding the new-NE-id set therein (Step S2403). A detailed description will be given of the respective switching processes later.

Next, the CPU 450 waits for an input signal of selection operation from a user indicated by the signal receiving portion 410 (Step S2404).

Next, as a result of the input process in Step S1307, if it is judged that a switching of the contents is not instructed (Step S2406), the process returns to Step S2404, the CPU 450 waits for an input signal from a user.

Where a switching of the contents is instructed, it is judged whether or not alternation of service or event is simultaneously accompanied (Step S2407), wherein if the alternation is not accompanied, the process returns to Step S2403, and the switching process of the contents is performed. Further, if the alternation of service or event is accompanied, the reproducing process of programs is terminated, and the process returns to Step S1202 in FIG. 22.

(Switching Process of the Accumulated Presentation Information)

Hereinafter, a detailed description is given of actions of the switching process of presentation information in Step S2405 with reference to a flow chart in FIG. 35.

First, the CPU 450 compares the value of its retained variable cur-VE-id with the value of a variable new-VE-id (Step S2501). If they are coincident with each other, the process is terminated without making any switching process.

As a result of the comparison in Step S2501, where the value of the variable new-VE-id is different from the value of the retained variable cur-VE-id, the new-VE-id is set in the cur-VE-id (Step S2502).

Next, the CPU 450 extracts a field, in which the value of the VE-id is coincident with the variable new-VE-id, from the image data management table stored in the accumulating data management table storing portion, and by fetching the data at the storing position of the field, a storing position (file name) in which the image data identified by the variable new-VE-id is stored in the image data storing portion 371 is acquired (Step S2503).

Next, the CPU 450 instructs decoding of the image data fetched in Step S2502 to the AV decoder portion 330. The AV decoder portion 330 reads the image data file fetched in Step S2502 in compliance with the instruction of the CPU 450, wherein if there remains any data to be decoded (Step S2504), a decoding process is performed (Step S2505).

The CPU 450 outputs the image data outputted from the AV decoder portion 330 to a picture synthesizing portion (Step S2506).

As no data to be read from the image data file remains, the AV decoder portion 330 indicates it to the CPU 450, wherein the CPU 450 instructs stop of a decoding process to the AV decoder portion 330 (Step S2507).

(Switching Process of the Accumulated Navigation Information)

Hereinafter, a detailed description is given of actions in a switching process of navigation information in Step S2405 with reference to a flow chart in FIG. 36.

First, the CPU 450 compares the value of the retained variable cur-NE-id with the value of a variable new-NE-id (Step S2601), wherein if they are coincident with each other, the process is terminated without performing a switching process.

As a result of the comparison in Step S2601, where the value of the variable new-NE-id is different from the value of the retained variable cur-NE-id, the new-NE-id is set in the cur-NE-id (Step S2602).

Next, the CPU 450 extracts a field, in which the value of NE-id is coincident with the variable new-NE-id, from the navigation information management table stored in the accumulating data management table storing portion, and by fetching data in the storing position of the field, a storing position (file name) in which the image data identified by the variable new-NE-id is stored in the navigation information storing portion 372 is acquired (Step S2603).

Next, the CPU 450 reproduces the navigation information table NVT being the contents of the file acquired in Step S2603 on the basis of the navigation information interpretation program. Referring to an object definition table of the NVT, the CPU 450 fetches display coordinates [X] and [Y] of a button object and subsequently fetches an index value of [Normal Bitmap], whereby the CPU 450 fetches bitmap data corresponding to the index value, with reference to the bitmap table, generates graphic data of the button on the basis thereof and outputs them to the picture synthesizing portion 380.

The picture synthesizing portion 380 cause the graphic information to overlap on the image data decoded by the AV decoder portion 330 and outputs to a display portion 400 (Step S2605).

The variable cur-focus, which expresses the index value of the button object now selected, is initialized to 0 (Step S2606).

With reference to the object definition table in the navigation information NVT acquired in Step S2603, the CPU 450 fetches display coordinates [X] and [Y] of the button object in which the index value is equal to the value of the variable cur-focus, and subsequently fetches the index value of [Focused Bitmap], wherein with reference to the bitmap table, the CPU 450 fetches bitmap data corresponding to the index value, generates graphic information of a button object in which on the basis thereof the bitmap of the button having an index value corresponding to the value of the variable cur-focus is made into a selected bitmap, and outputs the graphic information to the picture synthesizing portion 38. Then, a switching process of the navigation information is terminated (Step S2607).

Figure 35:
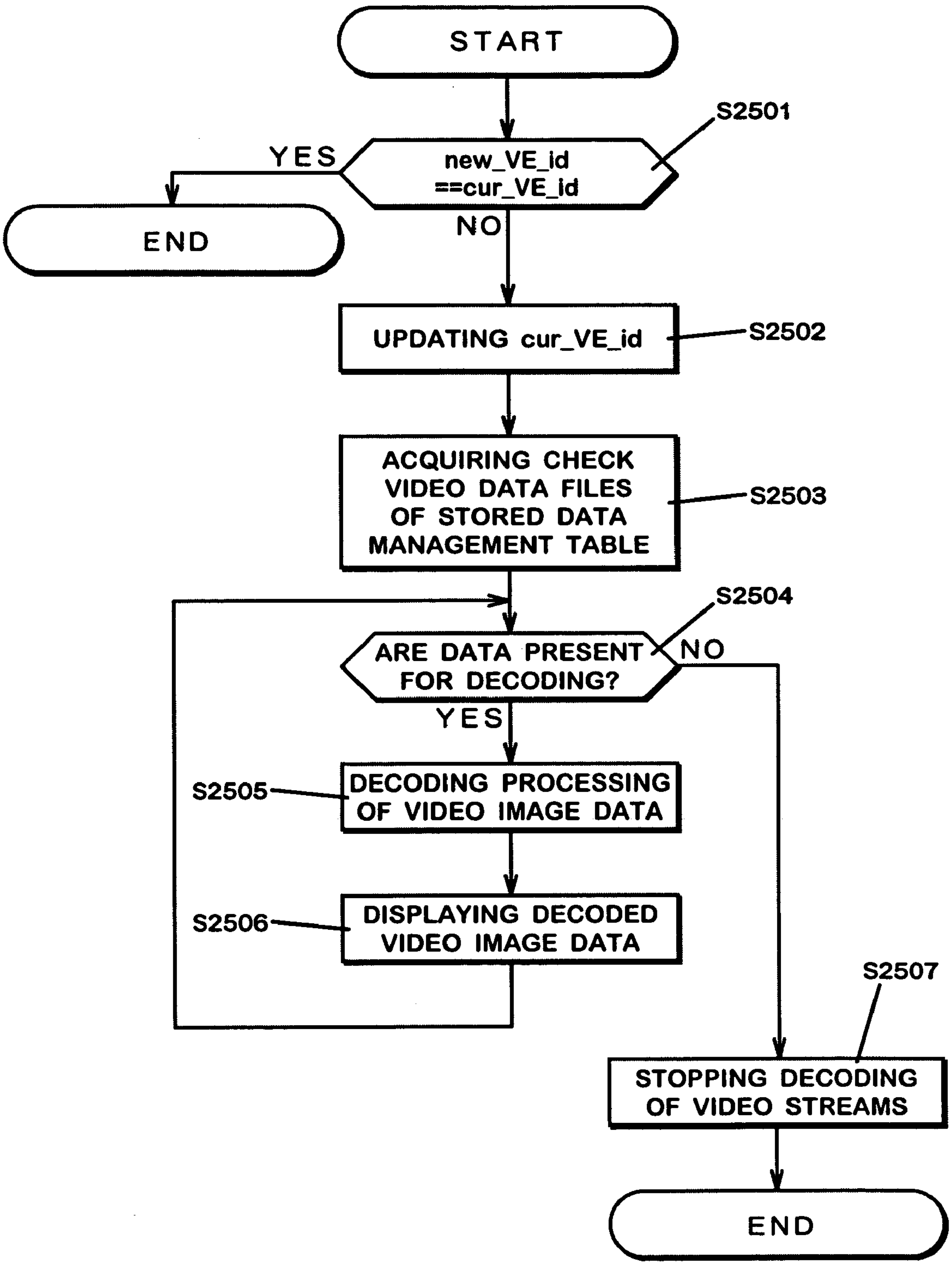
FIG. 35 is a view showing a flowchart of presentation information switching process.
Figure 36:
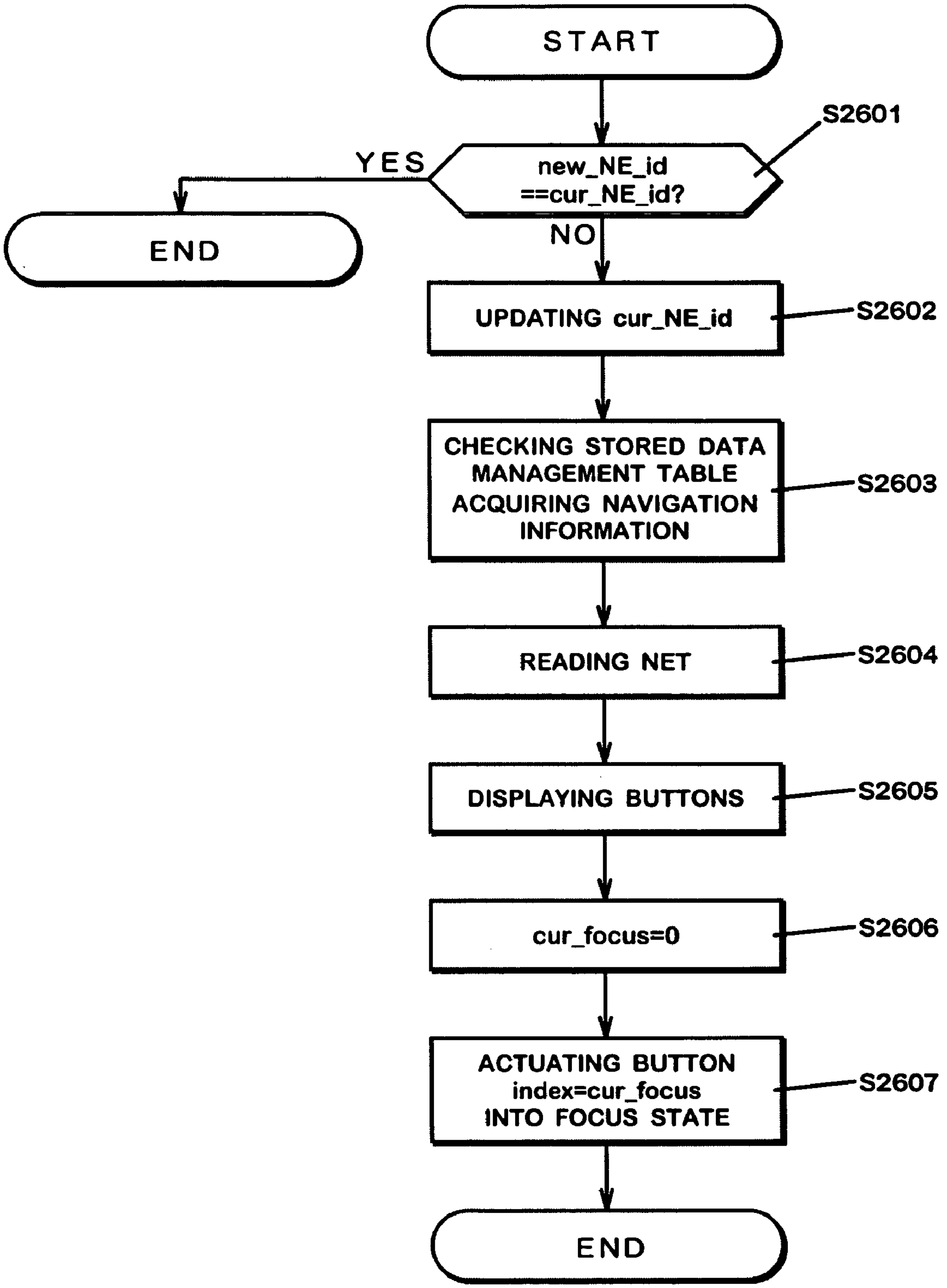
FIG. 36 is a view showing a flowchart of navigation information storage process.

As described above, a reproducing process of program data already accumulated in a digital broadcast receiver 300 is achieved by the procedures described by using FIG. 34 through FIG. 36.

As described in the preferred embodiment, in a case where all presentation information contained in programs are accumulated, it is possible to carry out an accumulating process of all still image data in a short time without the same still image data being doubly accumulated, in the VET procedures separated from the transport stream, by (1) separating and fetching VET-DII containing information regarding all presentation information contained in programs and initializing the image data management table of the accumulating data management table in compliance with the contents of the VET-DII, (2) not containing a field of the table-id-extension corresponding to the VE-id in the filter conditions regarding acquisition of the VET, (3) providing an accumulating flag field in the individual tables in the image data management table in the accumulating data management table and changing the value from FALSE to TRUE when being accumulated.

1.3 Other Preferred Embodiments

Further, although a description was given of the preferred embodiment in relation to an MPEG-I frame in which, as presentation information, the value of PTS given to the header portion of PES is first-PTS=last-PTS, the present invention is not limited to this. The invention is applicable to moving image data in which the presentation information is first-PTS<last-PTS and the value of PTS is between the first-PTS and last-PTS, wherein a receiving and reproducing process and an accumulating process can be easily achieved by the processing similar to the above description.

Also, although, in the preferred embodiment, the contents are constituted by pairs of image data acting as presentation information and navigation information, audio data can also be easily reproduced as presentation information if the elementary stream specified by the VET is not a video elementary stream but an audio elementary stream defined by the MPEG standards and the audio elementary streams are decoded by the AV decoder portion.

Still further, the presentation information is not only image data nor audio data, wherein the presentation information is designated as VE-id specifying image data and VE-id specifying audio data, whereby extension of contents expression can be easily achieved by reproducing three types of data such as image data, audio data and navigation information.

Also, in the preferred embodiment, the contents are designated by pairs of presentation information and navigation information. But the present invention is not limited to the above.

For example, when designating contents, only the navigation information is made effective, and the presentation information may be referred to from inside the navigation information. FIG. 37 shows one example of the navigation information NVT. In the object definition table 2721, a [background image] is set as a type different from the [button] with respect to an object of the index number [3], and the index of the corresponding bitmap data is made into [5]. On the other hand, in the bitmap table 2724, not only correspondence between the index number and bitmap data is provided, but also a [Type] field is provided, whereby [MPEG-I] is defined in addition to a normal [bmp]. At this time, with respect to the bitmap in which a type of [MPEG-I] is set, VE-id may be set in the column of [bitmapData] instead of setting bitmap data. Thus, when selecting the designated navigation information and displaying a graphic object of the index number [3], a receiving and reproducing process of still image data (presentation information) identified by VE-id=0×0001 is carried out.

Further, where an accumulating process of programs containing navigation information shown in FIG. 37, it is needless to say that an accumulating process can be achieved by the same method as described in the above preferred embodiment, with respect to all navigation information contained in programs and all presentation information referred to from the navigation information.

Also, in the above preferred embodiment, although a receiving process of the MPEG-2 transport stream being transmitted has been carried out under the assumption that the accumulation is not completed where the value of the accumulating completion field of the accumulating data management table is FALSE, there is no problem if a receiving and reproducing process of accumulated presentation information and navigation information may be performed in a case where the presentation information or navigation information in an attempt to be reproduced in the program has already been accumulated even though all data of the program are not completely accumulated.

That is, in a case where the accumulating flag of a table, identified by the corresponding VE-id, of the image data management table of the accumulating data management table is TRUE, the accumulated image data is read and reproduced. As well, in a case where the accumulated data of a table, identified by the corresponding NE-id, of the navigation information management table of the accumulating data management table is TRUE, there is no problem if the accumulated navigation information may be read and reproduced.

In addition, in the preferred embodiment, an Expiration-Descriptor is contained in the PMT as information expressing the term of validity of program data. However, the present invention is not limited to this.

The term of validity may not be set to the entirety of programs but may be set to each of the individual navigation information and individual presentation information. For example, FIG. 38 and FIG. 39 show one example thereof. The ExpirationTime field which shows the validity term information is set to the respective modules corresponding to the individual presentation information and individual navigation information in the NVT-DII and VET-DII.

In this case, the Expiration field is provided in the image data management table which prepares the accumulating data management table. In Step S2202, VET-DII is fetched, and the value of the ExpirationTime described for each of the individual modules of the VET-DII illustrated in FIG. 39 is written in the Expiration field of the image data management table when preparing and initializing an image data management table in Step S2203.

Similarly, an Expiration field is provided in the navigation information management field prepared in the accumulating data management table. After an NVT-DII is fetched in Step S2302, the value of the ExpirationTime described with respect to the individual modules of the NVT-DII illustrated in FIG.38 is written in the Expiration field of the navigation information management table when preparing and initializing a navigation information management table in Step S2302.

FIG. 40 is a view showing one example of an accumulating data management table in which the Expiration field is added to the image data management table and navigation information management table. In the same drawing, [1999/9/20 23:59:0] is set as a value of the Expiration field with respect to the presentation information corresponding to the VE-id. This means that the time when the presentation information identified by the VE-id=1 is valid is September 20, 23 hours 59 minutes, 1999, and no reproduction is started if the reproduction is attempted after this time.

Still further, in a case where the accumulating flag of a table, identified by the corresponding VE-id, of the image data management table of the accumulating data management table is TRUE when judging, in Step S2001, whether or not the image data are already accumulated, and further in a case where it is judged, with reference to the value of the expiration field, that the current time is before the value set in the expiration field, the accumulated image data stored in the image data storing portion may be reproduced, and where the current time is after the value set in the expiration field, a receiving and reproducing process of the presentation information may be performed.

In addition, the preferred embodiment was described under the assumption that one program data is not changed in compliance with the time in the program. Therefore, in a case where, in Step S2201, accumulating data management table exists, the value of the accumulating completion flag field is TRUE, and the current time is before the time designated by the expiration, it is judged that the image data are already accumulated, and the process shifts to a reproducing process of the accumulated data.

However, the present invention is not limited to this, and the invention may be intended to a case where program data are renewed halfway. For example, whenever the program data are renewed, the values of the fields of the respective Module-Versions of NVT-DII and VET-DII are renewed, and an NVT version field and VET version field are added as fields in which the values of the respective Module-Version fields are stored. When accumulating the program data, the values of the respective Module-Versions of the NVT-DII and VET-DII are set.

Further, when reproducing an accumulated program described in FIG. 34, it is judged whether or not the values of the Module-Version field of the VET-DII and NVT-DII being now transmitted are coincident with the values of the VET version field and NVT version field, in addition to the judgement items described in Step S2001, wherein if they are coincident with each other, a reproducing process of the accumulated data is performed, and if not coincident, a receiving and reproducing process is newly performed from streams, whereby the newest data reproducing process is enabled.

Although, in the above preferred embodiment, the accumulating management is performed by using VET-DII and NV-DII, the accumulation may be carried out without using these.

Also, when accumulating a navigation information table and presentation information in the abovementioned preferred embodiment, the navigation information and presentation information may be acquired in the order of separation without designating the individual navigation information and individual presentation information as filter conditions. Also, they may be fetched by designating the individual navigation information tables and individual presentation information. In addition, such a process may be acceptable, in which no designation is issued when there are a plenty of non-fetched navigation information and presentation information, and as the non-fetched navigation information and presentation information are decreased, the corresponding non-fetched information may be designated. If no designation is performed under a condition that the non-fetched information is decreased, futility is produced, by which already accumulated information is doubly fetched. For example, where the number of non-fetched information becomes equal to the number of filter conditions usable in the TS decoder 320, individual designation may be performed.

Also, in the preferred embodiment, the navigation information table and presentation information are linked by the navigation information table. However, the presentation information may be expressed in the form of languages such as HTML and XML, etc. In this case, the link address will be expressed in the form of the presentation language itself, which is the content element. Therefore, where such languages as HTML, XML, etc., are used, a set of content elements may be repeatedly transmitted, wherein no navigation information table may not be used. A recording process (accumulating process) and a reproducing process may eliminate process of the navigation information table, wherein the processes basically are the same as those in the above.

In the above-preferred embodiment, the accumulated navigation information table and presentation information is used to perform reproducing in the corresponding receiver 300. However, as they are prepared in the form which can be utilized in a computer, they may be used by accessing from any peripheral computers.

In the above preferred embodiment, no information exceeding the term of validity is outputted, wherein there is no fear that any application of television shopping whose validity term is expired or any past weather forecasting is reproduced. But, they may be reproduced with an indication saying that the validity term is expired.

Also, in the above preferred embodiment, a description was given of a case where the respective functions and/or features in FIG. 20 are achieved by a CPU (central processing unit). But, a part or the entirety of the functions and/or features may be achieved by a hardware logic circuit.

2. Second Preferred Embodiment

2.1 Digital Broadcast Receiver

Figure 41:
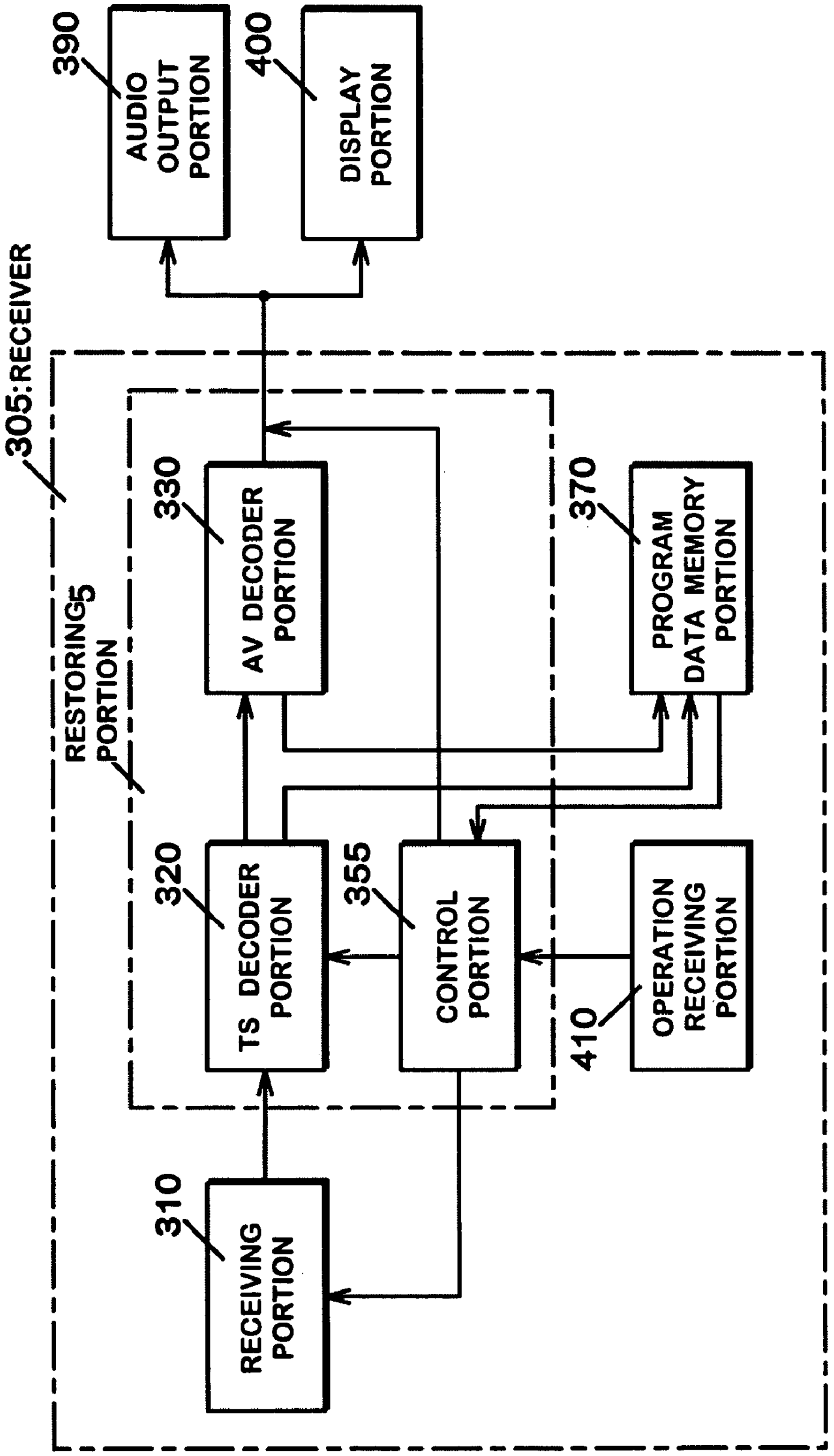
FIG. 41 is a view showing the general configuration of a digital broadcast receiver according to a second embodiment.

FIG. 41 shows the entirety of a digital broadcast receiver 305 according to the second preferred embodiment. In addition, the construction of a transmitter in this embodiment is the same as that in the first preferred embodiment. The receiver 305 is provided with a receiving portion 310, a decoding portion 445, an operating receiving portion 410 and a program data storing portion 370. The decoding portion 445 is provided with a TS decoder portion 320 and an AV decoder portion 330. In this preferred embodiment, as the controller portion 355 receives a program, in which one set of presentation information (content elements) is repeatedly transmitted, the controller portion 355 records (accumulates) the presentation information (content elements) and navigation information table. Therefore, if the presentation information and navigation information table to be outputted next are already stored when switching the presentation information and navigation information table, they may be used to accelerate the processes.

Herein, in a system which brings an interactive feature, described above, one set of presentation information and navigation information table are repeatedly transmitted. Therefore, interactive broadcasting can be achieved without recording one set of these data at the receiver side.

Further, using a digital broadcast system according to the preferred embodiment, a response process can be accelerated in a receiver having allowance in the memory capacity while securing compatibility with a receiver having a small recording capacity.

2.1.1 Hardware Construction of a Receiver

The hardware construction in a case of achieving a receiver shown in FIG. 41 by using a CPU is similar to that shown in FIG. 21. Also, a hard disk may be used as a program data storing portion 370. However, in the view of high speed processing, it is preferable that a semiconductor memory, etc., is used.

2.0.1 Actions of a Receiving Processing Device

Figure 42:
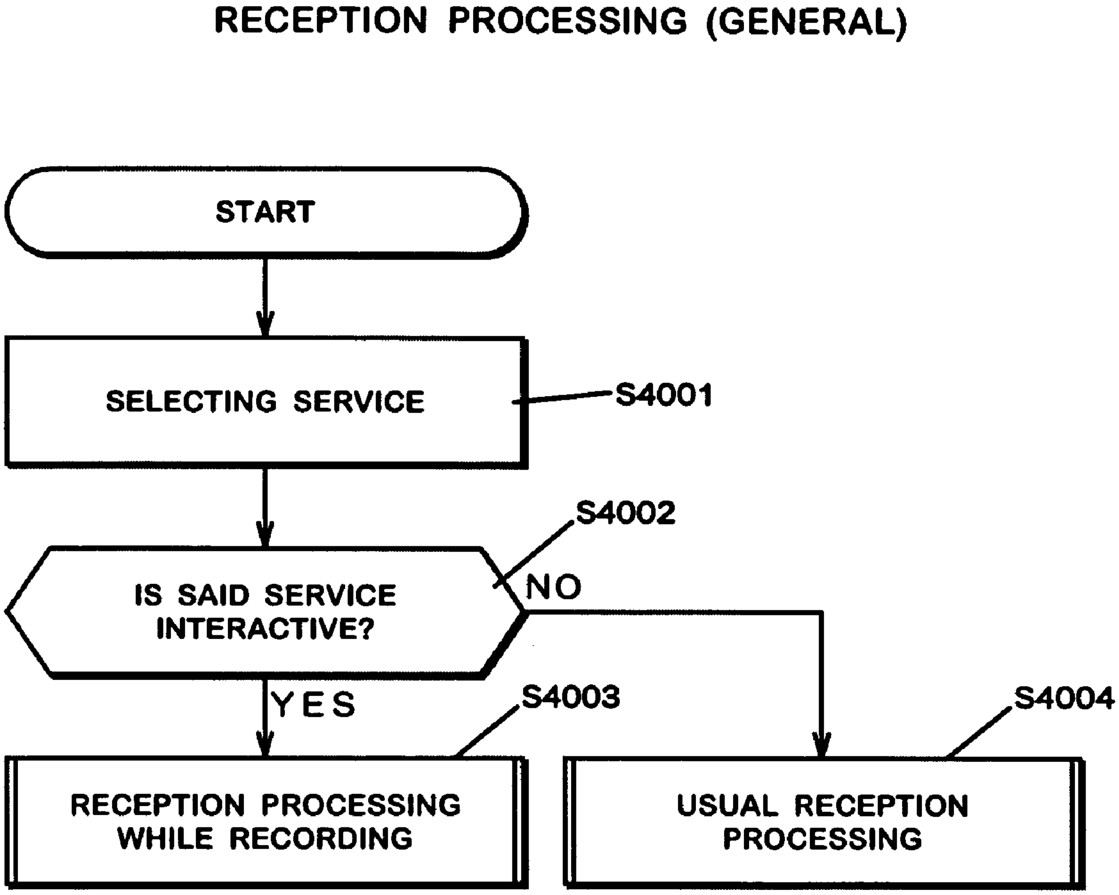
FIG. 42 is a view showing a flowchart of whole reception processing.
Figure 43:
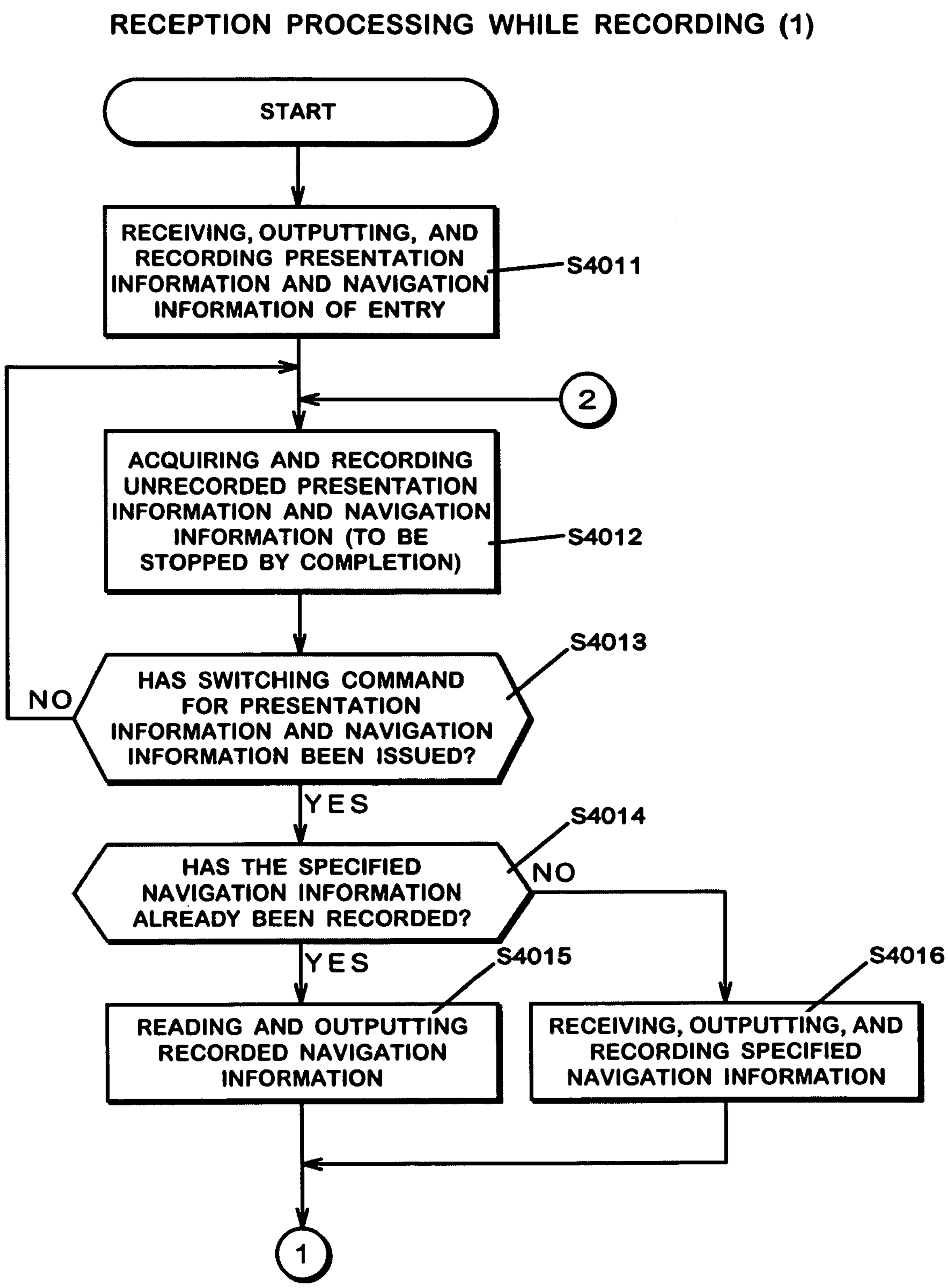
FIG. 43 is a view showing a flowchart of reception processing while recording.
Figure 44:
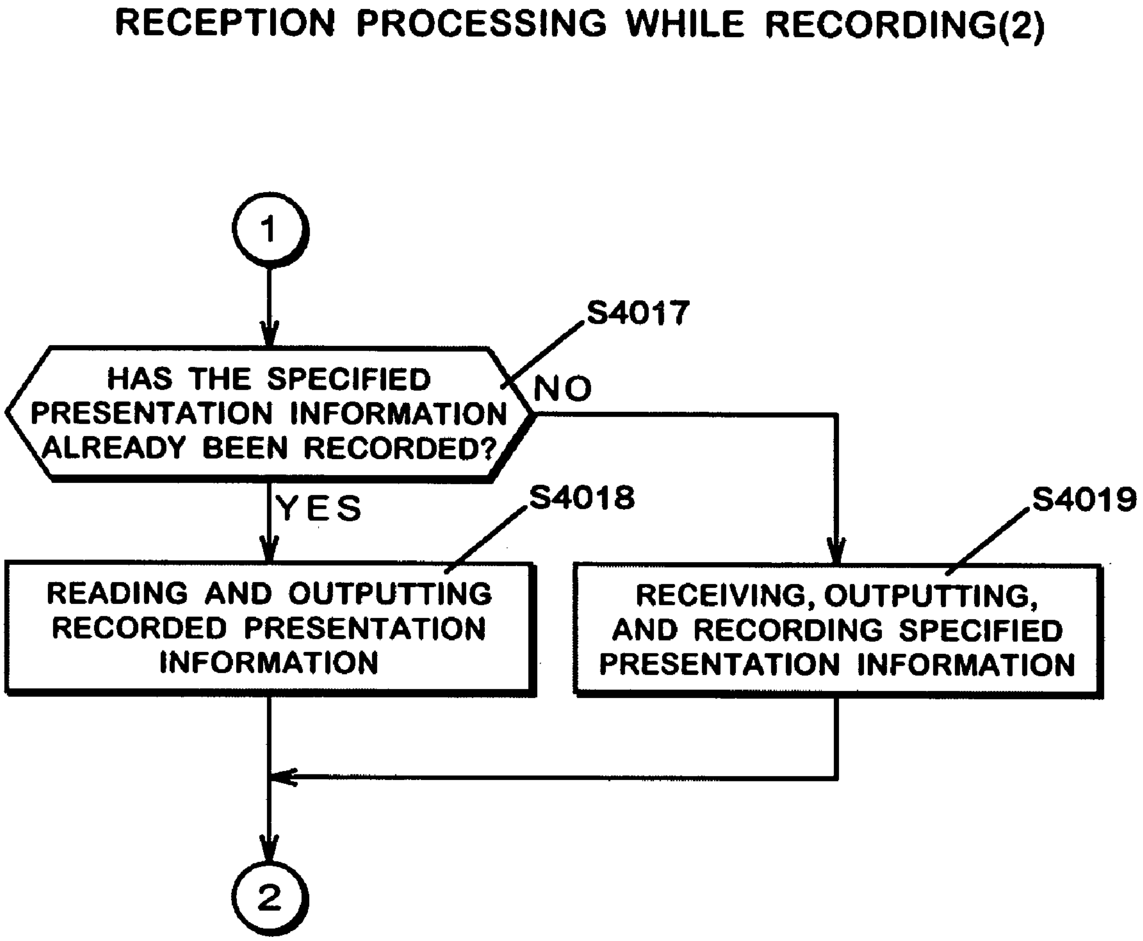
FIG. 44 is a view showing a flowchart of reception processing while recording.

FIG. 42, FIG. 43 and FIG. 44 show flow charts of a receiving process programs stored in a ROM 420. As a service is designated by operations of an operator, the CPU 450 controls a tuner 310 and a TS decoder portion 320 and selects the corresponding service (Step S4001). The selecting process is the same as that in the first preferred embodiment.

Next, the CPU 450 judges whether or not the corresponding service program is caused to have an interactivity by repeatedly transmitting a set of data (Step S4002). The judgement can be carried out by referring to the control data PMT. If the program does not have any interactive feature, a usual receiving process is performed (Step S4004).

If the program has an interactive feature, a receiving process is performed while recording (Step S4003).

A detail of the receiving process with recording is shown in FIG. 43 and FIG. 44. First, the CPU 450 controls the TS decoder portion 320 with reference to the control data PMT (Refer to FIG. 19A), receives and fetches the presentation information and navigation information of an entry, and displays them on a display portion 400 (Step S4011). At the same time, the fetched presentation information and navigation information are recorded in a memory 340 which acts as a program information storing portion. This can be performed by instructing the AV decoder portion 330 to output to the picture synthesizing portion 380 and the memory 340 to store.

Thus, in a state where the presentation information and navigation information of the entry are displayed, other non-recorded presentation information and navigation information are fetched and recorded (Step S4102).

The recording process herein is the same as that in the first preferred embodiment. For example, if the received information is no recorded without designating the individual presentation information and individual navigation information, the recording may be performed. Further, if all (one set) of presentation information and navigation information are recorded, Step S4102 is skipped without execution. Also, by using a VET-DII and NVT-DII as in the first preferred embodiment, it is also possible to manage whether or not a set of presentation information and navigation information is entirely recorded.

Next, while performing the above recording process, it is judged whether or not a switching instruction of the presentation information and navigation information is given by an operator (Step S4103). Without any switching instruction given, the above recording process is continued.

If a switching instruction is issued, it is judged whether or not the designated navigation information is already recorded in the memory 340 (Step S4014). If recorded, the navigation information is fetched from the memory 340 and outputted (Step S4015). Further, if not recorded, the CPU 450 controls the TS decoder portion 320, receives, restores and outputs the navigation information (Step S4016).

Next, it is judged whether or not the designated presentation information is already recorded in the memory 340 (Step S4017). If recorded, the presentation information is fetched from the memory 340 and outputted (Step S4018). If not recorded, the CPU 450 controls the TS decoder portion 320, receives, restores and outputs the presentation information (Step S4019). Thereafter, the process after Step S4012 is carried out again.

As described above, a recording process may be carried out in advance for subsequent processes while performing a receiving process.

2.1 Other Embodiments 2.2.1 Applicability of Alternation and Amendments Performed in the First Embodiment Also in the second preferred embodiment, alternation and amendments which are similar to those in the first preferred embodiment can be performed.

2.2.2 Version Information

Further, version information may be provided instead of the term of validity. Also, if the version is out of date, a new fetching may be carried out again so as to record information in a case where the term of validity elapses even though a set of data (presentation information and navigation information) is already recorded. In this case, it is possible to judge whether or not the term of validity elapses, by comparing with the current time. Also, by comparing the version of the recorded data with that of the transmitting data, it is possible to judge whether or not the version of the recorded data is out of date. Thus, new data can be always recorded.

2.2.3 Monitoring Timing of Version and Other Information

Still further, as described above, the above monitoring is performed where the output of the presentation information and navigation information is designated (by operation of a viewer), not depending on usual monitoring the term of validity and version, new data is received and outputted, and at the same time, the recording may be performed.

2.2.4 Transmission Schedule of New Data

In addition, in a case where the term of validity elapses, information on whether or not data having the next new term of validity is scheduled to be received may be transmitted. The information may be described in, for example, VET-DII or NVT-DII. Upon receiving the information, a receiver may judge whether or not newer data than the currently recorded data is being transmitted.

2.2.5 Record Process Information

Not much benefit is found to record information to the receiver such that frequent revision of data is performed as well as other information. In order to give a meaning to those data, flags representing necessity and nonnecessity of recording information may be written in the NVT_DII and/or the VET_DII at the transmitter, and send these to the receiver. Upon receiving the NVT_DII and the VET_DII containing the flags, the receiver not performs recording of the information carried out at steps S4101 and S4102 if the flag represents nonnecessity of recording information.

Further, the priority of recording information may be sent as the flags, and the information may also be recorded under the order of higher priority at the recorder.

In addition, recording of the information carried out at steps S4101 and S4102 may be omitted when a short period left to the terms of validity as a result of comparison between the validity written in both the NVT_DII and the VET_DII and the current time. In this way, efficient use of the storing capacity can be realized by just recording the information having sufficient terms of validity. The judgement of necessity and nonnecessity of recording information may be performed not only in consideration of the remaining period to the terms of validity, but also the storing capacity.

In step S4102, information is recorded in the order of obtaining. Higher priority of recording may be provided to the information having sufficient terms of validity, and the higher priority information may also be record ahead of other information.

Information erup representing the frequency of revision of information may be sent to both the NVT_DII and the VET_DII from the transmitter (see FIGS. 45 and 46). The information indicating in frequency flag erup is information revised frequently. On the contrary, the information indicating in frequency flag erup is information revised less frequently.

The receiver not performs recording of the information carried out at steps S4101 and S4102 if the frequency flag erup is in The receiver, on the other hand, performs recording of the information carried out at steps S4101 and S4102 if the frequency flag erup is in In this way, efficient use of the storing capacity can be realized by just recording the information revised less frequency. The judgement of necessity and nonnecessity of recording information may be performed in consideration of not only the frequency flags, but also the remaining storing capacity.

In step S4102, information is recorded in the order of obtaining. Higher priority of recording may be provided to the information having in the frequency flag, and the higher priority information may also be record ahead of other information.

The frequency of revising information may be converted into numerical values such as in five grades (from first through fifth grade). The numerical values can also be used as the frequency flags. The judgement of necessity and nonnecessity of recording information and the determination of recording priority may be performed by the receiver in accordance with the frequency information described above.

As described earlier, the transmitter sends the record process information such as the flags representing necessity and nonnecessity of recording information, the terms of validity of the information and the frequency of revision. The judgement of necessity and nonnecessity of recording information can be carried out by the receiver in accordance with the record process information sent by the receiver. Although, the record process information is attached to every information in the embodiment described above, the record process information may be written in every set of data the presentation information and navigation information.

What is claimed is:

1. A digital broadcast receiver which allows a viewer to switch to content elements selected in response to an operation input by the viewer, said digital broadcast receiver comprising a receiving portion for receiving transmitted data, an operation receiving portion for receiving an operator operation, and a restoring portion for determining which content element to restore next based on the operation received by the operation receiving portion and in accordance with navigation control data, for selecting a content element to be restored next out of content elements transmitted repeatedly, and for restoring the element for output; wherein said restoring portion performs processing of restoring and recording other content elements in parallel with the processing of selecting and restoring a desired content element determined based on the operation input by the operator, and outputs content elements which have been restored in advance and recorded, in the case where content elements determined based on the operation input by the operator have already been recorded, wherein said restoring portion fetches all target fetch control data without specifying which fetch control data to fetch, and records content elements in sequence in the order of obtaining fetch control data while a number of unrecorded fetch control data remains, and when a small number of unrecorded fetch control data remains, said restoring portion specifies said unrecorded fetch control data in order to be fetched and recorded.

2. The digital broadcast system according to claim 1, wherein said restoring portion fetches a target content element from elementary streams in accordance with fetch control data for identifying content elements with a series of sequential information attached thereto in accordance with said series of information, in the receiving mode and recording mode.

3. The digital broadcast system according to claim 2, wherein time information is utilized as said series of information, and said content elements are dynamic video image data or audio data which are sliced in said elementary streams in accordance with a start time and termination time of said time information.

4. The digital broadcast receiver according to claim 2, wherein time information is utilized as said series of information, and said content elements are still video image data which are sliced in said elementary streams in accordance with said time information.

5. The digital broadcast system according to claim 1, wherein said restoring portion determines whether or not all content elements included in the sets of content elements have been recorded, in accordance with a received content element list.

6. The digital broadcast receiver according to claim 1, wherein said restoring portion determines whether or not all navigation control data included in sets of navigation data have been recorded, in accordance with a received navigation list.

7. The digital broadcast receiver according to claim 1, wherein said restoring portion fetches all target fetch control data without specifying which fetch control data to fetch, and records content elements in sequence in the order of obtaining fetch control data.

8. The digital broadcast receiver according to claim 1, wherein said restoring portion fetches all target navigation control data without specifying which navigation control data to fetch, and records navigation control data in sequence in the order of obtaining navigation control data.

9. The digital broadcast receiver according to claim 1, wherein said restoring portion associates expiration date or version, which is transmitted associated with a whole set of content elements or an individual content element, with a whole set of content elements or an individual content element for recording, and performs optimization processing in accordance with said expiration date or version.

10. A digital broadcast receiver which allows a viewer to switch to content elements selected in response to an operation input by the viewer, said digital broadcast receiver comprising:

a receiving portion for receiving transmitted data, an operation receiving portion for receiving an operator operation, and a restoring portion for determining which content element to restore next based on the operation received by the operation receiving portion and in accordance with navigation control data, for selecting a content element to be restored next out of content elements transmitted repeatedly, and for restoring the element for output; wherein said restoring portion performs processing of restoring and recording other content elements in parallel with the processing of selecting and restoring a desired content element determined based on the operation input by the operator, and outputs content elements which have been restored in advance and recorded, in the case where content elements determined based on the operation input by the operator have already been recorded; and wherein said restoring portion fetches all target navigation control data without specifying which navigation control data to fetch, and records content elements in sequence in the order of obtaining navigation control data while a number of unrecorded navigation control data remains, and when a small number of unrecorded navigation control data remains, said restoring portion specifies said unrecorded navigation control data in order to be fetched and recorded.

11. A digital broadcast receiver comprising a receiving portion for receiving transport streams, an operation receiving portion for receiving an operator operation, a transport decoder for selecting at least desired navigation control data and content elements from received transport streams in accordance with the operator operation for output, an extending decoder for extending output from the transport decoder, a CPU for controlling each aforementioned portion, a memory which records a program for determining control contents of said CPU, and a recording portion for recording;

said digital broadcast receiver wherein said program allows the CPU to perform processing for determining content elements to be restored next based on the operation received by the operation receiving portion in accordance with the navigation control data, separating the content elements to be restored next out of sets of content elements transmitted repeatedly by means of the transport decoder, and restoring and outputting the same by extending the same by means of the extending decoder;

processing, carried out in parallel to said processing, for restoring content elements other than contents to be restored next and recording the same in the recording portion; and processing for outputting content elements which have been restored in advance and recorded, in the case where content elements determined based on the operation input by the operator have already been recorded, wherein, in said processing for restoring, the CPU fetches all target fetch control data without specifying which fetch control data to fetch, and records content elements in sequence in the order of obtaining fetch control data while a number of unrecorded fetch control data remains, and when a small number of unrecorded fetch control data remains, the CPU specifies said unrecorded fetch control data in order to be fetched and recorded.

12. A recording medium which records a program for allowing a CPU to perform reception processing; the CPU controlling a receiving portion for receiving transport streams, an operation receiving portion for receiving an operator operation, a transport decoder for selecting at least desired navigation control data and content elements from received transport streams in accordance with the operator operation for output, an extending decoder for extending output from the transport decoder, and a recording portion for recording;

said recording medium for recording a program which allows the CPU to perform processing for determining content elements to be restored next based on the operation received by the operation receiving portion in accordance with the navigation control data, separating the content elements to be restored next out of sets of content elements transmitted repeatedly by means of the transport decoder, and restoring and outputting the same by extending the same by means of the extending decoder;

processing, carried out in parallel to said processing, for restoring content elements other than contents to be restored next and recording the same in the recording portion; and processing for outputting content elements which have been restored in advance and recorded, in the case where content elements determined based on the operation input by the operator have already been recorded, wherein, in said processing for restoring, the CPU fetches all target fetch control data without specifying which fetch control data to fetch, and records content elements in sequence in the order of obtaining fetch control data while a number of unrecorded fetch control data remains, and when a small number of unrecorded fetch control data remains, the CPU specifies said unrecorded fetch control data in order to be fetched and recorded.

* * * * *